(12) United States Patent
Cheun et al.

(10) Patent No.: US 11,912,953 B2
(45) Date of Patent: Feb. 27, 2024

(54) FRICTION AND WEAR REDUCTION ADDITIVES

(71) Applicant: Petroliam Nasional Berhad (Petronas), Kuala Lumpur (MY)

(72) Inventors: Kuah Y. Cheun, Kuala Lumpur (MY); Andrea Dolfi, Kuala Lumpur (MY); Giuseppe Forastiero, Kuala Lumpur (MY); Geetha Srinivasan, Kuala Lumpur (MY); Farah Fazlina M Yasin, Kuala Lumpur (MY)

(73) Assignee: Petroliam Nasional Berhad (Petronas), Kuala Lumpur (MY)

( * ) Notice: Subject to any disclaimer, the term of this patent is extended or adjusted under 35 U.S.C. 154(b) by 27 days.

(21) Appl. No.: 17/625,619

(22) PCT Filed: Jul. 8, 2020

(86) PCT No.: PCT/GB2020/051650
§ 371 (c)(1),
(2) Date: Jan. 7, 2022

(87) PCT Pub. No.: WO2021/005372
PCT Pub. Date: Jan. 14, 2021

(65) Prior Publication Data
US 2022/0290067 A1   Sep. 15, 2022

(30) Foreign Application Priority Data
Jul. 8, 2019  (MY) .......................... PI2019003944

(51) Int. Cl.
*C10M 125/22* (2006.01)
*C10M 133/04* (2006.01)
(Continued)

(52) U.S. Cl.
CPC ........ *C10M 125/22* (2013.01); *C10M 133/04* (2013.01); *C10M 137/02* (2013.01);
(Continued)

(58) Field of Classification Search
CPC .............. C10M 125/22; C10M 133/04; C10M 137/02; C10M 2219/02; C10M 2223/02;
(Continued)

(56) References Cited

U.S. PATENT DOCUMENTS 3,804,941 A   4/1974   Coad et al.
4,370,245 A   1/1983   Ryu et al.
(Continued)

OTHER PUBLICATIONS

International Search Report dated Sep. 17, 2020 for PCT/GB2020/051650.

*Primary Examiner* — Prem C Singh
*Assistant Examiner* — Francis C Campanell
(74) *Attorney, Agent, or Firm* — Ryan T. Grace; Advent, LLP

(57) ABSTRACT

The present invention relates to additives for reducing friction and wear in lubricants. In particular, the present invention relates to novel salts and their use in lubricating oil compositions for reducing friction and wear. In particular, the present invention relates to one or more ionic liquids, wherein the one or more ionic liquids comprise one or more cations and one or more Group 6 metal mononuclear metallate anions.

24 Claims, 24 Drawing Sheets

(51) Int. Cl.
  *C10M 137/02* (2006.01)
  *C10M 169/04* (2006.01)
  *C10N 30/00* (2006.01)
  *C10N 40/25* (2006.01)
  *C10N 20/00* (2006.01)
  *C10N 70/00* (2006.01)
  *C10N 10/12* (2006.01)
  *C10N 30/06* (2006.01)
  *C10N 30/10* (2006.01)
  *C10N 30/12* (2006.01)

(52) U.S. Cl.
  CPC ...... *C10M 169/04* (2013.01); *C10M 2215/02* (2013.01); *C10M 2219/02* (2013.01); *C10M 2223/02* (2013.01); *C10M 2223/06* (2013.01); *C10M 2227/066* (2013.01); *C10N 2010/12* (2013.01); *C10N 2020/077* (2020.05); *C10N 2030/06* (2013.01); *C10N 2030/10* (2013.01); *C10N 2030/12* (2013.01); *C10N 2030/41* (2020.05); *C10N 2040/251* (2020.05); *C10N 2040/252* (2020.05); *C10N 2070/02* (2020.05)

(58) Field of Classification Search
  CPC ........ C10M 2223/06; C10M 2227/066; C10M 2201/065; C10M 2223/061; C10M 137/12; C10M 171/00; C10M 2201/08; C10N 2010/12; C10N 2020/077; C10N 2030/06; C10N 2030/41; C10N 2040/251; C10N 2040/252; C10N 2070/02; C07F 9/5407
  USPC ........................................................ 508/168
  See application file for complete search history.

(56) References Cited

U.S. PATENT DOCUMENTS

| | | | |
|---|---|---|---|
| 4,400,282 A | | 8/1983 | Singerman et al. |
| 4,816,303 A | * | 3/1989 | Kroenke ................. C23F 11/08 427/388.1 |
| 2009/0029887 A1 | * | 1/2009 | Schwab ................. B21D 26/02 508/283 |
| 2017/0240837 A1 | * | 8/2017 | Casey ................. C10M 159/18 |

* cited by examiner

| 18-36 IL LSV copper | ba (V/dec) (V/dec) | bc (V/dec) (V/dec) | Ecorr, Calc (V) (V) | Ecorr, Obs (V) (V) | jcorr (A/cm²) (A/cm²) | icorr (A) (A) | Corrosion rate (mm/year) (mm/year) | Polarization resistance (Ω) (Ω) | E Begin (V) (V) | E End (V) (V) |
|---|---|---|---|---|---|---|---|---|---|---|
| | 0.30191 | 0.34661 | -0.53011 | -0.53121 | 1.63E-08 | 1.63E-08 | 0.00018993 | 4.29E+06 | -0.69351 | -0.39566 |
| | 0.34227 | 0.3614 | -0.42906 | -0.42874 | 1.27E-08 | 1.27E-08 | 0.00014799 | 5.99E+06 | -0.62836 | -0.22308 |
| 18-03 IL LSV copper | ba (V/dec) (V/dec) | bc (V/dec) (V/dec) | Ecorr, Calc (V) (V) | Ecorr, Obs (V) (V) | jcorr (A/cm²) (A/cm²) | icorr (A) (A) | Corrosion rate (mm/year) (mm/year) | Polarization resistance (Ω) (Ω) | E Begin (V) (V) | E End (V) (V) |
| | 0.31952 | 0.32103 | -0.64339 | -0.64336 | 2.34E-08 | 2.34E-08 | 0.00027176 | 2.97E+06 | -0.81512 | -0.46844 |
| | 0.31536 | 0.31354 | -0.51727 | -0.51816 | 3.10E-08 | 3.10E-08 | 0.00036069 | 2.20E+06 | -0.71045 | -0.32715 |
| 18-36 IL LSV iron | ba (V/dec) (V/dec) | bc (V/dec) (V/dec) | Ecorr, Calc (V) (V) | Ecorr, Obs (V) (V) | jcorr (A/cm²) (A/cm²) | icorr (A) (A) | Corrosion rate (mm/year) (mm/year) | Polarization resistance (Ω) (Ω) | E Begin (V) (V) | E End (V) (V) |
| | 0.36539 | 0.37081 | -0.23311 | -0.23216 | 1.42E-08 | 1.42E-08 | 0.00015519 | 5.62E+06 | -0.45059 | -0.01114 |
| | 0.4067 | 0.40975 | -0.28163 | -0.28181 | 1.36E-08 | 1.36E-08 | 0.00015846 | 6.50E+06 | -0.51498 | -0.03891 |
| 18-03 IL LSV iron | ba (V/dec) (V/dec) | bc (V/dec) (V/dec) | Ecorr, Calc (V) (V) | Ecorr, Obs (V) (V) | jcorr (A/cm²) (A/cm²) | icorr (A) (A) | Corrosion rate (mm/year) (mm/year) | Polarization resistance (Ω) (Ω) | E Begin (V) (V) | E End (V) (V) |
| | 0.29664 | 0.30865 | -0.29489 | -0.2937 | 1.99E-08 | 1.99E-08 | 0.00023092 | 3.31E+06 | -0.47501 | -0.11368 |
| | 0.36725 | 0.36907 | -0.42817 | -0.43035 | 2.49E-08 | 2.49E-08 | 0.00028895 | 3.21E+06 | -0.64758 | -0.21545 |
| 18-36 IL LSV silver | ba (V/dec) (V/dec) | bc (V/dec) (V/dec) | Ecorr, Calc (V) (V) | Ecorr, Obs (V) (V) | jcorr (A/cm²) (A/cm²) | icorr (A) (A) | Corrosion rate (mm/year) (mm/year) | Polarization resistance (Ω) (Ω) | E Begin (V) (V) | E End (V) (V) |
| | 0.37083 | 0.38586 | -0.59037 | -0.59087 | 1.50E-08 | 1.50E-08 | 0.00017442 | 5.47E+06 | -0.82291 | -0.36392 |
| | 0.3438 | 0.35904 | -0.59145 | -0.59244 | 1.55E-08 | 1.55E-08 | 0.00018052 | 4.91E+06 | -0.81696 | -0.37018 |
| 18-03 IL LSV silver | ba (V/dec) (V/dec) | bc (V/dec) (V/dec) | Ecorr, Calc (V) (V) | Ecorr, Obs (V) (V) | jcorr (A/cm²) (A/cm²) | icorr (A) (A) | Corrosion rate (mm/year) (mm/year) | Polarization resistance (Ω) (Ω) | E Begin (V) (V) | E End (V) (V) |
| | 0.31577 | 0.34079 | -0.27582 | -0.27565 | 2.84E-08 | 2.84E-08 | 0.00032981 | 2.51E+06 | -0.47379 | -0.06851 |
| | 0.34719 | 0.37107 | -0.24298 | -0.24103 | 2.96E-08 | 2.96E-08 | 0.00034428 | 2.63E+06 | -0.46616 | -0.0145 |

Figure 15

FRICTION AND WEAR REDUCTION ADDITIVES

FIELD OF THE INVENTION

The present invention relates to additives for reducing friction and wear in lubricants. In particular, the present invention relates to novel salts and their use in lubricating oil compositions for reducing friction and wear.

BACKGROUND OF THE INVENTION

Lubricant compositions generally comprise a base oil of lubricating viscosity together with one or more additives to deliver properties such as reduced friction and wear, improved viscosity index, detergency, and resistance to oxidation and corrosion. A lubricant base oil may comprise one or more sources of lubricating oil, referred to as base stocks. Typically, lubricants contain about 90% by weight of base oil and around 10% by weight of additives. Lubricant base stocks may be derived from crude oil. Such base stocks are known as mineral oils. Such lubricant base stocks useful in automotive engine lubricants may be obtained as higher boiling fractions from the refining of crude oil or via synthetic routes, and are classified as Group I, II, III, IV and V base stocks according to API standard 1509, "ENGINE OIL LICENSING AND CERTIFICATION SYSTEM", April 2007 version 16th edition Appendix E. Lubricant base stocks may also be obtained synthetically using synthetic hydrocarbons (that may themselves be derived from petroleum). Such base stocks are known as synthetic base stocks and include polyalpha-olefins (PAO), synthetic esters, polyalkylene glycols (PAG), phosphate esters, alkylated naphthalenes (AN), silicate esters, ionic fluids and multiply alkylated cyclopentanes (MAC).

Lubricating oil compositions have a variety of uses. A principal use of said compositions is in lubricating the moving parts of internal combustion engines in motor vehicles and powered equipment such as spark ignition engines and compression ignition engines. Lubricating oil compositions generally comprise a variety of additives to aid the lubricating oils in performing their functions. Friction reduction additives are generally included in lubricating oil compositions to reduce the friction between moving parts of the system. Anti-wear additives are also typically included to reduce the wear upon the surfaces of the moving parts.

An example of commercially available friction reduction additive is the compound known as MoDTC which has the formula:

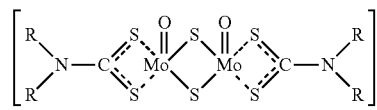

An example of a commercially available anti-wear additive used in lubricating oil compositions are the compounds known as zinc dialkyl and diaryldithiophosphates (ZDDPs) which have the following formula:

Various salts are also known to be used in lubricating oil compositions to provide friction reduction and anti-wear properties to the composition. WO2008/075016 discloses various salts for use in lubricating oil compositions to provide anti-wear and friction reduction properties. The salts comprise quaternary ammonium and quaternary phosphonium cations having four hydrocarbyl groups. The salts comprise anions of the formula $[R^1R^2P(O)O]^-$, carboxylate anions and various sulfosuccinate ester anions.

Further salts for use in lubricating oil compositions as friction reduction and anti-wear additives are disclosed in US2017/0240838 and US2017/0240837 and have the following formula:

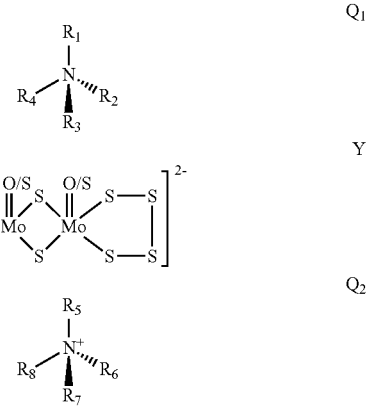

The anions of the salts disclosed in said documents are limited to binuclear anions of the above formula. Furthermore, the cations of the salts disclosed in said documents are limited to imidazolium cations and quaternary ammonium cations substituted with hydrocarbyl groups.

U.S. Pat. No. 4,370,245 discloses compounds with the following formula:

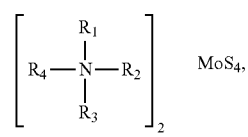

Groups $R_1$ to $R_3$ are limited to alkyl and alkenyl groups having from 1 to 30 carbon atoms and $R_4$ is limited to alkyl and alkenyl groups having from 4 to 30 carbon atoms. The salts are disclosed as improving the extreme pressure properties of greases comprising substituted urea thickeners. It is taught that said salts do not improve the properties of other greases such as those thickened with alkali metals or alkali earth metals. Furthermore, it is taught that different hydrocarbylammonium thiomolybdates to those disclosed in the document are not effective with the substituted-urea thickened greases at improving their extreme pressure properties.

The inventors of the present invention have appreciated that there is a continued need for new and improved additives for use in lubricating oil compositions that improve the anti-wear properties of said compositions and that reduce friction in said compositions.

SUMMARY OF THE INVENTION

The present invention is based, in part, on the surprising finding that certain novel ionic liquid salts and certain known ionic liquid salts impart improved anti-wear properties and/or improved friction reduction properties to lubricating oil compositions. In particular, it has been found that certain novel ionic liquid salts and certain known ionic liquid salts impart anti-wear and friction reduction properties to lubricating oil compositions to an extent greater than various additives known in the art for imparting said properties.

According to an aspect of the invention, there is provided a lubricating oil composition comprising one or more base oils and one or more ionic liquids, wherein the one or more ionic liquids comprise one or more cations and one or more Group 6 metal mononuclear metallate anions.

Preferably, the one or more Group 6 metal mononuclear metallate anions comprise molybdenum.

Preferably, the one or more Group 6 metal mononuclear metallate anions have a charge of −2.

Preferably, the central metal atom of the one or more Group 6 metal mononuclear metallate anions is ligated to four atoms.

Preferably, the one or more Group 6 metal mononuclear metallate anions comprises one or more of the following ligands coordinated to the central metal atom of the anion: $BH_3$, $BF_3$, $BCl_3$, $BR_3$, $AlMe_3$, $SiF_4$, H, $CR_3$, —CR=$CR_2$, alkynyl, —COR, —$C_6H_5$, η-$CH_2CH$=$CH_2$, η-$C_5H_5$, $CF_3$, $C_6F_5$, $CH_2CMe_3$, $NR_2$, OR, —OOR, F, $SiR_3$, —$PR_2$, SR, Cl, $GeR_3$, $AsR_2$, SeR, Br, $SnR_3$, I, CN, SCN, NCS, $N_3$, OCN, NCO, $OSO_2R$, ONO, $ONO_2$, $OClO_3$, $OSiR_3$, Mn $(CO)_5$, Fe(η-$C_5H_5$)($CO_2$), Mo(η-$C_5H_5$)$(CO)_3$, Au($PPh_3$), HgCl, —$SCH_2CH_2S$—, oxalate, o-quinones, —$(S)_2$—, $SO_4$, $CO_3$, —$(O)_2$—, metallacycles —$(CH_2)_n$—, where n=2, 3 or 4, =$CR_2$, =NR, =O, =S, =C=$CR_2$, $NH_3$, $NR_3$, $OH_2$, $OR_2$, $PR_3$, $P(OR)_3$, $SR_2$, $SeR_2$, $AsR_3$, CO, $H_2C$=$CH_2$, $R_2C$=$CR_2$, RC≡CR, S=$CR_2$, $N_2$, $PF_3$, tetrahydrofuran, $Et_2O$, DMSO, RNC, RCN, pyridine, dimethyl sulfoxide, nitrogen, η-$C_3H_5$, acetylacetone, dimethylglyoxime, η-acetato, η-$O_2CR$, η-$S_2CNR_2$, η-$S_2PR_2$, $NH_2CH_2CO_2$—, $BF_4$, $BH_4$, NO, $NR_2$, η-$C_4H_4$, NR, η-$C_4H_4$, bipyridyl, o-phenanthroline, ethylenediamine, RS(CH)$_2$SR, diphosphines, N($CH_2COO$)$_3$, η-$C_5H_5$, dienyls, 1,5,-diazacyclooctane-N,N'-diacetate, i-benzene, (i-arene), η-$C_7H_5$, RSi$(CH_2PMe_2)_3$, η-$C_7H_7$, ethylenediaminetetraacetic acid, η-$C_5H_4(CH_2)_3NR$, η-$C_5H_4(CH_2)_3NR$, η-$C_5H_4(CH_2)_3N$=, P(bipy)$_3$, [FB(ONCH$C_5H_3$)$_3$P], wherein R is hydrocarbyl, preferably wherein R is alkyl or alkenyl.

Preferably, the one or more Group 6 metal mononuclear metallate anions is of the formula:

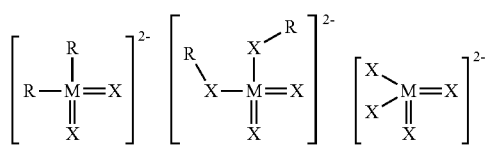

wherein M=Cr, Mo, W or Sg; wherein at least one X=S, wherein the other X are independently selected from O, S, Se or Te, and wherein each R is independently selected from alkyl, alkenyl, aryl, alkylaryl or arylalkyl moieties, such as $C_1$ to $C_{10}$ alkyl, $C_1$ to $C_{10}$ alkenyl, $C_1$ to $C_{10}$ aryl, $C_1$ to $C_{10}$ alkylaryl, or $C_1$ to $C_{10}$ arylalkyl moieties, wherein said alkyl, alkenyl, aryl, alkylaryl or arylalkyl moieties are optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2(C_1$ to $C_6)$alkyl, and —OC(O)($C_1$ to $C_6$)alkyl.

More preferably, M=Mo, and wherein the other X are independently selected from O or S.

Most preferably, M=Mo and each X=S. In a preferred instance, the one or more ionic liquids have the formula:

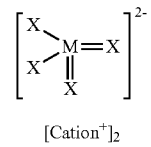

[Cation$^+$]$_2$ wherein M=Mo; and wherein X=S.

Preferably, the one or more cations comprise one or more cations selected from a quaternary ammonium cation, a quaternary phosphonium cation, a quaternary sulphonium cation, or any combination thereof.

In one preferable instance, the one or more cations comprise one or more cations selected from the following structures:

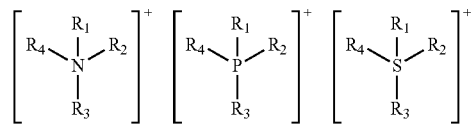

wherein $R_1$, $R_2$, $R_3$ and $R_4$ are independently selected from $C_1$ to $C_{30}$ straight chain or branched alkyl and alkenyl groups; $C_3$ to $C_6$ cycloalkyl groups; $C_1$ to $C_{30}$ arylalkyl groups; $C_1$ to $C_{30}$ alkylaryl groups; aryl groups; or any two of $R_1$, $R_2$, $R_3$ and $R_4$ combine to form an alkylene chain —(CH$_2$)$_q$— wherein q is from 3 to 6; wherein any one or more of said straight or branched chain alkyl and alkenyl groups, cycloalkyl groups, arylalkyl groups, alkylaryl groups; aryl groups or alkylene chains are optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2(C_1$ to $C_6)$alkyl, and —OC(O)($C_1$ to $C_6$)alkyl.

Preferably, $R_1$, $R_2$, $R_3$ and $R_4$ are $C_1$ to $C_{30}$ straight chain or branched alkyl and alkenyl groups, preferably $C_1$ to $C_{30}$ straight chain or branched alkyl groups.

Preferably, $R_1$, $R_2$, $R_3$ and $R_4$ are $C_4$ to $C_{18}$ straight chain or branched alkyl groups, preferably $C_4$ to $C_{18}$ straight chain alkyl groups.

Preferably, $R_1$, $R_2$ and $R_3$ are the same and $R_4$ is different to $R_1$, $R_2$ and $R_3$.

Preferably $R_1$, $R_2$ and $R_3$ are $C_4$ to $C_{10}$ straight chain alkyl and wherein $R_4$ is $C_{11}$ to $C_{18}$ straight chain alkyl.

Preferably, $R_1$, $R_2$ and $R_3$ are hexyl and wherein $R_4$ is tetradecyl.

Preferably, the one or more cations comprise a phosphonium cation.

Preferably, the ionic liquid comprises a compound of the following formula:

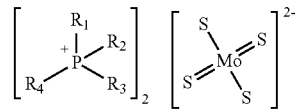

wherein $R_1$, $R_2$ and $R_3$ are hexyl and wherein $R_4$ is tetradecyl.

In another preferable instance, the one or more cations comprise one or more cations selected from the following structures:

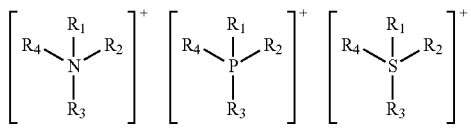

wherein at least one of $R_1$, $R_2$, $R_3$ and $R_4$ have the formula —$R_5O(C=O)R_6$ or —$R_5(C=O)$—O—$R_6$, wherein $R_5$ is a $C_1$ to $C_{10}$ straight chain or branched alkyl or alkenyl group, or a $C_3$ to $C_6$ cycloalkyl or cycloalkenyl group; and $R_6$ is a $C_1$ to $C_{30}$ straight chain or branched alkyl or alkenyl group; a $C_3$ to $C_6$ cycloalkyl group; a $C_1$ to $C_{30}$ arylalkyl group; a $C_1$ to $C_{30}$ alkylaryl group; an aryl group; or any two respective $R_6$ groups combine to form an alkylene chain —$(CH_2)_q$— wherein q is from 3 to 6; wherein $R_5$ and/or $R_6$ are optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2(C_1$ to $C_6)$alkyl, and —OC(O)($C_1$ to $C_6$)alkyl;

and wherein the other of $R_1$, $R_2$, $R_3$ and $R_4$ that are not as defined above are independently selected from $C_1$ to $C_{30}$ straight chain or branched alkyl and alkenyl groups such as $C_1$ to $C_{10}$ alkyl or alkenyl groups; $C_3$ to $C_6$ cycloalkyl groups; $C_1$ to $C_{30}$ arylalkyl groups; $C_1$ to $C_{30}$ alkylaryl groups; aryl groups; or any two of $R_1$, $R_2$, $R_3$ and $R_4$ combine to form an alkylene chain —$(CH_2)_q$— wherein q is from 3 to 6; wherein any one or more of said straight or branched chain alkyl and alkenyl groups, cycloalkyl groups, arylalkyl groups, alkylaryl groups; aryl groups or alkylene chains is optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2(C_1$ to $C_6)$alkyl, and —OC(O)($C_1$ to $C_6$)alkyl.

In another preferable instance, the one or more cations comprise one or more cations selected from the following structures:

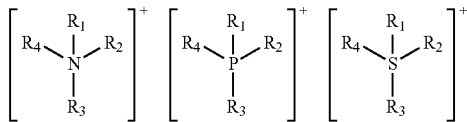

wherein at least one of $R_1$, $R_2$, $R_3$ and $R_4$ have the formula —$R_5$—N($R_7$)—(C=O)$R_6$ or —$R_5(C=O)$—N($R_7$)—$R_6$, wherein $R_5$ and $R_6$ are as defined above, and wherein $R_7$ is selected from H; a $C_1$ to $C_{30}$ straight chain or branched alkyl or alkenyl group; a $C_3$ to $C_6$ cycloalkyl group; a $C_1$ to $C_{30}$ arylalkyl group; a $C_1$ to $C_{30}$ alkylaryl group; an aryl group; or any two respective $R_6$ groups combine to form an alkylene chain —$(CH_2)_q$— wherein q is from 3 to 6; wherein $R_5$ and/or $R_6$ are optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2(C_1$ to $C_6)$alkyl, and —OC(O)($C_1$ to $C_6$)alkyl;

and wherein the other of $R_1$, $R_2$, $R_3$ and $R_4$ that are not as defined above are independently selected from $C_1$ to $C_{30}$ straight chain or branched alkyl and alkenyl groups such as $C_1$ to $C_{10}$ alkyl or alkenyl groups; $C_3$ to $C_6$ cycloalkyl groups; $C_1$ to $C_{30}$ arylalkyl groups; $C_1$ to $C_{30}$ alkylaryl groups; aryl groups; or any two of $R_1$, $R_2$, $R_3$ and $R_4$ combine to form an alkylene chain —$(CH_2)_q$— wherein q is from 3 to 6; wherein any one or more of said straight or branched chain alkyl and alkenyl groups, cycloalkyl groups, arylalkyl groups, alkylaryl groups; aryl groups or alkylene chains is optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2(C_1$ to $C_6)$alkyl, and —OC(O)($C_1$ to $C_6$)alkyl.

In the instances described above, preferably, three of $R_1$, $R_2$, $R_3$ and $R_4$ have the formula —$R_5O(C=O)R_6$; —$R_5$(C=O)—O—$R_6$; —$R_5$—N($R_7$)—(C=O)$R_6$; or —$R_5$(C=O)—N($R_7$)—$R_6$; wherein $R_5$, $R_6$ and $R_7$ are as defined above. More preferably, three of $R_1$, $R_2$, $R_3$ and $R_4$ have the formula —$R_5O(C=O)R_6$. Preferably, the cation comprises a quaternary ammonium cation. Most preferably, the cation comprises a quaternary ammonium cation; $R_1$, $R_2$, and $R_3$ have the formula —$R_5O(C=O)R_6$ wherein $R_5$ is $C_2H_4$; and wherein $R_4$ is $C_1$ to $C_5$ alkyl, preferably methyl.

In another preferable instance, the cation comprises a substituted quaternary imidazolium cation comprising at least one ester group, or a substituted quaternary imidazolium cation comprising at least one amide group.

In other instances, the cation may comprise a cationic species selected from: ammonium, azaannulenium, azathiazolium, benzimidazolium, benzofuranium, benzothiophenium, benzotriazolium, borolium, cinnolinium, diazabicyclodecenium, diazabicyclononenium, 1,4-diazabicyclo[2.2.2]octanium, diazabicyclo-undecenium, dibenzofuranium, dibenzothiophenium, dithiazolium, dithiazolium, furanium, guanidinium, imidazolium, indazolium, indolinium, indolium, morpholinium, oxaborolium, oxaphospholium, oxazinium, oxazolium, iso-oxazolium, oxazolinium, pentazolium oxothiazolium, phospholium, phosphonium, phthalazinium, piperazinium, piperidinium, pyranium, pyrazinium, pyrazolium, pyridazinium, pyridinium, pyrimidinium, pyrrolidinium, pyrrolium, quinazolinium, quinolinium, isoquinolinium, quinoxalinium, quinuclidinium, selenazolium, sulfonium, tetrazolium, thiadiazolium, iso-thiadiazolium, thiazinium, thiazolium, iso-thiazolium, thiophenium, thiuronium, triazadecenium, triazinium, triazolium, iso-triazolium, and uranium, or a combination thereof.

Preferably, the ionic liquid is a liquid at a temperature of 100° C. and above, preferably 50° C. and above.

Preferably, the ionic liquid is a liquid at a temperature of 25° C. and above, preferably 20° C. and above, more preferably 10° C. and above, and most preferably 0° C. and above.

Preferably, the ionic liquid comprises less than 5 wt % halide, preferably less than 2.5 wt. % halide, and most preferably less than 1 wt. % halide.

Preferably, the ionic liquid comprises less than 0.5 wt % halide, and preferably less than 0.1 wt. % halide.

Preferably, the ionic liquid is free of halide.

Preferably, the composition does not comprise a urea thickener or a substituted urea thickener.

Preferably, the composition comprises the one or more ionic liquids in an amount of from 0.1 wt. % to 20 wt. %, preferably from 0.1 wt. % to 10 wt. %, and most preferably from 0.1 wt. % to 5 wt. %.

Preferably, the composition comprises the one or more ionic liquids in an amount of from 0.5 wt. % to 1.5 wt. %.

Preferably, the one or more base oils are present in the composition in an amount of from 75% to 99% by weight of the lubricant composition.

Preferably, the one or more base oils comprise one or more base stocks selected from Group I base stocks, Group II base stocks, Group III base stocks, Group IV base stocks and Group V base stocks.

Preferably, the one or more base oils comprise one or more synthetic oils selected from polyalpha-olefins, synthetic esters, polyalkylene glycols, phosphate esters, alkylated naphthalenes, silicate esters, ionic fluids, or multiply alkylated cyclopentanes.

Preferably, the lubricating oil composition of the invention further comprises one or more additives optionally selected from one or more pour point additives, anti-foaming additives, viscosity index improvers, antioxidants, detergents, corrosion inhibitors, anti-wear additives, friction modifiers, extreme pressure additives, or any combination thereof.

According to a further aspect of the invention, there is provided a method of producing a lubricating oil composition according to the invention, comprising the steps of combining one or more base oils with one or more ionic liquids, and optionally one or more additives.

According to a further aspect of the invention, there is provided a method of operating industrial machinery, a spark ignition engine or a compression ignition engine comprising lubricating said machine or engine with a lubricating oil composition according to any preceding claim.

According to a further aspect of the invention, there is provided an ionic liquid comprising one or more cations selected from a quaternary phosphonium cation, a quaternary sulphonium cation, a quaternary ammonium cation comprising at least one amide group, a quaternary ammonium cation comprising at least one ester group, a substituted quaternary imidazolium ion comprising at least one ester group, a substituted quaternary imidazolium ion comprising at least one amide group, azaannulenium, azathiazolium, benzimidazolium, benzofuranium, benzothiophenium, benzotriazolium, borolium, cinnolinium, diazabicyclodecenium, diazabicyclononenium, 1,4-diazabicyclo[2.2.2]octanium, diazabicyclo-undecenium, dibenzofuranium, dibenzothiophenium, dithiazolium, dithiazolium, furanium, guanidinium, imidazolium, indazolium, indolinium, indolium, morpholinium, oxaborolium, oxaphospholium, oxazinium, oxazolium, iso-oxazolium, oxazolinium, pentazolium oxothiazolium, phospholium, phosphonium, phthalazinium, piperazinium, piperidinium, pyranium, pyrazinium, pyrazolium, pyridazinium, pyridinium, pyrimidinium, pyrrolidinium, pyrrolium, quinazolinium, quinolinium, isoquinolinium, quinoxalinium, quinuclidinium, selenazolium, sulfonium, tetrazolium, thiadiazolium, isothiadiazolium, thiazinium, thiazolium, iso-thiazolium, thiophenium, thiuronium, triazadecenium, triazinium, triazolium, iso-triazolium, and uranium, or a combination thereof; and one or more Group 6 metal mononuclear metallate anions, wherein the one or more Group 6 metal mononuclear metallate anions comprise at least one metal sulphur bond.

Preferably, the ionic liquid is as described above in accordance with lubricating oil compositions according to the invention, with the proviso that said ionic liquid is within the scope of those described in the paragraph directly above.

In one preferable instance, the one or more cations comprise one or more cations selected from the following structures.

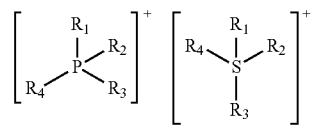

wherein $R_1$, $R_2$, $R_3$ and $R_4$ are independently selected from $C_1$ to $C_{30}$ straight chain or branched alkyl and alkenyl groups; $C_3$ to $C_6$ cycloalkyl groups; $C_1$ to $C_{30}$ arylalkyl groups; $C_1$ to $C_{30}$ alkylaryl groups; aryl groups; or any two of $R_1$, $R_2$, $R_3$ and $R_4$ combine to form an alkylene chain —$(CH_2)_q$— wherein q is from 3 to 6; wherein any one or more of said straight or branched chain alkyl and alkenyl groups, cycloalkyl groups, arylalkyl groups, alkylaryl groups; aryl groups or alkylene chains are optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2(C_1$ to $C_6)$alkyl, and —OC(O)($C_1$ to $C_6$)alkyl.

Preferably, $R_1$, $R_2$, $R_3$ and $R_4$ are $C_1$ to $C_{30}$ straight chain or branched alkyl and alkenyl groups, preferably $C_1$ to $C_{30}$ straight chain or branched alkyl groups.

Preferably, $R_1$, $R_2$, $R_3$ and $R_4$ are $C_4$ to $C_{18}$ straight chain or branched alkyl groups, preferably $C_4$ to $C_{18}$ straight chain alkyl groups.

Preferably, $R_1$, $R_2$ and $R_3$ are the same and $R_4$ is different to $R_1$, $R_2$ and $R_3$.

Preferably, $R_1$, $R_2$ and $R_3$ are $C_4$ to $C_{10}$ straight chain alkyl and wherein $R_4$ is $C_{11}$ to $C_{18}$ straight chain alkyl.

Preferably, $R_1$, $R_2$ and $R_3$ are hexyl and $R_4$ is tetradecyl.

Preferably, the ionic liquid comprises a compound of the following formula:

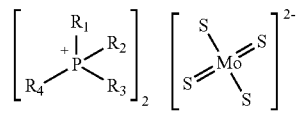

wherein $R_1$, $R_2$ and $R_3$ are hexyl and wherein $R_4$ is tetradecyl.

In another preferable instance, the one or more cations comprise one or more cations selected from the following structures:

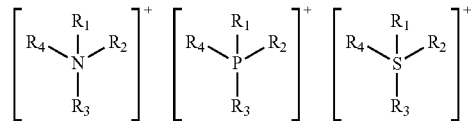

wherein at least one of $R_1$, $R_2$, $R_3$ and $R_4$ have the formula —$R_5O(C=O)R_6$ or —$R_5(C=O)$—O—$R_6$, wherein $R_5$ is a $C_1$ to $C_{10}$ straight chain or branched alkyl or alkenyl group, or a $C_3$ to $C_6$ cycloalkyl or cycloalkenyl group; and $R_6$ is a $C_1$ to $C_{30}$ straight chain or branched alkyl or alkenyl group; a $C_3$ to $C_6$ cycloalkyl group; a $C_1$ to $C_{30}$ arylalkyl group; a $C_1$ to $C_{30}$ alkylaryl group; an aryl group; or any two respective $R_6$ groups combine to form an alkylene chain —$(CH_2)_q$— wherein q is from 3 to 6; wherein $R_5$ and/or $R_6$ are optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2(C_1$ to $C_6)$alkyl, and —OC(O)($C_1$ to $C_6$)alkyl;

and wherein the other of $R_1$, $R_2$, $R_3$ and $R_4$ that are not as defined above are independently selected from $C_1$ to $C_{30}$ straight chain or branched alkyl and alkenyl groups such as $C_1$ to $C_{10}$ alkyl or alkenyl groups; $C_3$ to $C_6$ cycloalkyl groups; $C_1$ to $C_{30}$ arylalkyl groups; $C_1$ to $C_{30}$ alkylaryl groups; aryl groups; or any two of $R_1$, $R_2$, $R_3$ and $R_4$ combine to form an alkylene chain —$(CH_2)_q$— wherein q is from 3 to 6; wherein any one or more of said straight or branched chain alkyl and alkenyl groups, cycloalkyl groups, arylalkyl groups, alkylaryl groups; aryl groups or alkylene chains is optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2(C_1$ to $C_6)$alkyl, and —OC(O)($C_1$ to $C_6$)alkyl.

In another preferred instance, the one or more cations comprise one or more cations selected from the following structures:

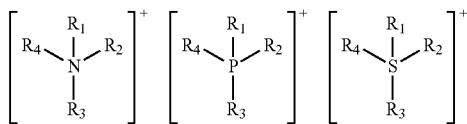

wherein at least one of $R_1$, $R_2$, $R_3$ and $R_4$ have the formula —$R_5$—N($R_7$)—(C=O)$R_6$ or —$R_5$(C=O)—N($R_7$)—$R_6$, wherein $R_5$ and $R_6$ are as defined above, and wherein $R_7$ is selected from H; a $C_1$ to $C_{30}$ straight chain or branched alkyl or alkenyl group; a $C_3$ to $C_6$ cycloalkyl group; a $C_1$ to $C_{30}$ arylalkyl group; a $C_1$ to $C_{30}$ alkylaryl group; an aryl group; or any two respective $R_6$ groups combine to form an alkylene chain —$(CH_2)_q$— wherein q is from 3 to 6; wherein $R_5$ and/or $R_6$ are optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2$($C_1$ to $C_6$)alkyl, and —OC(O)($C_1$ to $C_6$)alkyl;

and wherein the other of $R_1$, $R_2$, $R_3$ and $R_4$ that are not as defined above are independently selected from $C_1$ to $C_{30}$ straight chain or branched alkyl and alkenyl groups such as $C_1$ to $C_{10}$ alkyl or alkenyl groups; $C_3$ to $C_6$ cycloalkyl groups; $C_1$ to $C_{30}$ arylalkyl groups; $C_1$ to $C_{30}$ alkylaryl groups; aryl groups; or any two of $R_1$, $R_2$, $R_3$ and $R_4$ combine to form an alkylene chain —$(CH_2)_q$— wherein q is from 3 to 6; wherein any one or more of said straight or branched chain alkyl and alkenyl groups, cycloalkyl groups, arylalkyl groups, alkylaryl groups; aryl groups or alkylene chains is optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2(C_1$ to $C_6$)alkyl, and —OC(O)($C_1$ to $C_6$)alkyl.

In the instances described above, preferably, three of $R_1$ $R_2$, $R_3$ and $R_4$ have the formula —$R_5$O(C=O)$R_6$; —$R_5$(C=O)—O—$R_6$; —$R_5$—N($R_7$)—(C=O)$R_6$; or —$R_5$(C=O)—N($R_7$)—$R_6$; wherein $R_5$, $R_6$ and $R_7$ are as defined above. More preferably, three of $R_1$ $R_2$, $R_3$ and $R_4$ have the formula —$R_5$O(C=O)$R_6$. Still more preferably, the cation comprises a quaternary ammonium cation. Most preferably, the cation comprises a quaternary ammonium cation; $R_1$ $R_2$, and $R_3$ have the formula —$R_5$O(C=O)$R_6$ wherein $R_5$ is $C_2H_4$; and wherein $R_4$ is $C_1$ to $C_5$ alkyl, preferably methyl.

Preferably, the ionic liquid is a liquid at a temperature of 100° C. and above, preferably 50° C. and above.

Preferably, the ionic liquid is a liquid at a temperature of 25° C. and above, preferably 20° C. and above, more preferably 10° C. and above, and most preferably 0° C. and above.

Preferably, the ionic liquid comprises less than 5 wt % halide, preferably less than 2.5 wt. % halide, and most preferably less than 1 wt. % halide.

Preferably, the ionic liquid comprises less than 0.5 wt % halide, and preferably less than 0.1 wt. % halide.

Preferably, the ionic liquid is free of halide.

According to a further aspect of the invention, there is provided the use of an ionic liquid according to the invention, or as described above in the context of a lubricating oil composition according to the invention, in a lubricating oil composition, for the purpose of improving the anti-friction properties of the lubricating oil composition and/or for the purpose of improving the anti-wear properties of the lubricating oil composition.

Preferably, the lubricating oil composition is according to the present invention.

Preferably, the ionic liquid is used for the purpose of improving the anti-friction properties of the lubricating oil composition.

Preferably, the ionic liquid is used for the purpose of improving the anti-wear properties of the lubricating oil composition.

According to a further aspect of the invention, there is provided an additive concentrate for use in a lubricating oil composition, wherein the additive concentrate comprises an ionic liquid according to the present invention, or as described above in the context of a lubricating oil composition according to the invention, and one or more further additives selected from one or more pour point additives, anti-foaming additives, viscosity index improvers, antioxidants, detergents, corrosion inhibitors, anti-wear additives, friction modifiers, extreme pressure additives, or any combination thereof.

BRIEF DESCRIPTION OF THE DRAWINGS

FIG. 15 depicts electrochemical polarisation data for various metal surfaces exposed to several ionic liquids of the invention.

DETAILED DESCRIPTION OF THE INVENTION

Figure 1:
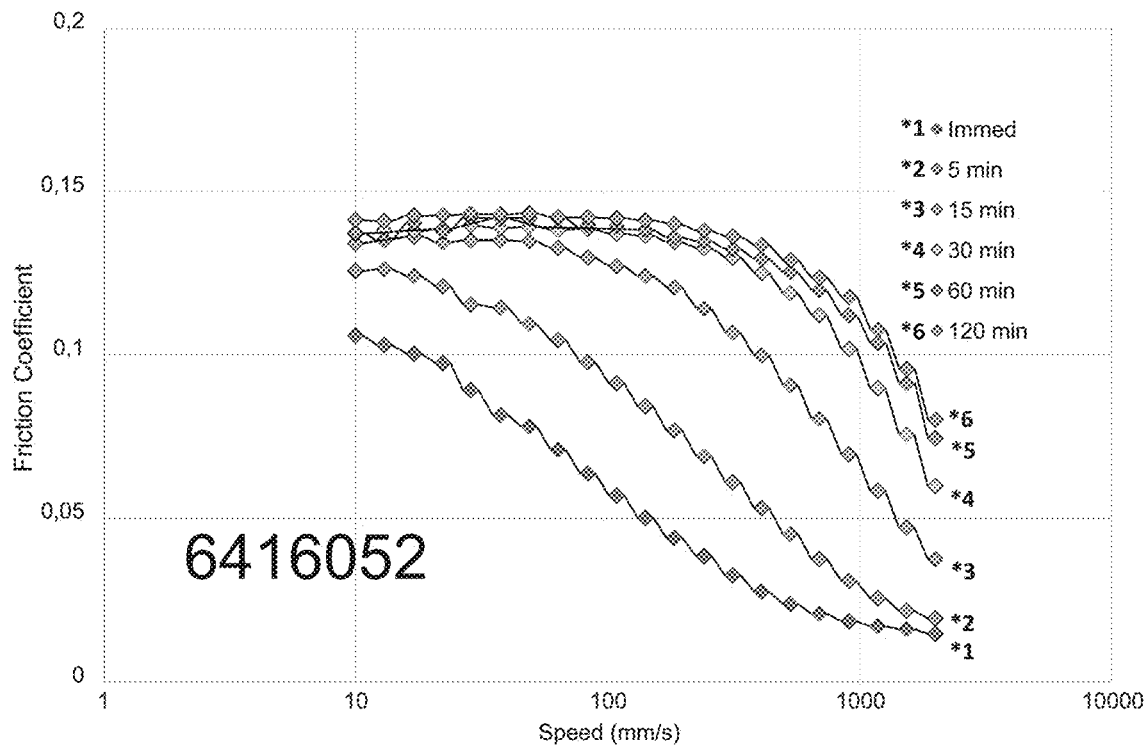
FIG. 1 is a graph depicting change in coefficient of friction with speed of a lubricating oil composition that does not comprise any friction reducing or anti-wear additives.

Lubricants typically require multiple additives in order to improve the overall performance. The class of compounds described in this application when used as a single component additive or in combination with other lubricant additives imparts improved friction reduction and/or wear reduction performance over the base lubricant. Another benefit is that the compounds are ionic liquids.

Ionic Liquid Additives

The term "ionic liquid" as used herein refers to a liquid that is capable of being produced by melting a salt, and when so produced consists solely of ions. An ionic liquid may be formed from a homogeneous substance comprising one species of cation and one species of anion, or it can be composed of more than one species of cation and/or more than one species of anion. Thus, an ionic liquid may be composed of more than one species of cation and one species of anion. An ionic liquid may further be composed of one species of cation, and one or more species of anion. Still further, an ionic liquid may be composed of more than one species of cation and more than one species of anion.

The term "ionic liquid" includes compounds having both high melting points and compounds having low melting points, e.g. at or below room temperature. Thus, many ionic liquids have melting points below 200° C., preferably below 150° C., particularly below 100° C., around room temperature (15 to 30° C.), or even below 0° C. Ionic liquids having melting points below around 30° C. are commonly referred to as "room temperature ionic liquids". In room temperature ionic liquids, the structures of the cation and anion prevent the formation of an ordered crystalline structure and therefore the salt is liquid at room temperature.

Ionic liquids are most widely known as solvents, because of their negligible vapour pressure, temperature stability, low flammability and recyclability make them environmentally friendly. Due to the vast number of anion/cation combinations that are available it is possible to fine-tune the physical properties of the ionic liquid (e.g. melting point, density, viscosity, and miscibility with water or organic solvents) to suit the requirements of a particular application.

The ionic liquids of the present disclosure comprise one or more Group 6 metal mononuclear metallate anions wherein the one or more Group 6 metal mononuclear metallate anions comprise at least one metal sulphur bond.

The term mononuclear as used herein is used to refer to anions that contain one central metal atom with one or more ligands bonded thereto. This is in contrast to binuclear and polynuclear anionic complexes that comprise more than one metal centre, where each metal centre has one or more ligands bonded thereto, where some ligands may be described as "bridging ligands" between the metal centres.

The anion preferably comprises a molybdenum atom, although other group 6 metals may instead be present in the anion such as chromium, Tungsten and Seaborgium. The charge of the anion may be −1, −2 or −3. In preferable instances, the charge of the anion is −2. In preferable instances, the metal of the anion is molybdenum and the charge of the anion is −2.

The anion may have any possible coordination geometry of the ligands around the central metal atom. Preferably, the central metal atom of the anion such as molybdenum has four atoms ligated thereto, although it will be understood by the skilled person that the anion may have different coordination geometries with different numbers of ligating atoms bonded to the central metal atom.

The Group 6 metal mononuclear metallate anion comprises at least one metal to sulphur bond. That is, the anion comprises a central metal atom chemically bonded to at least one sulphur atom. This chemical bond may be a single covalent bond, or a double covalent bond.

The Group 6 metal mononuclear metallate anion may also comprise additional ligands to sulphur. Alternatively, the central metal atom may be ligated to only sulphur atoms.

Examples of other ligands that may be bonded to the central metal atom of the Group 6 metal mononuclear metallate anion include the following ligands: $BH_3$, $BF_3$, $BCl_3$, $BR_3$, $AlMe_3$, $SiF_4$, H, $CR_3$, —CR=$CR_2$, alkynyl, —COR, —$C_6H_5$, η-$CH_2CH$=$CH_2$, η-$C_5H_5$, $CF_3$, $C_6F_5$, $CH_2CMe_3$, $NR_2$, OR, —OOR, F, $SiR_3$, —$PR_2$, SR, Cl, $GeR_3$, $AsR_2$, SeR, Br, $SnR_3$, I, CN, SCN, NCS, $N_3$, OCN, NCO, $OSO_2R$, ONO, $ONO_2$, $OClO_3$, $OSiR_3$, Mn $(CO)_5$, Fe(η-$C_5H_5$)($CO_2$), Mo(η-$C_5H_5$)$(CO)_3$, Au($PPh_3$), HgCl, —$SCH_2CH_2S$—, oxalate, o-quinones, —$(S)_2$—, $SO_4$, $CO_3$, —$(O)_2$—, metallacycles —$(CH_2)_n$—, where n=2, 3 or 4, =$CR_2$, =NR, =O, =S, =C=$CR_2$, $NH_3$, $NR_3$, $OH_2$, $OR_2$, $PR_3$, $P(OR)_3$, $SR_2$, $SeR_2$, $AsR_3$, CO, $H_2C$=$CH_2$, $R_2C$=$CR_2$, RC=CR, S=$CR_2$, $N_2$, $PF_3$, tetrahydrofuran, $Et_2O$, DMSO, RNC, RCN, pyridine, dimethyl sulfoxide, nitrogen, η-$C_3H_5$, acetylacetone, dimethylglyoxime, η-acetato, η-$O_2CR$, η-$S_2CNR_2$, η-$S_2PR_2$, $NH_2CH_2CO_2$—, $BF_4$, $BH_4$, NO, $NR_2$, η-$C_4H_4$, NR, η-$C_4H_4$, bipyridyl, o-phenanthroline, ethylenediamine, RS(CH)$_2$SR, diphosphines, N($CH_2COO$)$_3$, η-$C_5H_5$, dienyls, 1,5,-diazacyclooctane-N,N'-diacetate, i-benzene, (i-arene), η-$C_7H_8$, RSi($CH_2PMe_2$)$_3$, η-$C_7H_7$, ethylenediaminetetraacetic acid, η-$C_5H_4(CH_2)_3NR$, η-$C_5H_4(CH_2)_3NR$, η-$C_5H_4(CH_2)_3N$=, P(bipy)$_3$, [FB(ONCHC$_5$H$_3$)$_3$P], wherein R is hydrocarbyl, preferably wherein R is alkyl or alkenyl.

However, it will be understood by the skilled person that the above list of ligands is not exhaustive, and that other ligands may also be ligated to the central metal atom of the anion.

Examples of ligands that can be present in Group 6 metal metallate anions of the present disclosure are discussed at length in the textbook, "Molybdenum: An outline of its Chemistry and Uses", Chapter 2, by M. L. H. Green, available from Elsevier, Amsterdam, 1994. ISBN 0-444-88198-0. This reference also contains a detailed discussion of the various types of ligands that can be present in molybdenum compounds and anions, the classification of said ligands into different classes, and the different possible coordination geometries around the molybdenum atom. The reference also contains examples of various molybdenum complexes and anions. Any of the ligands discussed in said reference may be present in molybdenum containing anions of the present disclosure.

The Group 6 metal mononuclear metallate anions of the present disclosure contain at least one sulphur atom ligated to a central metal atom. The anion may contain more than one sulphur atom such as one, two, three or four sulphur atoms. Preferably, each sulphur atom in the anion is ligated to the central metal atom.

In preferable instances, the anion contains four or two sulphur atoms ligated to the central metal atom. In preferable instances, the anion has a −2 charge, and comprises two or four sulphur atoms ligated to a central molybdenum atom.

In some instances, the anion has a charge of −2 and contains four atoms ligated to a central molybdenum atom. In some instances, one, two or three of these ligating atoms are sulphur, with the other ligating atoms being oxygen. However, in preferable, instances, each of the four ligating atoms are sulphur.

In a highly preferable embodiment, the anion is [MoS$_4$]$_2$—.

In other embodiments, the anion comprises molybdenum and four ligating atoms, wherein one ligating atom is sulphur, one ligating atom is oxygen, and the other two ligating atoms are carbon atoms of a hydrocarbyl moiety. In other embodiments, the anion comprises molybdenum and four ligating atoms, wherein two ligating atoms are sulphur, and the other two ligating atoms are carbon atoms of a hydrocarbyl moiety.

In highly preferable embodiments, the one or more Group 6 metal mononuclear metallate anions are of the formula:

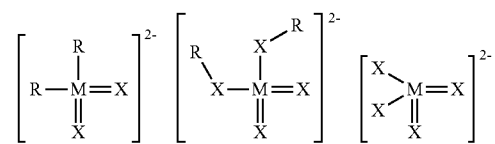

wherein M=Mo; wherein X=S, and wherein each R is independently selected from alkyl, alkenyl, aryl, alkylaryl or arylalkyl moieties, wherein said alkyl, alkenyl, aryl, alkylaryl or arylalkyl moieties are optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2(C_1$ to $C_6$)alkyl, and —OC(O)($C_1$ to $C_6$)alkyl.

Preferably, said alkyl, alkenyl, aryl, alkylaryl or arylalkyl moieties comprise from 1 to 10 carbon atoms. For example, $C_1$ to $C_{10}$ alkyl or cycloalkyl moieties, $C_1$ to $C_{10}$ alkenyl or cycloalkenyl moieties, $C_4$ to $C_8$ aryl moieties, $C_1$ to $C_{10}$ alkylaryl moieties, and $C_1$ to $C_{10}$ arylalkyl moieties.

The ionic liquids of the present disclosure comprise one or more cations. The ionic liquids may comprise any cation suitable for forming an ionic liquid with a Group 6 metal mononuclear metallate anion, wherein the one or more Group 6 metal mononuclear metallate anions comprise at least one metal sulphur bond.

Preferably, the one or more cations comprise a quaternary ammonium cation, a quaternary phosphonium cation, a quaternary sulphonium cation, or any combination thereof.

In instances of the present disclosure, the one or more cations comprise one or more cations selected from the following structures:

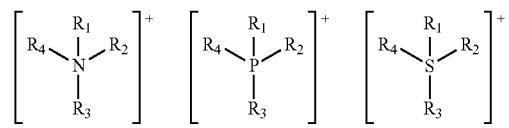

wherein $R_1$, $R_2$, $R_3$ and $R_4$ are independently selected from $C_1$ to $C_{30}$ straight chain or branched alkyl and alkenyl groups; $C_3$ to $C_6$ cycloalkyl groups; $C_1$ to $C_{30}$ arylalkyl groups; $C_1$ to $C_{30}$ alkylaryl groups; aryl groups; or any two of $R_1$, $R_2$, $R_3$ and $R_4$ combine to form an alkylene chain —$(CH_2)_q$— wherein q is from 3 to 6; wherein any one or more of said straight or branched chain alkyl and alkenyl groups, cycloalkyl groups, arylalkyl groups, alkylaryl groups; aryl groups or alkylene chains are optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2(C_1$ to $C_6$)alkyl, and —OC(O)($C_1$ to $C_6$)alkyl. Preferably, $R_1$, $R_2$, $R_3$ and $R_4$ are $C_1$ to $C_{30}$ straight chain or branched alkyl and alkenyl groups, preferably $C_1$ to $C_{30}$ straight chain or branched alkyl groups. More preferably, $R_1$, $R_2$, $R_3$ and $R_4$ are $C_4$ to $C_{18}$ straight chain or branched alkyl groups, preferably $C_4$ to $C_{18}$ straight chain alkyl groups. Still more preferably, $R_1$, $R_2$ and $R_3$ are the same and $R_4$ is different to $R_1$, $R_2$ and $R_3$. Still more preferably, $R_1$, $R_2$ and $R_3$ are $C_4$ to $C_{10}$ straight chain alkyl and wherein $R_4$ is $C_{11}$ to $C_{18}$ straight chain alkyl. Most preferably, $R_1$, $R_2$ and $R_3$ are hexyl and wherein $R_4$ is tetradecyl. Most preferably, the one or more cations comprise a phosphonium cation. Most preferably, the ionic liquid comprises a compound of the following formula:

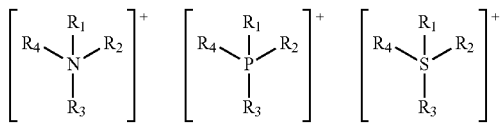

wherein $R_1$, $R_2$ and $R_3$ are hexyl and wherein $R_4$ is tetradecyl. This is the ionic liquid bis(trihexyltetradecyl phosphonium) tetrathiomolybdate.

In other instances, the one or more cations comprise one or more cations selected from the following structures:

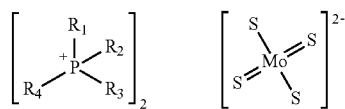

wherein at least one of $R_1$, $R_2$, $R_3$ and $R_4$ have the formula $-R_5O(C=O)R_6$ or $-R_5(C=O)-O-R_6$, wherein $R_5$ is a $C_1$ to $C_{10}$ straight chain or branched alkyl or alkenyl group, or a $C_3$ to $C_6$ cycloalkyl or cycloalkenyl group; and $R_6$ is a $C_1$ to $C_{30}$ straight chain or branched alkyl or alkenyl group; a $C_3$ to $C_6$ cycloalkyl group; a $C_1$ to $C_{30}$ arylalkyl group; a $C_1$ to $C_{30}$ alkylaryl group; an aryl group; or any two respective $R_6$ groups combine to form an alkylene chain $-(CH_2)_q-$ wherein q is from 3 to 6; wherein $R_5$ and/or $R_6$ are optionally substituted by one to three groups selected from: $C_1$ to $C_4$ alkoxy, $C_2$ to $C_8$ alkoxyalkoxy, $C_3$ to $C_6$ cycloalkyl, $-OH$, $-NH_2$, $-SH$, $-CO_2(C_1$ to $C_6)$alkyl, and $-OC(O)(C_1$ to $C_6)$alkyl;

and wherein the other of $R_1$, $R_2$, $R_3$ and $R_4$ that are not as defined above are independently selected from $C_1$ to $C_{30}$ straight chain or branched alkyl and alkenyl groups such as $C_1$ to $C_{10}$ alkyl or alkenyl groups; $C_3$ to $C_6$ cycloalkyl groups; $C_1$ to $C_{30}$ arylalkyl groups; $C_1$ to $C_{30}$ alkylaryl groups; aryl groups; or any two of $R_1$, $R_2$, $R_3$ and $R_4$ combine to form an alkylene chain $-(CH_2)_q-$ wherein q is from 3 to 6; wherein any one or more of said straight or branched chain alkyl and alkenyl groups, cycloalkyl groups, arylalkyl groups, alkylaryl groups; aryl groups or alkylene chains is optionally substituted by one to three groups selected from: $C_1$ to $C_4$ alkoxy, $C_2$ to $C_8$ alkoxyalkoxy, $C_3$ to $C_6$ cycloalkyl, $-OH$, $-NH_2$, $-SH$, $-CO_2(C_1$ to $C_6)$alkyl, and $-OC(O)(C_1$ to $C_6)$alkyl.

In other instances, the one or more cations comprise one or more cations selected from the following structures:

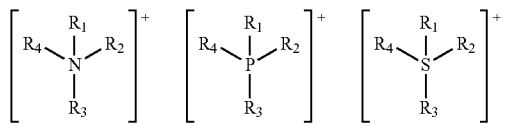

wherein at least one of $R_1$, $R_2$, $R_3$ and $R_4$ have the formula $-R_5-N(R_7)-(C=O)R_6$ or $-R_5(C=O)-N(R_7)-R_6$, wherein $R_5$ and $R_6$ are as defined above, and wherein $R_7$ is selected from H; a $C_1$ to $C_{30}$ straight chain or branched alkyl or alkenyl group; a $C_3$ to $C_6$ cycloalkyl group; a $C_1$ to $C_{30}$ arylalkyl group; a $C_1$ to $C_{30}$ alkylaryl group; an aryl group; or any two respective $R_6$ groups combine to form an alkylene chain $-(CH_2)_q-$ wherein q is from 3 to 6; wherein $R_5$ and/or $R_6$ are optionally substituted by one to three groups selected from: $C_1$ to $C_4$ alkoxy, $C_2$ to $C_8$ alkoxyalkoxy, $C_3$ to $C_6$ cycloalkyl, $-OH$, $-NH_2$, $-SH$, $-CO_2(C_1$ to $C_6)$alkyl, and $-OC(O)(C_1$ to $C_6)$alkyl;

and wherein the other of $R_1$, $R_2$, $R_3$ and $R_4$ that are not as defined above are independently selected from $C_1$ to $C_{30}$ straight chain or branched alkyl and alkenyl groups such as $C_1$ to $C_{10}$ alkyl or alkenyl groups; $C_3$ to $C_6$ cycloalkyl groups; $C_1$ to $C_{30}$ arylalkyl groups; $C_1$ to $C_{30}$ alkylaryl groups; aryl groups; or any two of $R_1$, $R_2$, $R_3$ and $R_4$ combine to form an alkylene chain $-(CH_2)_q-$ wherein q is from 3 to 6; wherein any one or more of said straight or branched chain alkyl and alkenyl groups, cycloalkyl groups, arylalkyl groups, alkylaryl groups; aryl groups or alkylene chains is optionally substituted by one to three groups selected from: $C_1$ to $C_4$ alkoxy, $C_2$ to $C_8$ alkoxyalkoxy, $C_3$ to $C_6$ cycloalkyl, $-OH$, $-NH_2$, $-SH$, $-CO_2(C_1$ to $C_6)$alkyl, and $-OC(O)(C_1$ to $C_6)$alkyl.

In the instances described above, preferably, three of $R_1$ $R_2$, $R_3$ and $R_4$ have the formula $-R_5O(C=O)R_6$; $-R_5(C=O)-O-R_6$; $-R_5-N(R_7)-(C=O)R_6$; or $-R_5(C=O)-N(R_7)-R_6$; wherein $R_5$, $R_6$ and $R_7$ are as defined above. More preferably, three of $R_1$ $R_2$, $R_3$ and $R_4$ have the formula $-R_5O(C=O)R_6$. Still more preferably, the cation comprises a quaternary ammonium cation. In a highly preferred instance, the cation comprises a quaternary ammonium cation; $R_1$ $R_2$, and $R_3$ have the formula $-R_5O(C=O)R_6$ wherein $R_5$ is $C_2H_4$; and wherein $R_4$ is $C_1$ to $C_5$ alkyl, preferably methyl.

Examples of cations discussed above include compounds known as ester quats, or amide quats. Examples of these are as follows:

Tri-alkanolamine esterquats of the formula:

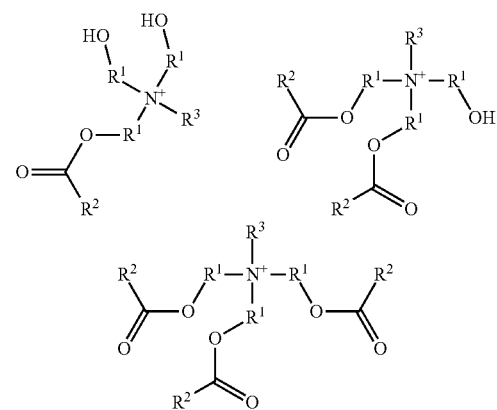

wherein R1 and R3=a straight chain or branched $C_1$ to $C_{10}$ alkyl or alkenyl, or $C_3$ to $C_6$ cycloalkyl or cycloalkenyl, and wherein R2=a $C_1$ to $C_{30}$ straight chain or branched alkyl or alkenyl group, or a or $C_3$ to $C_6$ cycloalkyl or cycloalkenyl group.

D-alkanolamine esterquats of the formula:

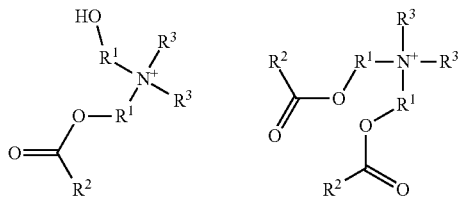

wherein R1 and R3=a straight chain or branched $C_1$ to $C_{10}$ alkyl or alkenyl, or $C_3$ to $C_6$ cycloalkyl or cycloalkenyl, and wherein R2=a $C_1$ to $C_{30}$ straight chain or branched alkyl or alkenyl group, or a or $C_3$ to $C_6$ cycloalkyl or cycloalkenyl group.

Diamidoamine quats of the formula:

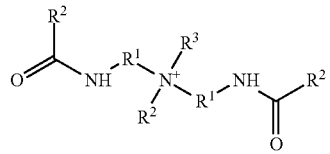

wherein R1 and R3=a straight chain or branched $C_1$ to $C_{10}$ alkyl or alkenyl, or $C_3$ to $C_6$ cycloalkyl or cycloalkenyl, and wherein R2=a $C_1$ to $C_{30}$ straight chain or branched alkyl or alkenyl group, or a or $C_3$ to $C_6$ cycloalkyl or cycloalkenyl group. In other instances, the cations of the ionic liquids of the present disclosure may comprise quaternary imidazolium cations. For example, the cations of the ionic liquids of the disclosure may comprise imidazolium rings, wherein the imidazolium ring is substituted with one or more hydrocarbyl moieties such as alkyl, alkenyl and cycloalkyl and cycloalkenyl moieties, for example $C_1$ to $C_{30}$ alkyl or alkenyl moieties, or $C_3$ to $C_7$ cycloalkyl or cycloalkenyl moieties. In some instances, said hydrocarbyl moieties may themselves be substituted or interrupted with one or more moieties comprising heteroatoms.

In preferable embodiments, the imidazolium ring of the cation is substituted at the 1, 2 or 3 position, and preferably at the 1, 2 and 3 position. More preferably, the quaternary imidazolium cation is substituted at the 1, 2 and 3 positions of the imidazolium ring with one or more hydrocarbyl moieties such as alkyl, alkenyl and cycloalkyl and cycloalkenyl moieties, which may themselves be substituted or optionally interrupted with functional groups comprising heteroatoms.

In preferable embodiments, the substituted quaternary imidazolium cations comprise at least one amide group or at least one ester group.

An example of imidazolium cations of the present disclosure are the following quaternary imidazolium cations defined by the following formula:

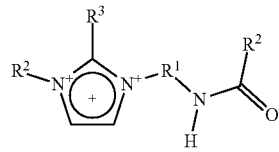

wherein R1 and R3=a straight chain or branched $C_1$ to $C_{10}$ alkyl or alkenyl, or $C_3$ to $C_6$ cycloalkyl or cycloalkenyl, and wherein R2=a $C_1$ to $C_{30}$ straight chain or branched alkyl or alkenyl group, or a or $C_3$ to $C_6$ cycloalkyl or cycloalkenyl group.

In some instances, the ionic liquids of the present disclosure may comprise one or more cationic species selected from: ammonium, azaannulenium, azathiazolium, benzimidazolium, benzofuranium, benzothiophenium, benzotriazolium, borolium, cinnolinium, diazabicyclodecenium, diazabicyclononenium, 1,4-diazabicyclo[2.2.2]octanium, diazabicyclo-undecenium, dibenzofuranium, dibenzothiophenium, dithiazolium, dithiazolium, furanium, guanidinium, imidazolium, indazolium, indolinium, indolium, morpholinium, oxaborolium, oxaphospholium, oxazinium, oxazolium, iso-oxazolium, oxazolinium, pentazolium oxothiazolium, phospholium, phosphonium, phthalazinium, piperazinium, piperidinium, pyranium, pyrazinium, pyrazolium, pyridazinium, pyridinium, pyrimidinium, pyrrolidinium, pyrrolium, quinazolinium, quinolinium, isoquinolinium, quinoxalinium, quinuclidinium, selenazolium, sulfonium, tetrazolium, thiadiazolium, iso-thiadiazolium, thiazinium, thiazolium, iso-thiazolium, thiophenium, thiuronium, triazadecenium, triazinium, triazolium, iso-triazolium, and uranium, or a combination thereof.

For example, in an embodiment, the cation may be selected from the guanidinium, cyclic guanidinium, uronium, cyclic uronium, thiuronium and cyclic thiuronium cations. For example, cations of the following formula:

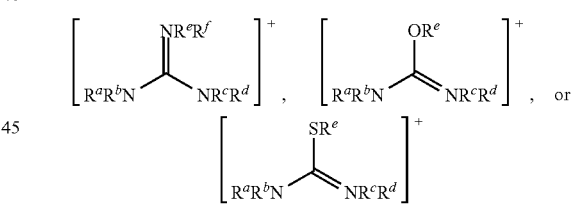

wherein: $R^a$, $R^b$, $R^c$, $R^d$, $R^e$, and $R^f$ are each independently selected from a $C_1$ to $C_{30}$, straight chain or branched alkyl group, a $C_3$ to $C_8$ cycloalkyl group, or a $C_6$ to $C_{10}$ aryl group, or any two of $R^a$, $R^b$, $R^c$, and $R^d$, attached to different nitrogen atoms form a methylene chain —$(CH_2)_q$— wherein q is from 2 to 5; wherein said alkyl, cycloalkyl or aryl groups or said methylene chain are unsubstituted or may be substituted by one to three groups selected from: $C_1$ to $C_6$ alkoxy, $C_2$ to $C_{12}$ alkoxyalkoxy, $C_3$ to $C_8$ cycloalkyl, $C_6$ to $C_{10}$ aryl, $C_7$ to $C_{10}$ alkaryl, $C_7$ to $C_{10}$ aralkyl, —CN, —OH, —SH, —$NO_2$, —$CO_2R^x$, —OC(O)$R^x$, —C(O)$R^x$, —C(S)$R^x$, —$CS_2R^x$, —SC(S)$R^x$, —S(O)($C_1$ to $C_6$)alkyl, —S(O)O($C_1$ to $C_6$)alkyl, —OS(O)($C_1$ to $C_6$)alkyl, —S($C_1$ to $C_6$)alkyl, —S—S($C_1$ to $C_6$ alkyl), —$NR^xC(O)NR^yR^z$, —$NR^xC(O)OR^y$, —OC(O)$NR^yR^z$, —$NR^xC(S)OR^y$, —OC(S)$NR^yR^z$, —$NR^xC(S)SR^y$, —SC(S)$NR^yR^z$, —$NR^xC(S)NR^yR^z$, —C(O)$NR^yR^z$, —C(S)$NR^yR^z$, —NR$^y$R$^z$, or a heterocyclic group, wherein R$^x$, R$^y$ and R$^z$ are independently selected from hydrogen or C$_1$ to C$_6$ alkyl.

Specific examples of guanidinium, uronium, and thiuronium cations suitable for use according to the present invention include:

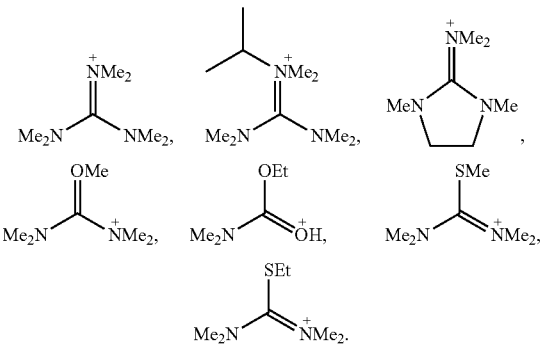

In a further embodiment, the cation comprises a cation comprising an electron-rich sulfur or selenium moiety. Examples include cations as defined above comprising pendant thiol, thioether, or disulfide substituents.

In another embodiment, the cation comprises an aromatic heterocyclic cationic species selected from: benzimidazolium, benzofuranium, benzothiophenium, benzotriazolium, cinnolinium, diazabicyclodecenium, diazabicyclononenium, diazabicyclo-undecenium, dithiazolium, imidazolium, indazolium, indolinium, indolium, oxazinium, oxazolium, isooxazolium, oxathiazolium, phthalazinium, pyrazinium, pyrazolium, pyridazinium, pyridinium, pyrimidinium, quinazolinium, quinolinium, iso-quinolinium, quinoxalinium, tetrazolium, thiadiazolium, iso-thiadiazolium, thiazinium, thiazolium, iso-thiazolium, triazinium, triazolium, and iso-triazolium.

For example, the cation may comprise:

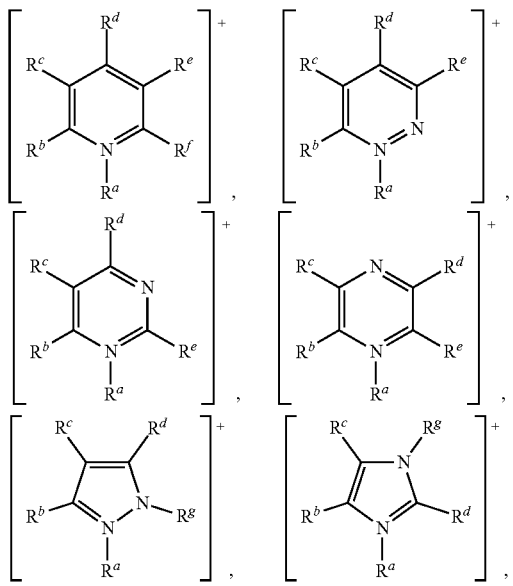

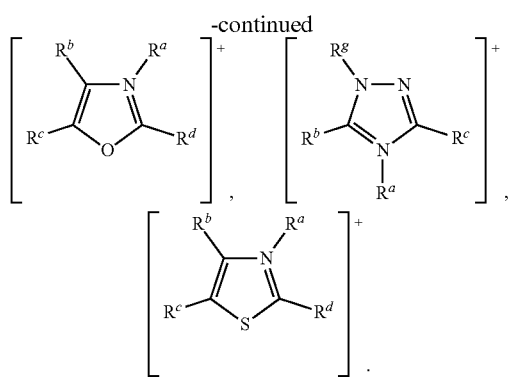

wherein: R$^a$, R$^b$, R$^c$, R$^d$, R$^e$, R$^f$ and R$^g$ are each independently selected from hydrogen, a C$_1$ to C$_{30}$, straight chain or branched alkyl group, a C$_3$ to C$_8$ cycloalkyl group, or a C$_6$ to C$_{10}$ aryl group, or any two of R$^b$, R$^c$, R$^d$, R$^e$ and R$^f$ attached to adjacent carbon atoms form a methylene chain —(CH$_2$)$_q$— wherein q is from 3 to 6; and wherein said alkyl, cycloalkyl or aryl groups or said methylene chain are unsubstituted or may be substituted by one to three groups selected from: C$_1$ to C$_6$ alkoxy, C$_2$ to C$_{12}$ alkoxyalkoxy, C$_3$ to C$_8$ cycloalkyl, C$_6$ to C$_{10}$ aryl, C$_7$ to C$_{10}$ alkaryl, C$_7$ to C$_{10}$ aralkyl, —CN, —OH, —SH, —NO$_2$, —CO$_2$R$^x$, —OC(O)R$^x$, —C(O)R$^x$, —C(S)R$^x$, —CS$_2$R$^x$, —SC(S)R$^x$, —S(O)(C$_1$ to C$_6$)alkyl, —S(O)O(C$_1$ to C$_6$)alkyl, —OS(O)(C$_1$ to C$_6$)alkyl, —S(C$_1$ to C$_6$)alkyl, —S—S(C$_1$ to C$_6$ alkyl), —NR$^x$C(O)NR$^y$R$^z$, —NR$^x$C(O)OR$^y$, —OC(O)NR$^y$R$^z$, —NR$^x$C(S)OR$^y$, —OC(S)NR$^y$R$^z$, —NR$^x$C(S)SR$^y$, —SC(S)NR$^y$R$^z$, —NR$^x$C(S)NR$^y$R$^z$, —C(O)NR$^y$R$^z$, —C(S)NR$^y$R$^z$, —NR$^y$R$^z$, or a heterocyclic group, wherein R$^x$, R$^y$ and R$^z$ are independently selected from hydrogen or C$_1$ to C$_6$ alkyl.

R$^a$ is preferably selected from C$_1$ to C$_{30}$, linear or branched, alkyl, more preferably C$_2$ to C$_{20}$ linear or branched alkyl, still more preferably, C$_2$ to C$_{10}$ linear or branched alkyl, and most preferably C$_4$ to C$_8$ linear or branched alkyl. Further examples include wherein R$^a$ is selected from methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl and n-octadecyl.

In the cations comprising an R$^g$ group, R$^g$ is preferably selected from C$_1$ to C$_{10}$ linear or branched alkyl, more preferably, C$_1$ to C$_5$ linear or branched alkyl, and most preferably R$^g$ is a methyl group.

In the cations comprising both an R$^a$ and an R$^g$ group, R$^a$ and R$^g$ are each preferably independently selected from C$_1$ to C$_{30}$, linear or branched, alkyl, and one of R$^a$ and R$^g$ may also be hydrogen. More preferably, one of R$^a$ and R$^g$ may be selected from C$_2$ to C$_{20}$ linear or branched alkyl, still more preferably, C$_2$ to C$_{10}$ linear or branched alkyl, and most preferably C$_4$ to C$_8$ linear or branched alkyl, and the other one of R$^a$ and R$^g$ may be selected from C$_1$ to C$_{10}$ linear or branched alkyl, more preferably, C$_1$ to C$_5$ linear or branched alkyl, and most preferably a methyl group. In a further preferred embodiment, R$^a$ and R$^g$ may each be independently selected, where present, from C$_1$ to C$_{30}$ linear or branched alkyl and C$_1$ to C$_{15}$ alkoxyalkyl. In some embodiments, one of R$^a$ and R$^g$ may be substituted with hydroxyl, methoxy or ethoxy.

In further embodiments, R$^b$, R$^c$, R$^d$, R$^e$, and R$^f$ are independently selected from hydrogen and C$_1$ to C$_8$ linear or branched alkyl, and more preferably $R^b$, $R^c$, $R^d$, $R^e$, and $R^f$ are hydrogen. In this embodiment, the cation preferably comprises a cation selected from:

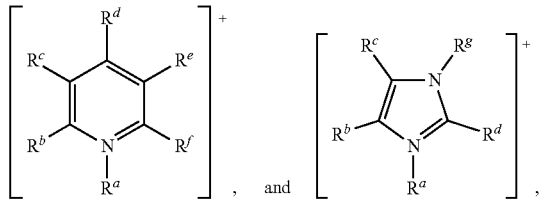

and wherein: $R^a$, $R^b$, $R^c$, $R^d$, $R^e$, $R^f$, and $R^g$ are as defined above. In preferable instances of this embodiment, the cation comprises a cation selected from:

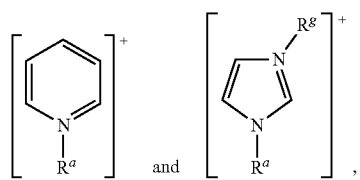

wherein: $R^a$ and $R^g$ are as defined above.

In further embodiments, the cation may comprise a cation selected from:

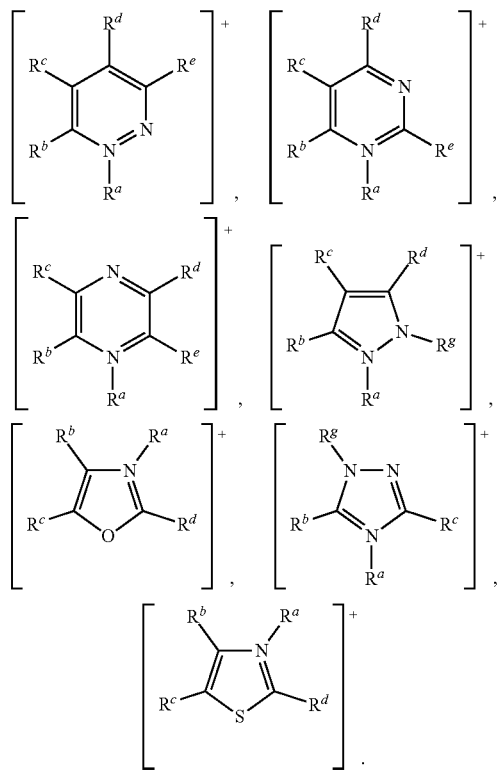

wherein: $R^a$, $R^b$, $R^c$, $R^d$, $R^e$, $R^f$ and $R^g$ are as defined above.

Specific examples of nitrogen-containing aromatic heterocyclic cations that may be used in accordance with this embodiment include:

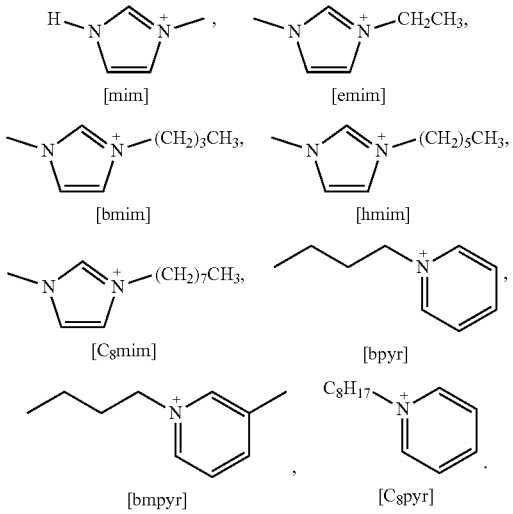

In further embodiments, the cation comprises a saturated heterocyclic cation having the formula:

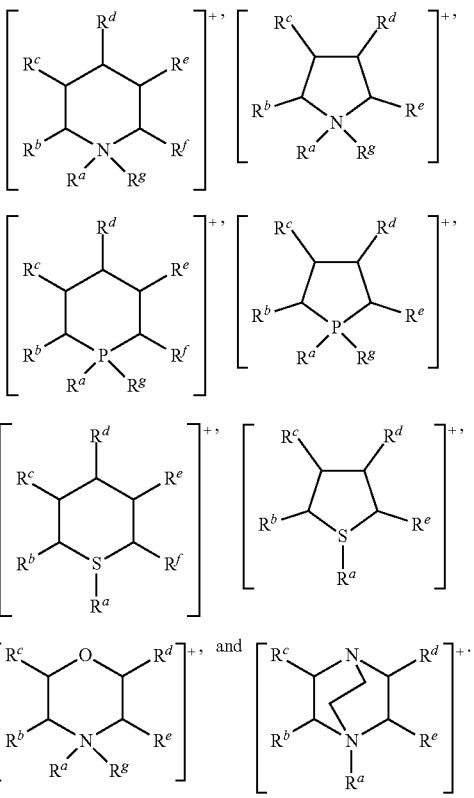

wherein: $R^a$, $R_b$, $R_e$, $R_d$, $R^e$, $R^f$, and $R^g$ are as defined above. In preferable instances of this embodiment, the cation comprises a saturated heterocyclic cation having the formula:

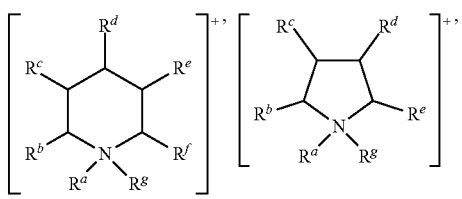

and is most preferably

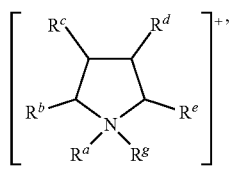

wherein: $R^a$, $R^b$, $R^c$, $R^d$, $R^e$, $R^f$, and $R^g$ are as defined above.

A specific example of a preferred saturated heterocyclic cation suitable for use according to the present invention is 1-butyl-1-methylpyrrolidinium cation:

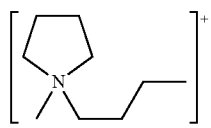

In further embodiments, the cation may comprise a saturated heterocyclic cation selected from:

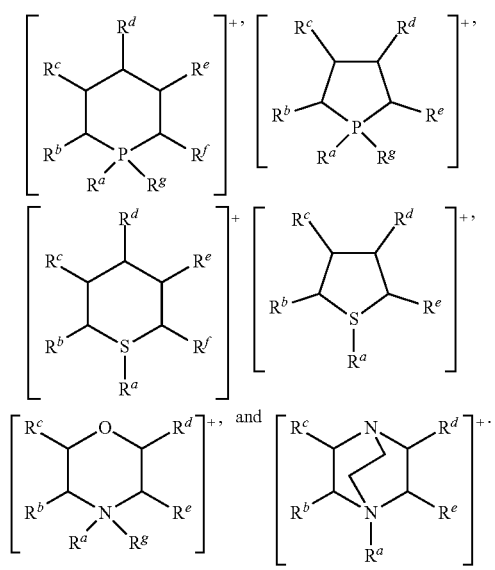

wherein: $R^a$, $R^b$, $R^c$, $R^d$, $R^e$, $R^f$, and $R^g$ are as defined above.

In the saturated heterocyclic cations above, $R^a$ is preferably selected from $C_1$ to $C_{30}$, linear or branched, alkyl, more preferably $C_2$ to $C_{20}$ linear or branched alkyl, still more preferably, $C_2$ to $C_{10}$ linear or branched alkyl, and most preferably $C_4$ to $C_8$ linear or branched alkyl. Further examples include wherein $R^a$ is selected from methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl and n-octadecyl.

In the saturated heterocyclic cations comprising an $R^g$ group, $R^g$ is preferably selected from $C_1$ to $C_{10}$ linear or branched alkyl, more preferably, $C_1$ to $C_5$ linear or branched alkyl, and most preferably $R^g$ is a methyl group.

In the saturated heterocyclic cations comprising both an $R^a$ and an $R^g$ group, $R^a$ and $R^g$ are each preferably independently selected from $C_1$ to $C_{30}$, linear or branched, alkyl, and one of $R^a$ and $R^g$ may also be hydrogen. More preferably, one of $R^a$ and $R^g$ may be selected from $C_2$ to $C_{20}$ linear or branched alkyl, still more preferably, $C_2$ to $C_{10}$ linear or branched alkyl, and most preferably $C_4$ to $C_8$ linear or branched alkyl, and the other one of $R^a$ and $R^g$ may be selected from $C_1$ to $C_{10}$ linear or branched alkyl, more preferably, $C_1$ to $C_5$ linear or branched alkyl, and most preferably a methyl group. In a further preferred embodiment, $R^a$ and $R^g$ may each be independently selected, where present, from $C_1$ to $C_{30}$ linear or branched alkyl and $C_1$ to $C_{15}$ alkoxyalkyl.

In further embodiments, $R^b$, $R^c$, $R^d$, $R^e$, and $R^f$ are independently selected from hydrogen and $C_1$ to $C_5$ linear or branched alkyl, and more preferably $R^b$, $R^c$, $R^d$, $R^e$, and $R^f$ are hydrogen.

The ionic liquids of the present disclosure are preferably liquid at a temperature of 100° C. and above, preferably 50° C. and above. More preferably, the ionic liquids of the present disclosure are liquid at a temperature of 25° C. and above, preferably 20° C. and above, more preferably 10° C. and above, and most preferably 0° C. and above.

An advantage of the ionic liquids of the present disclosure is that they can be synthesised such that they comprise less than 5 wt % halide, preferably less than 2.5 wt. % halide, and most preferably less than 1 wt. % halide. More preferably, the ionic liquids comprise less than 0.5 wt. % halide, and preferably less than 0.1 wt. % halide. Most preferably, the ionic liquids of the present disclosure are free of halide.

The ionic liquids of the present disclosure can be synthesised by any suitable method known in the art for synthesising said ionic liquids. Examples of such methods include those discussed in Chem. Eur. J. 2009, 15, 12273-12282, although the skilled person will appreciate that other methods known in the art may be used.

Lubricating Compositions

The lubricant compositions of the present disclosure comprise one or more base oils.

The base oils employed in the lubricant compositions of the present disclosure are typically oils used in automotive and industrial applications such as, among others, turbine oils, hydraulic oils, gear oils, crankcase oils and diesel oils. The base stock may comprise at least 90%, or at least 95% by weight of the total lubricant composition.

Typical lubricant basestocks that can be used in this invention may include natural base oils, including mineral oils, petroleum oils, paraffinic oils and vegetable oils, as well as oils derived from synthetic sources.

In particular, lubricant basestocks that can be used in this invention may be petroleum-based or synthetic stocks including any fluid that falls into the API basestock classification as Group I, Group II, Group III, Group IV, and Group V. The hydrocarbon base oil may be selected from naphthenic, aromatic, and paraffinic mineral oils.

Suitable synthetic oils may also be selected from, among others, ester-type oils (such as silicate esters, pentaerythritol esters and carboxylic acid esters), esters, diesters, polyol esters, polyalphaolefins (also known as PAOS or poly-a.-olefins), hydrogenated mineral oils, silicones, silanes, polysiloxanes, alkylene polymers, polyglycol ethers, polyols, bio-based lubricants and/or mixtures thereof.

The term lubricating oil composition as used herein is intended to refer to compositions suitable for lubricating the working parts of an internal combustion engine such as a spark ignition engine or compression ignition engine, or industrial machinery. Such lubricating oil compositions are compositions that are liquid at room temperature. The term lubricating oil composition is intended to cover all such oils. However, the term lubricating oil composition as used herein is not intended to cover grease compositions that are solid at room temperature in the absence of shear forces. Such grease compositions typically comprise one or more lubricating oil compositions combined with one or more thickeners such as lithium soaps or urea/substituted urea thickeners. Typical thickeners are known in the art. In particular, the term lubricating oil composition as used herein is not intended to cover greases comprising lubricating oils and urea or substituted urea thickeners. Accordingly, in a preferred instance, lubricating oil compositions of the invention do not comprise grease. In preferred instances, lubricating oil compositions of the invention do not comprise thickeners such as urea or substituted urea thickeners. In another preferred instance, lubricating oil compositions of the invention are liquid at 25° C. in the absence of shear forces.

Lubricating oil compositions of the present disclosure may comprise any suitable amount of one or more base oils and any suitable amount of one or more ionic liquids as described herein. Typically, the composition comprises the one or more ionic liquids in an amount of from 0.1 wt. % to 20 wt. %, preferably from 0.1 wt. % to 10 wt. %, and most preferably from 0.1 wt. % to 5 wt. %. Preferably, the composition comprises the one or more ionic liquids in an amount of from 0.5 wt. % to 1.5 wt. %.

Typically, the one or more base oils are present in the composition in an amount of from 75% to 99% by weight of the lubricant composition.

Lubricating oil compositions of the present disclosure typically further comprise one or more additives optionally selected from one or more pour point additives, anti-foaming additives, viscosity index improvers, antioxidants, detergents, corrosion inhibitors, anti-wear additives, friction modifiers, extreme pressure additives, or any combination thereof.

The additives may be present in compositions of the disclosure in any suitable amount. Typically, the additives are present in an amount of from 0.1 wt. % to 35 wt. % of the composition, preferably from 1 wt. % to 20 wt. % and most preferably from 1 wt. % to 10 wt. %.

The present invention also provides methods of producing a lubricating oil composition according to any preceding claim, comprising the steps of combining one or more base oils with one or more ionic liquids, and optionally one or more additives. Such methods are known to the person skilled in the art.

The present invention also provides methods of operating industrial machinery, a spark ignition engine or a compression ignition engine comprising lubricating said engine with a lubricating oil composition according to the present invention. Methods of operating said industrial machinery and engines using said lubricants including the application of said lubricants to the engines are known to the skilled person. The skilled person would also be aware of the necessary amounts of lubricating oil compositions of the invention to use in such methods. Additionally, the skilled person would be aware of which particular types of lubricating oil composition would be suitable for use in a given application.

The present invention also provides an additive concentrate for use in a lubricating oil composition, wherein the additive concentrate comprises an ionic liquid as disclosed herein, and one or more further additives selected from one or more pour point additives, anti-foaming additives, viscosity index improvers, antioxidants, detergents, corrosion inhibitors, anti-wear additives, friction modifiers, extreme pressure additives, or any combination thereof. An additive concentrate typically comprises a mixture of various additives that are to be mixed with one or more base oils so as to form a lubricating oil composition.

The present invention also provides the use of an ionic liquid as disclosed herein, in a lubricating oil composition, for the purpose of improving the anti-friction properties of the lubricating oil composition and/or for the purpose of improving the anti-wear properties of the lubricating oil composition. The ionic liquids may improve the anti-wear properties of the composition without improving the friction reducing properties of the composition. Alternatively, the ionic liquids may improve the friction reducing properties of the composition without improving the anti-wear properties of the composition. Preferably, the ionic liquids improve the anti-wear properties of the composition and the friction reducing properties of the composition. Preferably, the lubricating oil composition is as described above.

The ionic liquids of the present disclosure are improved friction reducing and anti-wear additives when used in lubricating oil compositions when compared to commercially available additives for such purposes. Without being limited by theory, this is believed to be, in part, because the ionic liquids exist as separate charged ions in the liquid state. When a lubricating oil composition is applied to moving parts, the composition forms a film between the surfaces of the moving parts. Moving parts are typically metal. Currently commercially available anti-wear and friction reducing additives are neutral molecules and so are well dispersed in the base oil of the lubricating oil composition within the film between the moving parts. In contrast, because ionic liquids exist as separate charged ions in the liquid state, they adsorb onto the polar metal surface of the moving parts. As such there is a localised concentration of the ionic liquids at the metal oil interface of each surface. This localised concentration of ionic liquids forms a film on the surface of each moving part. Essentially, the ionic liquid additive forms a film within the film of lubricating base oil. The ionic liquid film upon the surface of the moving parts is thought to act as an anti-wear film, reducing wear upon the metal surfaces. The ionic liquid film in contact with the metal surfaces may also serve to reduce friction between the moving parts.

The term "anti-friction properties" as used herein or "friction reducing properties of a lubricating oil composition" are used herein are well known terms of art that the skilled person will be familiar with. Such terms refer to the coefficient of friction when a lubricating oil composition is used in a lubricating application. The lower the coefficient of friction, the better a composition is as a lubricant and the better the anti-friction properties of the composition. Standard tests for measuring the coefficient of friction of a lubricating oil composition are known in the art. In an instance, the test used to measure coefficient of friction is ASTM D5183.

The term "anti-wear" properties as used herein or "wear reducing properties" with respect to a lubricating oil composition are well known terms of art that the skilled person will be familiar with. The wear properties of a lubricating oil composition are a measure of the extent to which surfaces to which the lubricating oil composition is applied are worn down in use. Wear can be measured, for example, by wear scar which is a distance measurement. The greater the wear scar distance, the more a surface has been worn down in use of the lubricating oil composition. A lubricating oil composition with a lower wear scar distance measurement would be said to have improved anti-wear properties. Tests for measuring wear are known to the skilled person. In an instance, the wear properties of a lubricating oil composition can be measured by ASTM D4172-94 (2016).

Example 1

The ionic liquid bis(trihexyltetradecylphosphonium) tetrathiomolybdate was synthesised by following the procedure of a metathesis reaction between trihexyltetradecylphosphonium chloride and ammonium tetrathiomolybdate in an organic solvent, followed by removal of the solvent and high vacuum drying.

Example 2

The ionic liquid bis(trioctylmethylphosphonium) tetrathiomolybdate was synthesised by a metathesis reaction between trioctylmethylphosphonium methylcarbonate and ammonium tetrathiomolybdate in an organic solvent such as methanol, followed by removal of the solvent and high vacuum drying. The ionic liquid bis(trihexyltetradecylphosphonium) tetrathiomolybdate was added to a fully formulated base oil in an amount of 1 wt. % by total weight of the lubricating oil composition. The base oil was 0w-16 oil.

The anti-wear properties of the lubricating oil composition comprising the ionic liquid were compared to the anti-wear properties of a lubricating oil composition comprising no anti-wear or anti-friction additive, and a lubricating oil composition comprising a comparable amount of the commercially available antifriction and anti-wear additive MoDTC. The anti-wear properties were measured by High Frequency Reciprocating Rig (HFRR) and are shown in the table below. The HFRR test is a standard test known in the art for assessing the lubricating properties of fuel, adapted for use in testing lubricating oil compositions.

TABLE 1

| Formulation | Wear Scar (μm) |
|---|---|
| Lubricating oil composition (no anti-wear or anti-friction additives) | 133 |
| Lubricating oil composition comprising ionic liquid | 89 |
| Lubricating oil composition comprising MoDTC | 102 |

It can be seen in the table above that the lubricating oil composition comprising the ionic liquid improves the anti-wear properties of the composition. Furthermore, the composition comprising the ionic liquid improves the anti-wear properties of the oil more than the commercially available additive MoDTC.

Figure 2:
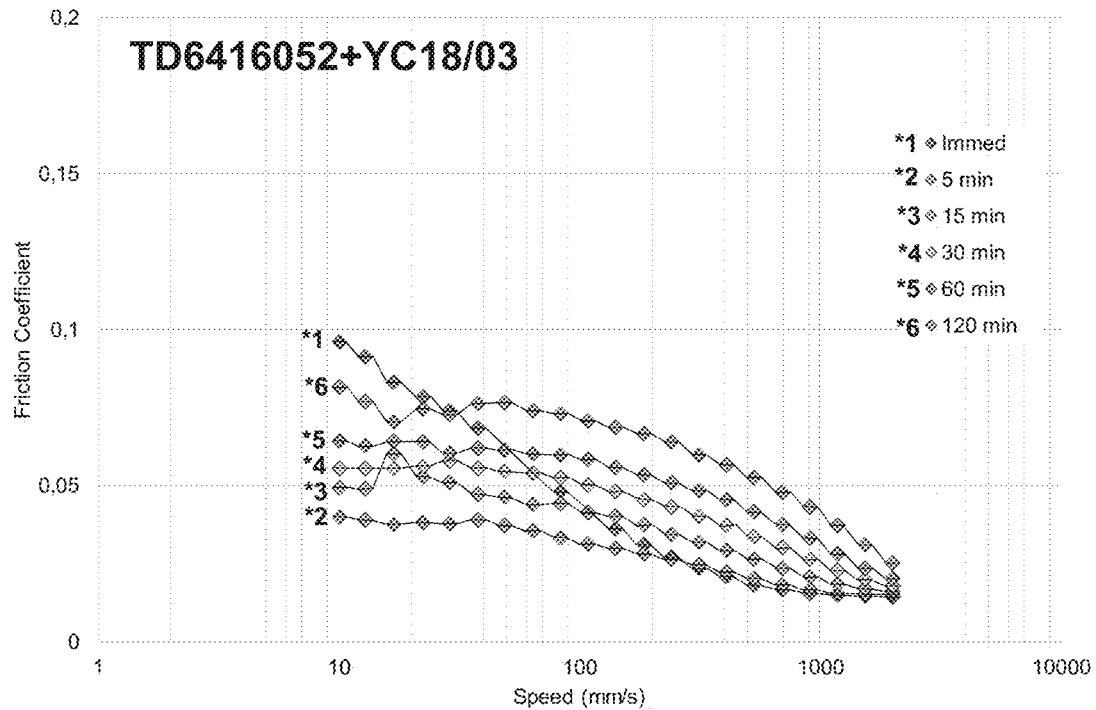
FIG. 2 is a graph depicting change in coefficient of friction with speed of a lubricating oil composition that comprises an ionic liquid additive.
Figure 3:
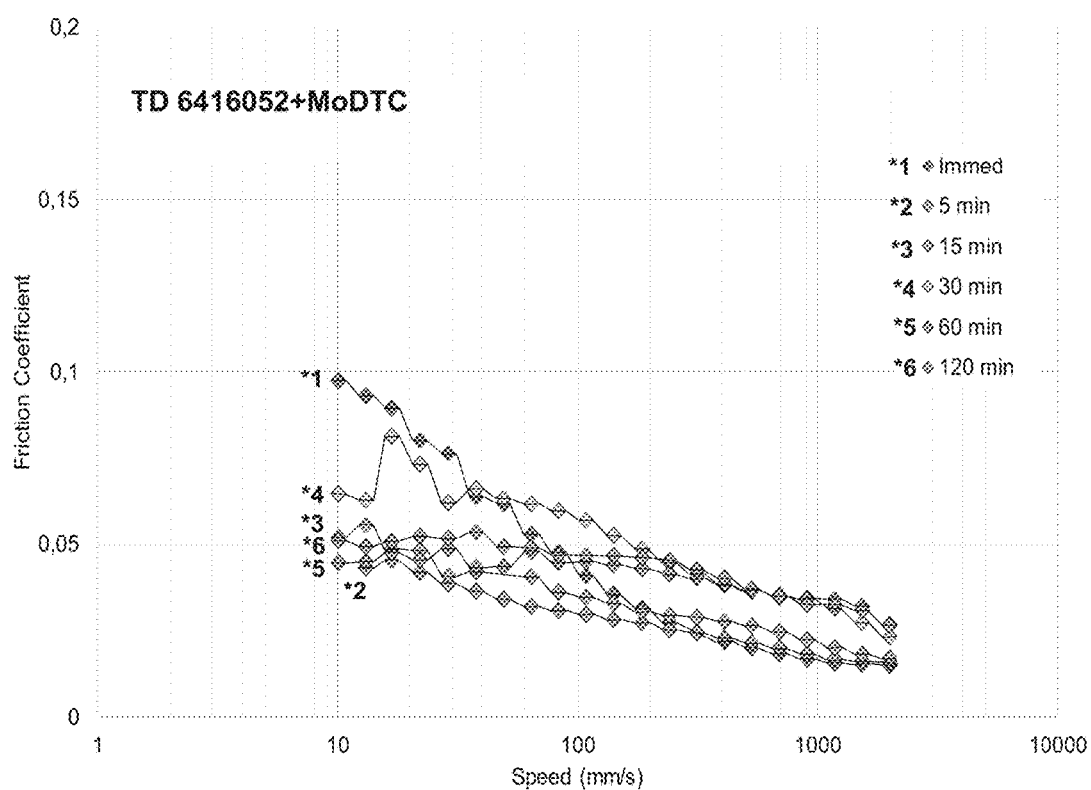
FIG. 3 is a graph depicting change in coefficient of friction with speed of a lubricating oil composition that comprises the additive MoDTC.

The anti-friction properties of the above compositions are shown in FIGS. 1 to 3. In each figure, the coefficient of friction is shown at different speeds using a mini traction machine (MTM). FIG. 1 shows the coefficient of friction of the lubricating oil composition (no anti-wear or anti-friction additives). FIG. 2 shows the coefficient of friction of the lubricating oil composition comprising ionic liquid. FIG. 3 shows the coefficient of friction of the lubricating oil composition comprising MoDTC. It can be seen that both the MoDTC and ionic liquid compositions reduce the coefficient of friction of the lubricating oil composition comprising no anti-friction or anti-wear additives. The formulation comprising the ionic liquid shows a comparable reduction in friction compared to the MoDTC formulation.

Figure 4:
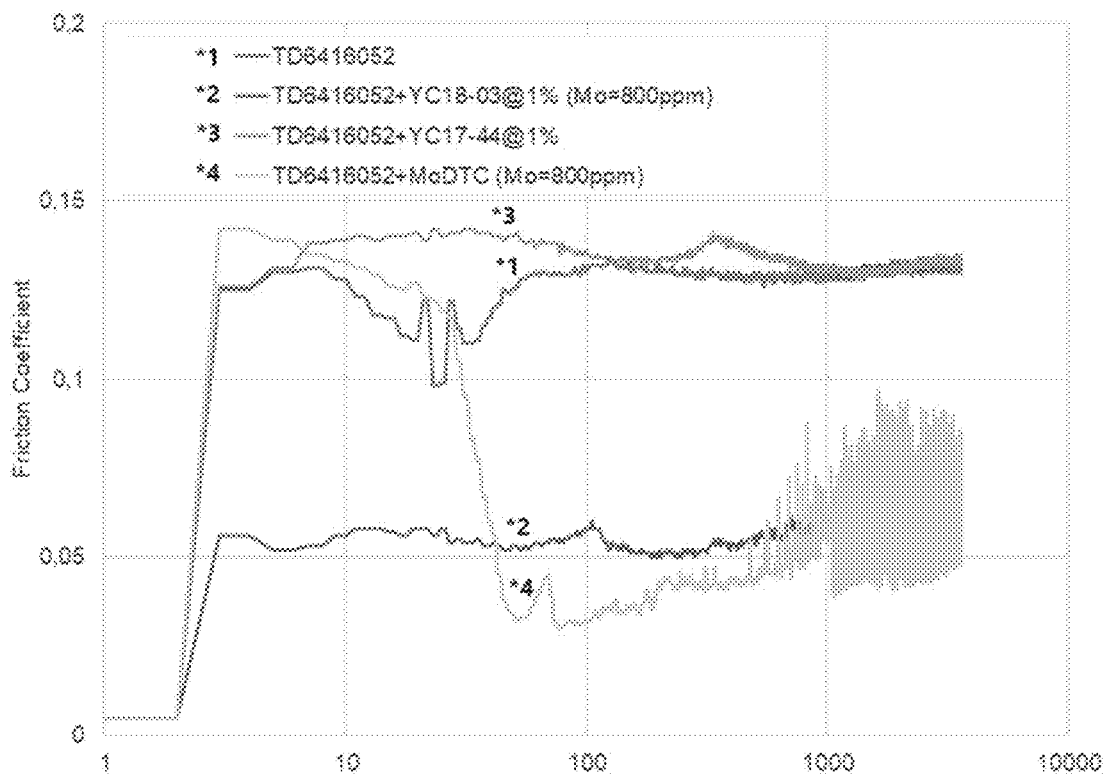
FIG. 4 a graph depicting change in coefficient of friction over time in an HFRR test of a lubricating oil composition that does not comprise any friction reducing or anti-wear additives, a lubricating oil composition that comprises an ionic liquid additive, and a lubricating oil composition that comprises the additive MoDTC.

In a separate test for coefficient of friction using the HFRR technique (High frequency reciprocating rig), a formulation comprising 0w-16 base oil with no anti-wear or anti-friction additives (TD6416052) was compared with a formulation comprising 0w-16 base oil and the ionic liquid (TD6416052+YC18-03), and a formulation comprising 0w-16 base oil and a comparable amount of the anti-friction and anti-wear additive MoDTC (TD6416052+MoDTC). The results are shown in FIG. 4. It can be seen that the formulation comprising base oil and ionic liquid demonstrated superior anti-friction properties to both the formulation comprising base oil only and formulation comprising base oil and MoDTC. The HFRR test is a standard test known in the art for assessing the lubricating properties of fuel, adapted for use in testing lubricating oil compositions.

Example 3

The following three ionic liquids of the present invention were synthesised and tested.

IL 18/03—Bis(trihexyltetradecylphosphonium) tetrathiomolybdate ionic liquid—prepared by halide route with ~3% chloride.

IL 18/36—Bis(trioctylmethylphosphonium) tetrathiomolybdate ionic liquid—prepared by non-halide route.

IL 18/39—Bis(trihexyltetradecylphosphonium) molybdate ionic liquid—prepared by halide route with ~3% chloride.

The above ionic liquids were tested and compared to the commercially available additive molybdenum dithiocarbamate (MoDTC) in a high frequency reciprocating rig test (HFRR).

The HFRR test is a standard test known in the art for assessing the lubricating properties of fuel, adapted for use in testing lubricating oil compositions. The test conditions were Load=400 g, T=120° C., Stoke=2000μ, Frequency=20 Hz, Duration=1 h.

The results of the test are shown below in Tables 2 and 3.

TABLE 2

| Oil | Additive | Treat rate (wt % inclusion of additive in oil) | Mo (ppm) | Mean Friction Coefficient (CoF) | Wear Scar (μm) |
|---|---|---|---|---|---|
| Oil number 1 | None | 0 | 0 | 0.13 | 133.5 |
| Oil number 1 | MoDTC | 0.25 | 250 | 0.068 | 97.5 |
| Oil number 1 | MoDTC | 0.50 | 500 | 0.054 | 95.0 |
| Oil number 1 | MoDTC | 1.00 | 1000 | 0.055 | 99.5 |
| Oil number 1 | IL 18/03 | 0.25 | 153 | 0.084 | 112.0 |
| Oil number 1 | IL 18/03 | 0.50 | 307 | 0.083 | 101.5 |
| Oil number 1 | IL 18/03 | 1.00 | 613 | 0.058 | 89.0 |
| Oil number 1 | IL 18/36 | 0.25 | 168 | 0.079 | 113.0 |
| Oil number 1 | IL 18/36 | 0.50 | 336 | 0.068 | 107.5 |

TABLE 2-continued

| Oil | Additive | Treat rate (wt % inclusion of additive in oil) | Mo (ppm) | Mean Friction Coefficient (CoF) | Wear Scar (μm) |
|---|---|---|---|---|---|
| Oil number 1 | IL 18/36 | 1.00 | 672 | 0.054 | 89.0 |
| Oil number 2 | None | 0 | 0 | 0.148 | 120.5 |
| Oil number 2 | MoDTC | 0.4 | 400 | 0.057 | 97.5 |
| Oil number 2 | IL 18/36 | 0.6 | 400 | 0.063 | 100.5 |
| Oil number 3 | 0 | 0 | 0 | 0.149 | 106 |
| Oil number 3 | MoDTC | 0.6 | 600 | 0.065 | 97.5 |
| Oil number 3 | IL 18/36 | 0.9 | 600 | 0.073 | 104.5 |

TABLE 3

| Oil | Additive | Treat rate (wt % inclusion of additive in oil) | Mo (ppm) | Wear Scar (μm) |
|---|---|---|---|---|
| Oil number 1 | None | 0 | 0 | 133.5 |
| Oil number 1 | MoDTC | 0.25 | 250 | 97.5 |
| Oil number 1 | MoDTC | 0.50 | 500 | 95.0 |
| Oil number 1 | MoDTC | 1.00 | 1000 | 99.5 |
| Oil number 1 | IL 18/39 | 0.25 | 35.5 | 129 |
| Oil number 1 | IL 18/39 | 0.50 | 71.0 | 125 |
| Oil number 1 | IL 18/39 | 0.10 | 142 | 126 |

In the above tests, Oils 1 to 3 were fully formulated lubricant oils.

In the above tests, a lower wear scar value in μm is indicative of improved anti-wear properties in comparison to a higher wear scar value. A lower coefficient of friction is indicative of improved anti-friction properties in comparison to a higher coefficient of friction.

It can be seen in the results shown in Tables 2 and 3 that ionic liquids IL 18/03 and IL 18/36 had improved anti-friction and anti-wear properties compared to oil containing no additive, and comparable levels of anti-friction and anti-wear properties compared to the commercially available additive MoDTC. Advantageously, the ionic liquids of the invention displayed similar anti-friction and anti-wear properties to MoDTC despite having a lower molybdenum content. In Table 3, it can be seen that the ionic liquid IL 18/39 has improved anti-wear properties in comparison to the oil containing no additive, but not compared to oil containing MoDTC.

Figure 5:
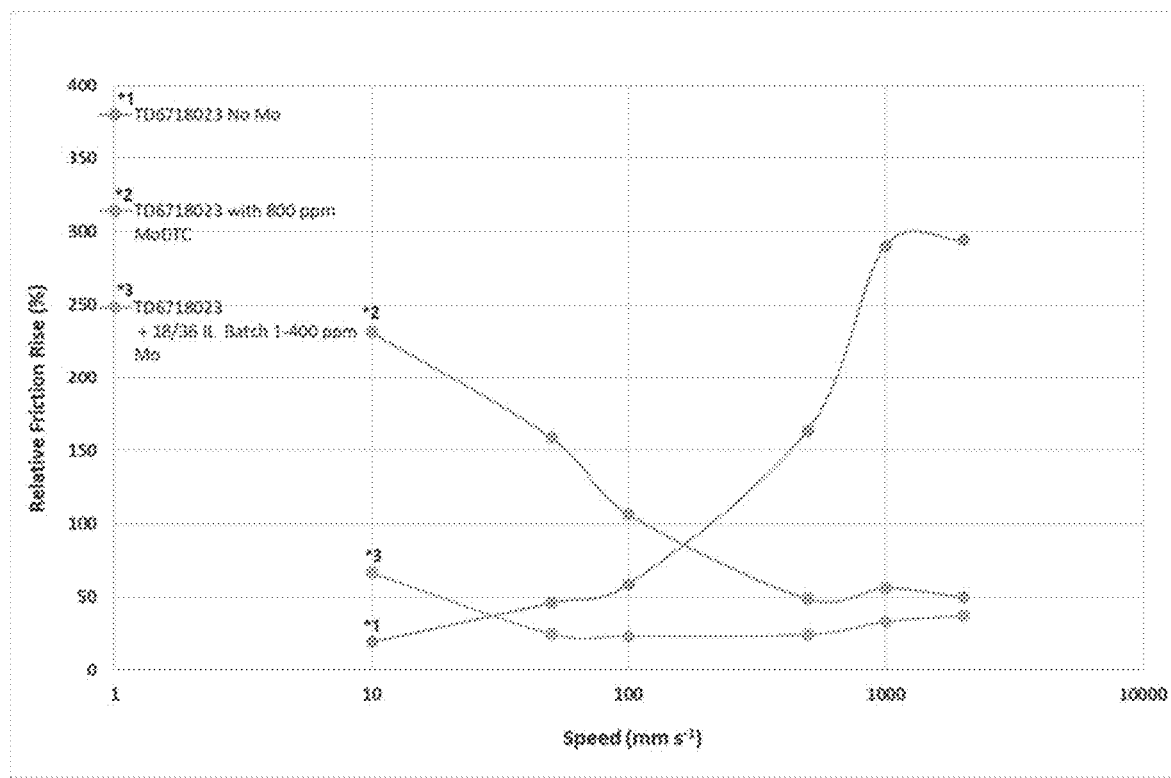
FIG. 5 is a graph depicting the relative friction rise in an oil comprising no anti-friction or anti-wear additives, an oil containing MoDTC, and an oil containing an ionic liquid of the invention.
Figure 6:
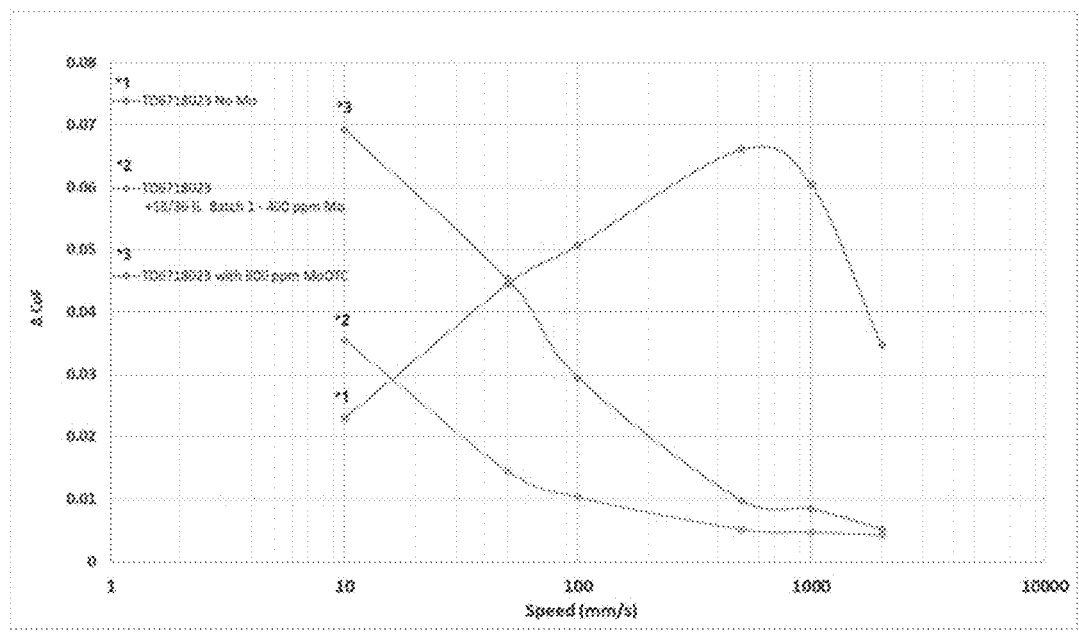
FIG. 6 is a graph depicting the coefficient of friction of an oil comprising no anti-friction or anti-wear additives, an oil containing MoDTC, and an oil containing an ionic liquid of the invention.

FIGS. 5 and 6 shows the results of a mini traction machine (MTM) test performed on fully formulated lubricant oil 2 when containing no additive, MoDTC and the ionic liquid IL 18/36.

FIG. 5 shows the relative percentage rise in friction in the oil during the test at different speeds. It can be seen that at low speeds (10 to 100 mm/s), the oils containing the additives have a higher relative increase in friction, but that at higher speeds, the oil containing no additive increases greatly in friction compared to the other two oils. As such, it can be seen that the ionic liquid IL 18/36 behaves similarly in reducing friction to the commercially available additive MoDTC.

FIG. 6 shows the coefficient of friction at different speeds for the oils. It can be seen that at low speeds (10 to 100 mm/s), the oils containing the additives have a higher coefficient of friction, but that at higher speeds, the coefficient of friction of the oil containing no additive increases greatly compared to the other two oils. As such, it can be seen that the ionic liquid IL 18/36 behaves similarly in reducing friction to the commercially available additive MoDTC.

Example 4

Corrosion testing was carried out on metal coupon strips in order to compare the corrosive effects of ionic liquids of the disclosure with those of the additive MoDTC on various metals. Said testing was performed in accordance with ASTM D2688-15e1.

Figure 7:
FIG. 7 shows the results of corrosion tests performed on various metals in the presence of MoDTC and an ionic liquid of the present invention.

FIG. 7 shows the results of corrosion tests performed on various metals in the presence of MoDTC and the ionic liquid IL 18/36 discussed above in Example 3.

From left to right in FIG. 7, the following strips of metal were tested: Ni coupon in IL 18/36; Ni coupon in MoDTC; Zn coupon in IL 18/36; Zn coupon in MoDTC: Al coupon in MoDTC; Al coupon in IL 18/36; CU coupon in IL 18/36; and Cu coupon in MoDTC.

Figure 8:
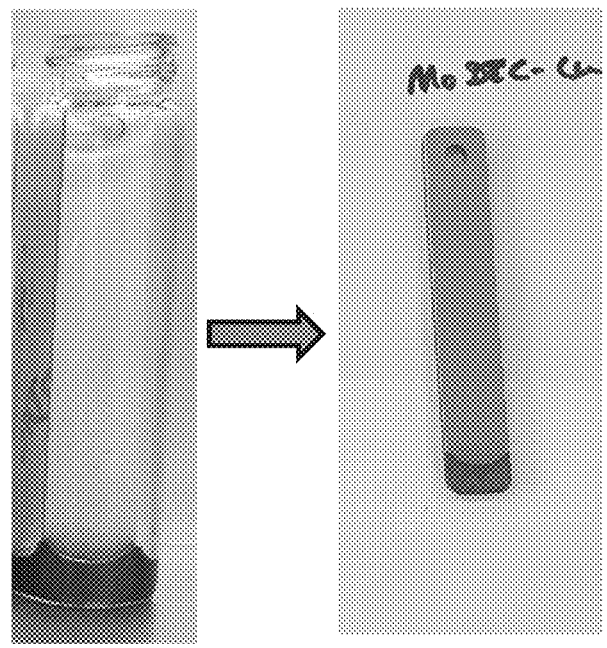
FIG. 8 shows, on the left, a copper coupon immersed in the additive MoDTC, and on the right, the copper coupon after immersion in MoDTC for two days.

FIG. 8 shows, on the left, a copper coupon immersed in the additive MoDTC, and on the right, the copper coupon after immersion in MoDTC for two days.

Figure 9:
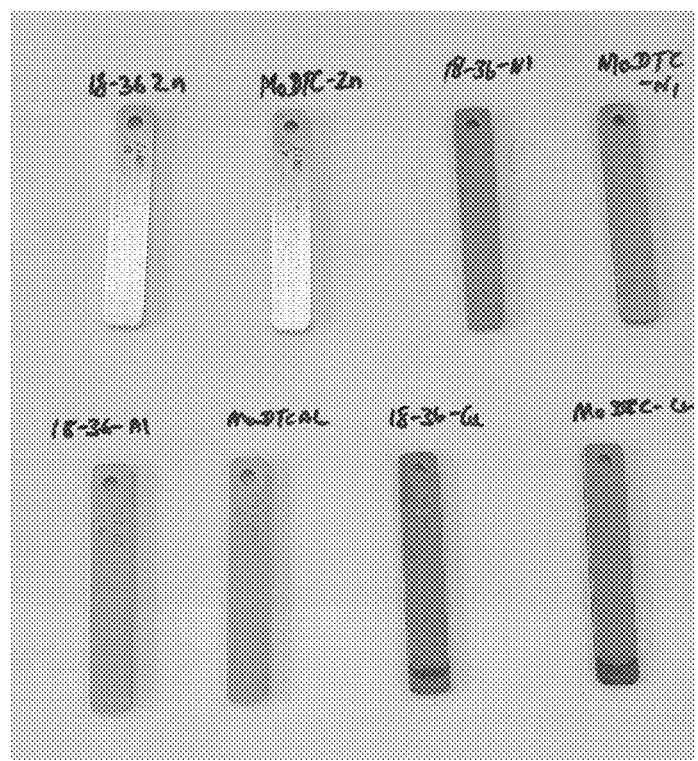
FIG. 9 shows metal coupons after exposure to an ionic liquid of the present invention and conventional molybdenum dithiocarbamate (MoDTC).

FIG. 9 shows metal coupons after exposure to the ionic liquid IL 18/36 and conventional molybdenum dithiocarbamate (MoDTC). At the top of the image, from left to right as follows: Zn coupon in IL 18/36; Zn coupon in MoDTC; Ni coupon in IL 18/36; and Ni coupon in MoDTC. At the bottom of the image, from left to right as follows: Al coupon in IL 18/36; Al coupon in MoDTC; Cu coupon in IL 18/36; and Cu coupon in MoDTC.

Figure 10:
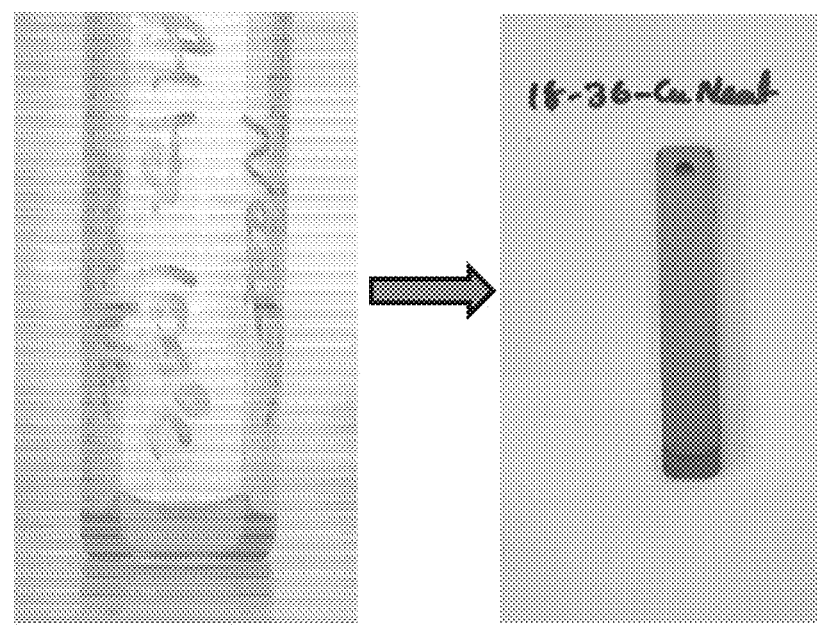
FIG. 10 shows a copper coupon immersed in an ionic liquid of the invention (left), and after exposure for two days in said ionic liquid (right).

FIG. 10 shows a copper coupon immersed in the ionic liquid IL 18/36 (left), and after exposure for two days in said ionic liquid (right).

Figure 11:
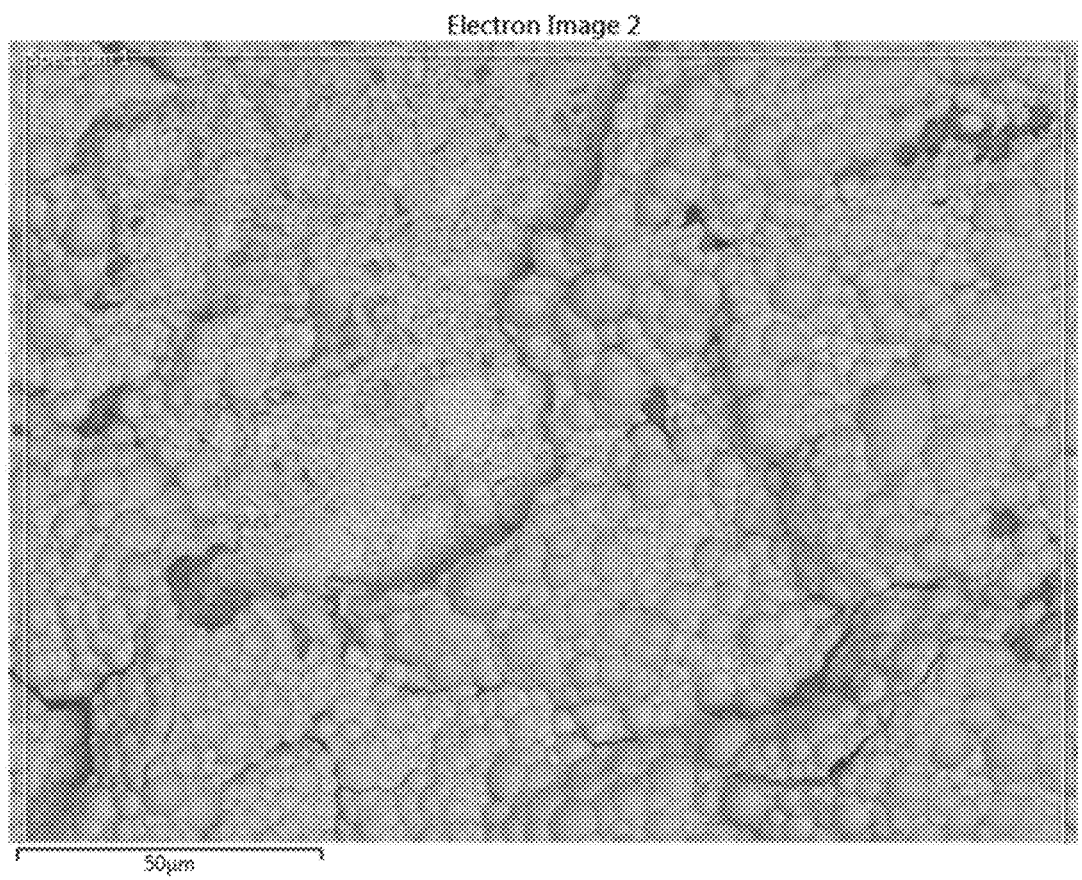
FIG. 11 shows a scanning electron microscopy (SEM) image of black corrosion deposits on a copper coupon after exposure to MoDTC at 70° C. for two days.

FIG. 11 shows a scanning electron microscopy (SEM) image of black corrosion deposits on a copper coupon after exposure to MoDTC at 70° C. for two days.

Figure 12:
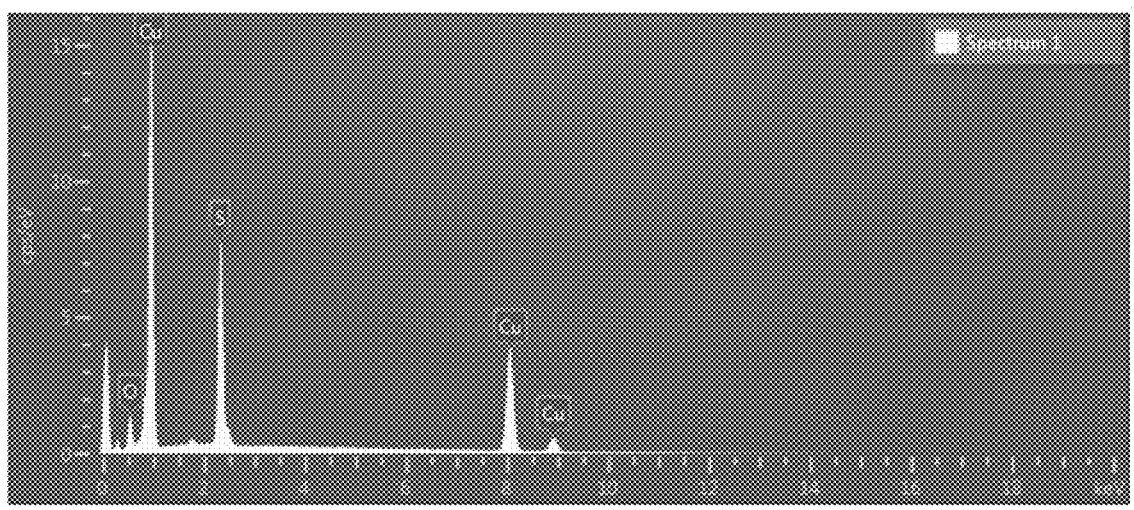
FIG. 12 shows an energy dispersive X-ray spectroscopy (EDX) spectrum of black corrosion deposits on a copper coupon after exposure to MoDTC at 70° C. for two days.

FIG. 12 shows an energy dispersive X-ray spectroscopy (EDX) spectrum of black corrosion deposits on a copper coupon after exposure to MoDTC at 70° C. for two days. The results of said test are also shown in Table 4.

TABLE 4

| Element | Line Type | Weight % | Weight % Sigma | Atomic % |
|---|---|---|---|---|
| O | K series | 19.47 | 0.42 | 45.78 |
| S | K series | 11.23 | 0.11 | 13.18 |
| Cu | L series | 69.30 | 0.38 | 41.04 |
| Total | | 100.00 | | 100.00 |

Figure 13:
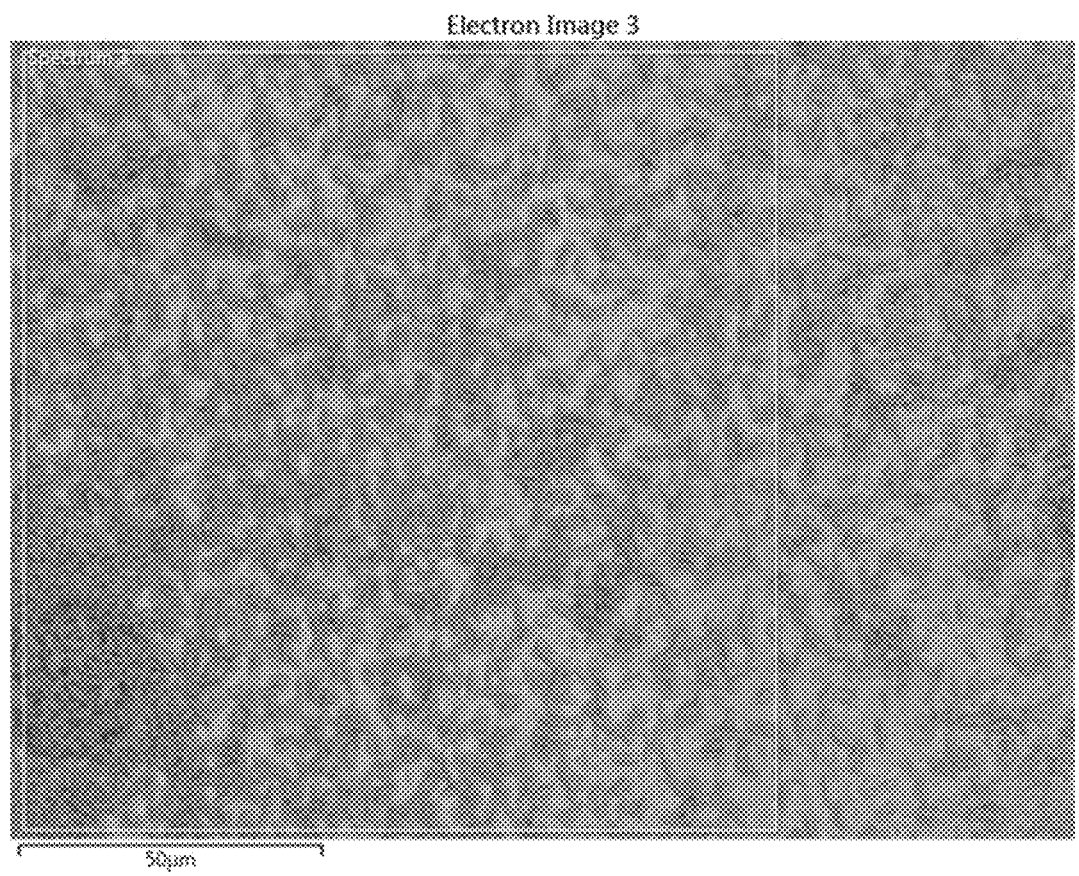
FIG. 13 shows a scanning electron microscopy (SEM) image of black corrosion deposits on a copper coupon after exposure to the ionic liquid IL 18/36 at 70° C. for two days.

FIG. 13 shows a scanning electron microscopy (SEM) image of black corrosion deposits on a copper coupon after exposure to the ionic liquid IL 18/36 at 70° C. for two days.

Figure 14:
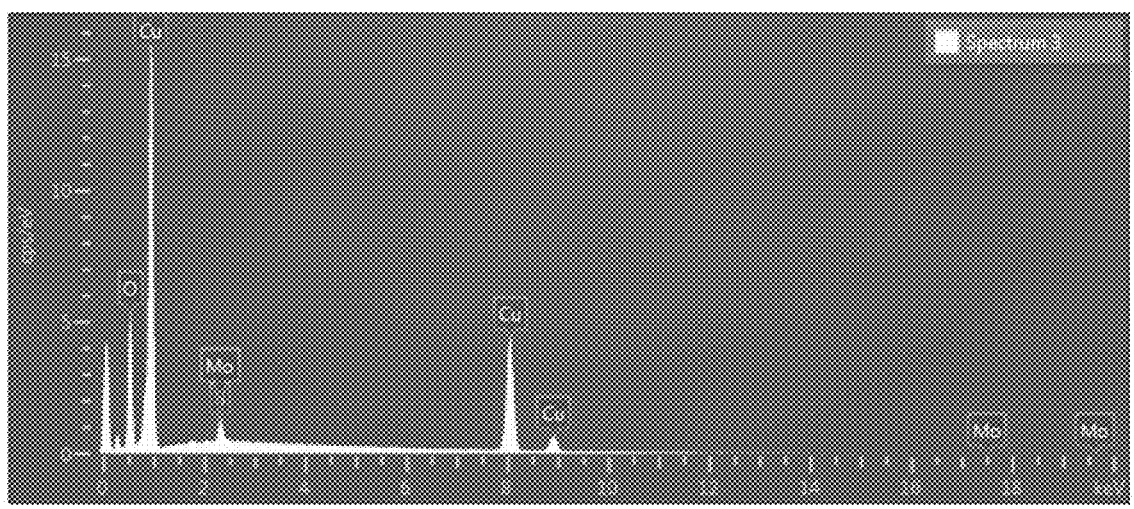
FIG. 14 shows an energy dispersive X-ray spectroscopy (EDX) spectrum of black corrosion deposits on a copper coupon after exposure to the ionic liquid IL 18/36 at 70° C. for two days.

FIG. 14 shows an energy dispersive X-ray spectroscopy (EDX) spectrum of black corrosion deposits on a copper coupon after exposure to the ionic liquid IL 18/36 at 70° C. for two days. The results of said test are also shown in Table 5.

TABLE 5

| Element | Line Type | Weight % | Weight % Sigma | Atomic % |
|---|---|---|---|---|
| O | K series | 41.14 | 0.30 | 73.40 |
| Cu | L series | 57.64 | 0.31 | 25.90 |
| S | K series | 0.57 | 0.08 | 0.50 |
| Mo | L series | 0.66 | 0.22 | 0.20 |
| Total | | 100.00 | | 100.00 |

The results of FIGS. 7 to 10 demonstrate that Zinc, Nickel and Aluminium showed no corrosion or surface modification after exposure to both MoDTC and IL 18/36 for 2 days at 70° C. There was no visual change in the metal coupon after 2 days. Copper showed some corrosion and surface modification after exposure to both MoDTC and IL 18/36, with thick black deposits observed in the case of MoDTC.

The surface corrosion on both copper coupons was studied through scanning electron microscopy (SEM) and energy dispersive X-ray spectroscopy (EDX). The results are shown in FIGS. 11 to 14. In the case of MoDTC exposed copper, the expected corrosion products are copper sulphide (CuS) and copper oxide (CuO). In the case of the ionic liquid 18/36 IL, Mo was present, but minimal sulphur was present (see Table 5 and FIG. 14). The SEM image of the copper surface after exposure to the ionic liquid IL 18/36 (FIG. 13) shows two types of features suggesting a layer of Mo based corrosion product upon the copper surface. It is believed that this Mo corrosion product layer may act to cause passivation of the surface of the copper, therefore retarding the rate of further corrosion, which would account for the lower sulphur content upon the surface than the copper coupon after to exposure to MoDTC.

Accordingly, ionic liquids of the disclosure may thus have reduced corrosive properties when compared to existing anti-wear and anti-friction additives known in the art, such as MoDTC.

Example 5

Electrochemical polarisation was carried out on copper, silver and iron surfaces. Testing was carried out in accordance with ASTM G102-89 (2015) el. Electrochemical polarisation tests were carried out on the metal surfaces using MoDTC, and the ionic liquids IL 18/03 and IL 18/36.

Figure 16:
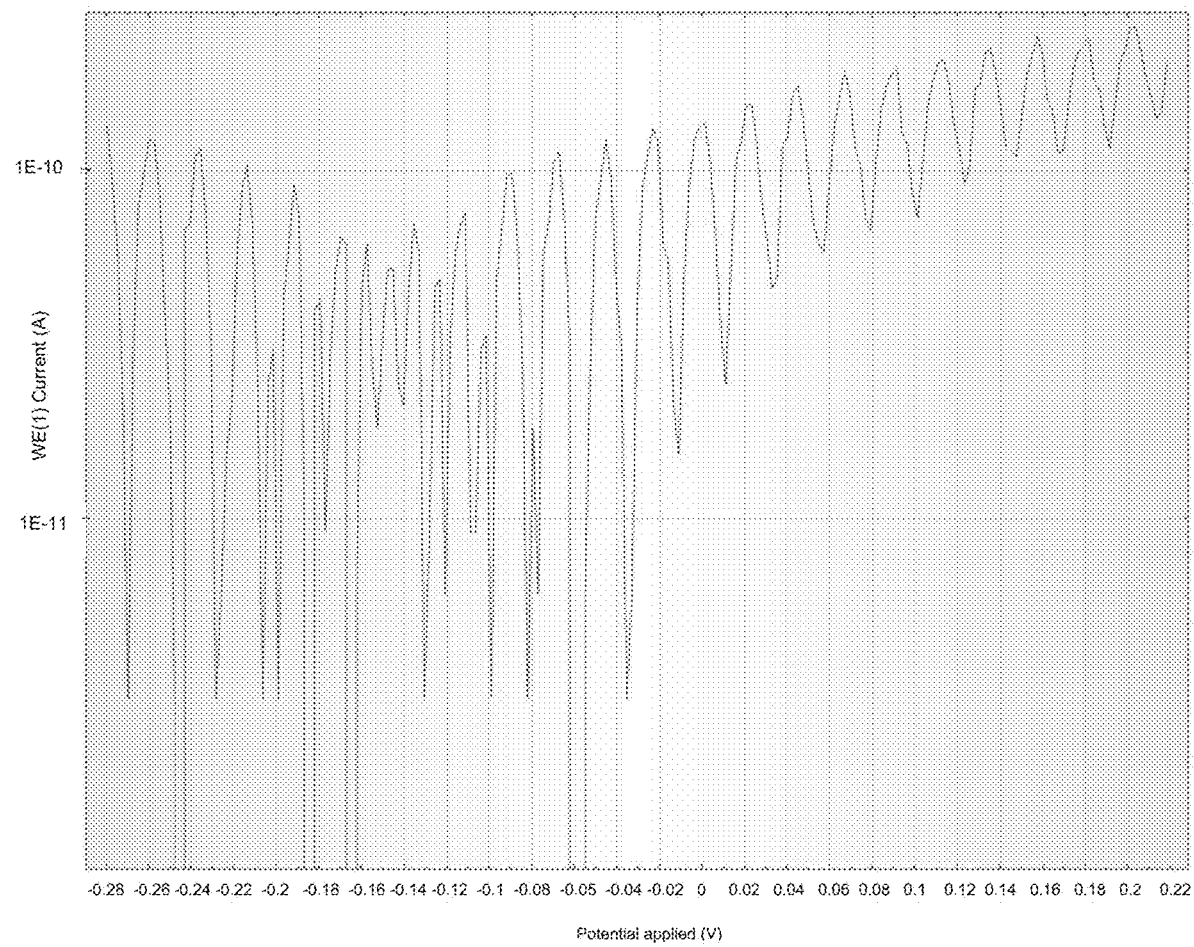
FIG. 16 shows a linear sweep voltammetry spectrum followed by Tafel analysis on copper exposed to MoDTC.

The electrochemical polarisation data for each metal surface with IL/18/03 and IL 18/36 is shown in FIG. 15. It was not possible to collect electrochemical polarisation data for MoDTC since it is a non-polar molecule and doesn't function as an electrolyte, as shown in FIG. 16, which is a linear sweep voltammetry spectrum followed by Tafel analysis on copper in MoDTC.

The data in FIG. 15 shows that the rate of corrosion of IL 18/03 is almost double when compared to IL 18/36. Although electrochemical polarisation tests are not a complete prediction of corrosion rate, they are indicative of the rate of corrosion over a short period of time. The ionic liquid IL 18/03 contains around 3 wt % of chloride which is believed to induce more corrosion than IL 18/36 which is prepared via a non-halide route.

Accordingly, since the invention may provide ionic liquids as disclosed herein prepared by a non-halide route, and consequently comprising low amounts of halide, said ionic liquids demonstrate reduced corrosion to ionic liquids that comprise some low amount of halide. This is a further advantage associated with certain ionic liquids of the present disclosure.

Example 6

SEM and EDX studies were also carried out on silver and copper coupons exposed to MoDTC and IL 18/36 in similar tests to those discussed above in Example 4.

Figure 17:
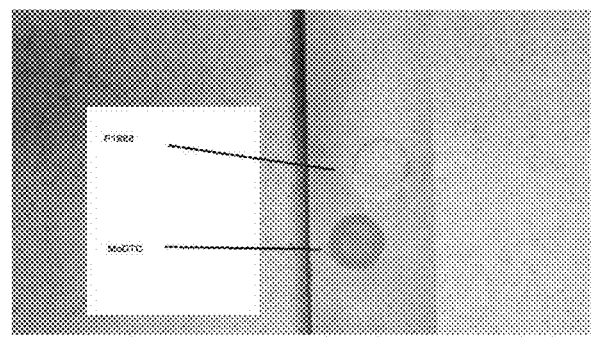
FIG. 17 shows a copper coupon exposed to an ionic liquid of the invention (top) and to MoDTC (bottom).

FIG. 17 shows a copper coupon exposed to IL 18/36 (top) and to MoDTC (bottom).

Figure 18:
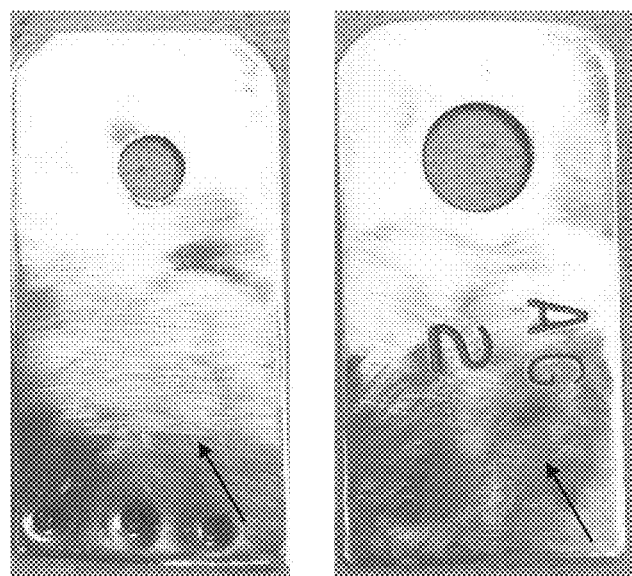
FIG. 18 shows a silver coupon exposed to an ionic liquid of the invention (top) and to MoDTC (right).

FIG. 18 shows a silver coupon exposed to IL 18/36 (left) and to MoDTC (right).

Figure 19:
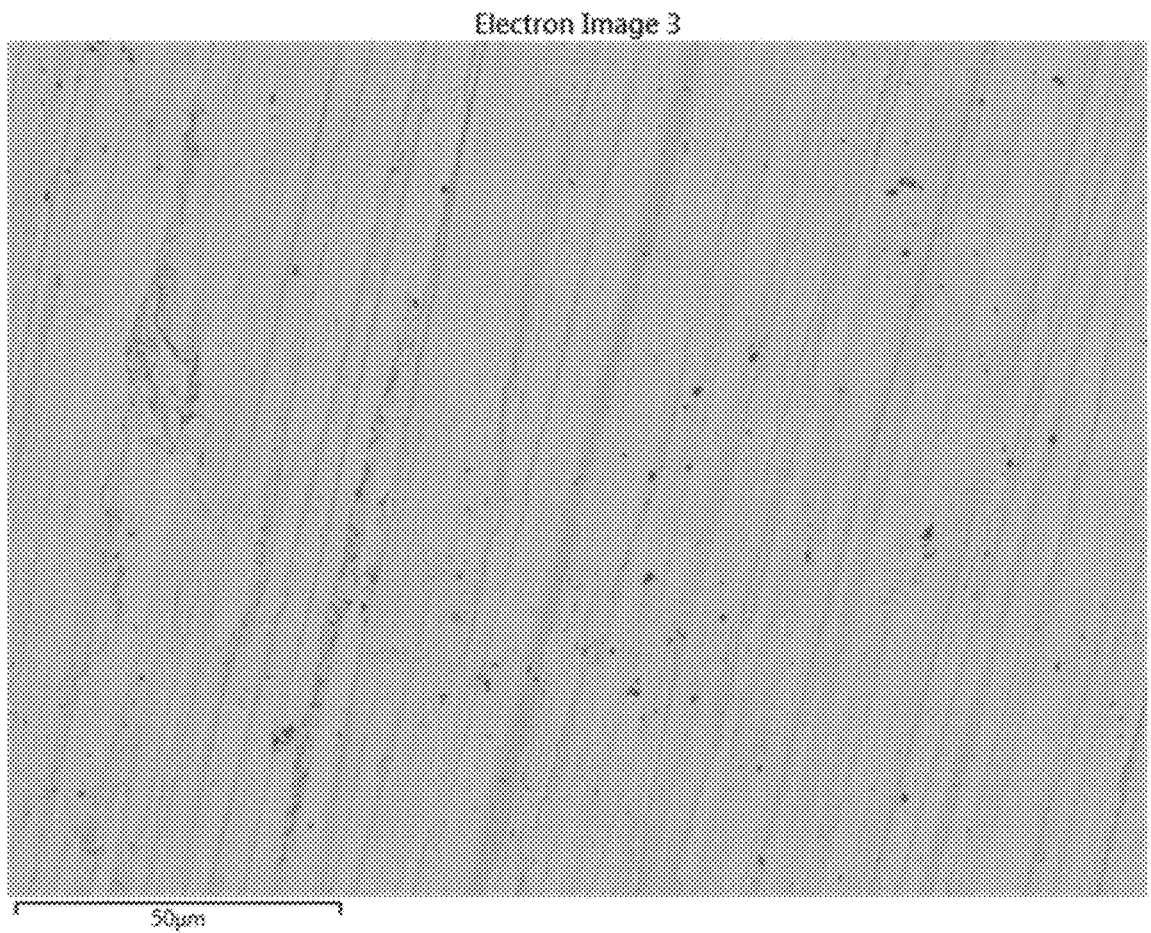
FIG. 19 is an SEM image of a silver coupon after exposure to MoDTC under electrochemical polarisation conditions given in FIG. 15.

FIG. 19 is an SEM image of a silver coupon after exposure to MoDTC under electrochemical polarisation conditions given in FIG. 15.

Figure 20:
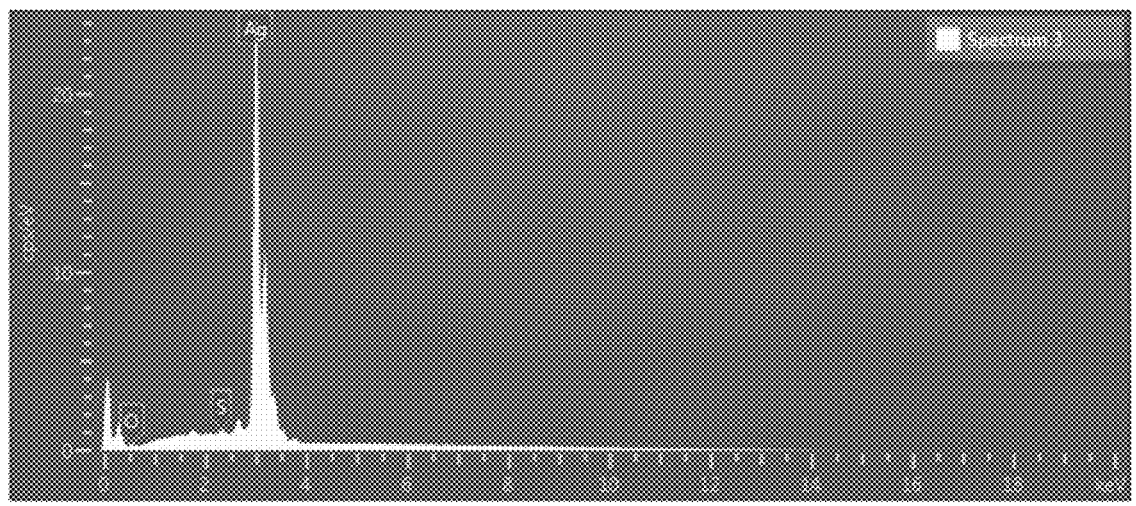
FIG. 20 is an EDX spectrum of a silver coupon after exposure to MoDTC under the electrochemical polarisation conditions given in FIG. 15.

FIG. 20 is an EDX spectrum of a silver coupon after exposure to MoDTC under the electrochemical polarisation conditions given in FIG. 15. Table 6 also shows the data from this spectrum.

TABLE 6

| Element | Line type | Weight % | Weight % sigma | Atomic % |
| --- | --- | --- | --- | --- |
| Ag | L series | 89.17 | 1.11 | 55.38 |
| S | K series | 0.34 | 0.05 | 0.71 |
| O | K series | 10.49 | 1.11 | 43.91 |
| Total | | 100.0 | | 100.00 |

Figure 21:
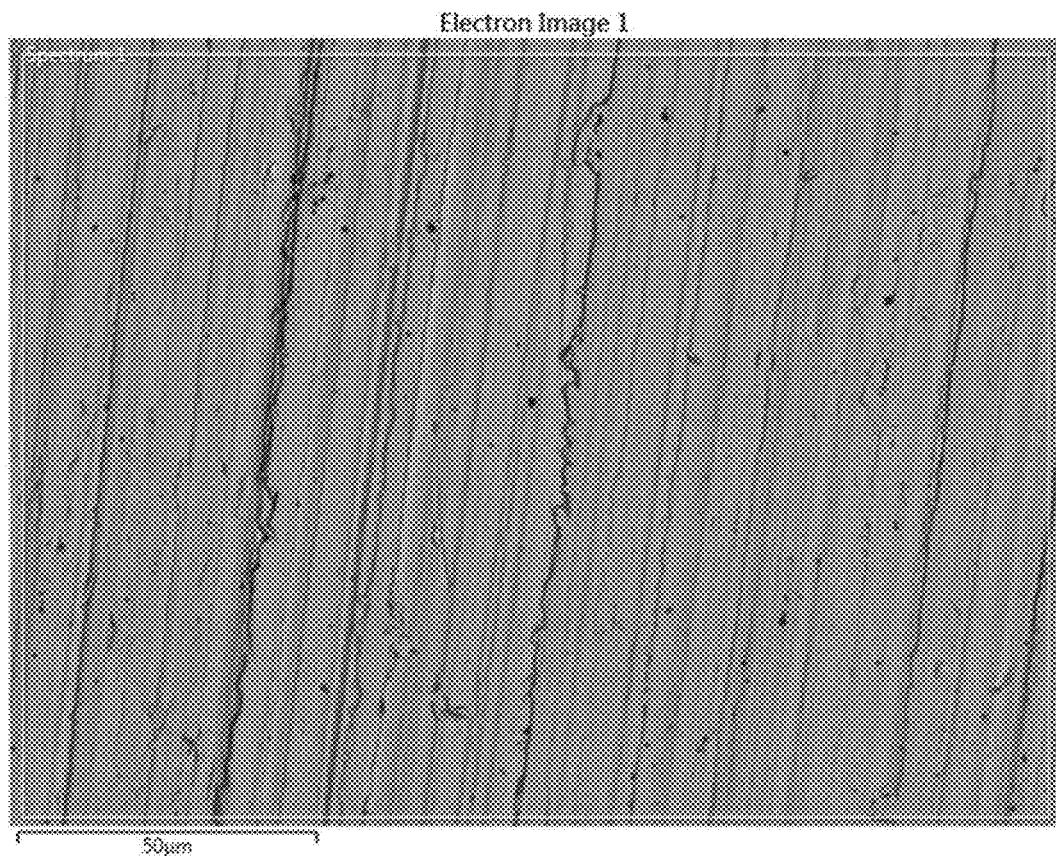
FIG. 21 depicts an SEM image of a silver coupon after exposure to the ionic liquid IL 18/36 under the electrochemical polarisation conditions given in FIG. 15.

FIG. 21 depicts an SEM image of a silver coupon after exposure to the ionic liquid IL 18/36 under the electrochemical polarisation conditions given in FIG. 15.

Figure 22:
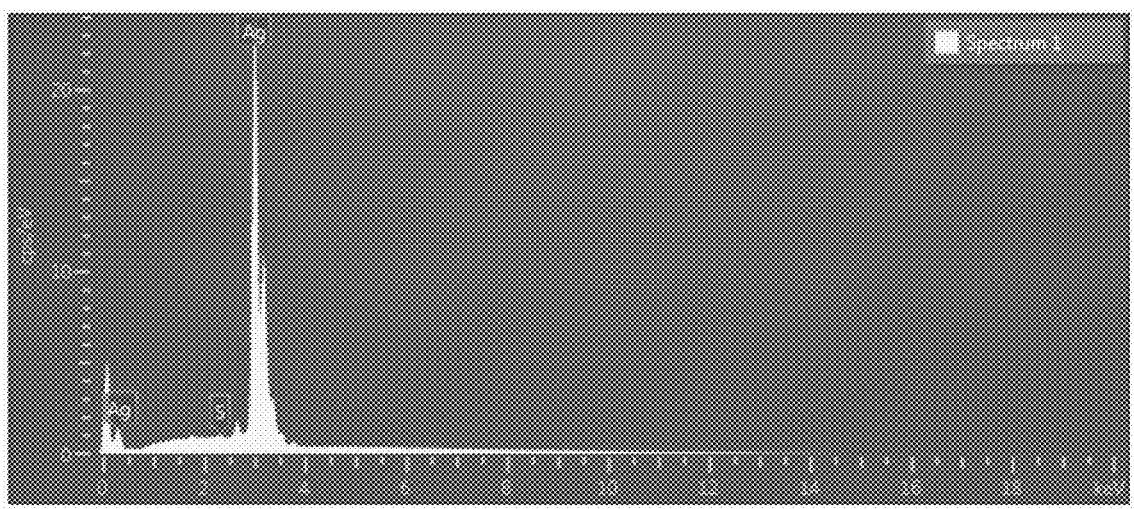
FIG. 22 is an EDX spectrum of a silver coupon after exposure to the ionic liquid IL 18/36 under the electrochemical polarisation conditions given in FIG. 15.

FIG. 22 is an EDX spectrum of a silver coupon after exposure to the ionic liquid IL 18/36 under the electrochemical polarisation conditions given in FIG. 15. Table 7 also shows the data from this spectrum.

TABLE 7

| Element | Line Type | Weight % | Weight % Sigma | Atomic % |
| --- | --- | --- | --- | --- |
| Ag | L series | 99.71 | 0.06 | 99.04 |
| S | K series | 0.29 | 0.06 | 0.96 |
| Total | | 100.00 | | 100.00 |

FIGS. 17 and 18 show that MoDTC causes more corrosion of silver and copper surfaces than the ionic liquid IL 18/36. This can be seen in the visual comparison in the photographs.

The parts of the metal surfaces contacted with MoDTC are coated with more deposit than those parts contacted with IL 18/36.

FIGS. 19 to 22 show that the silver surface exposed to MoDTC has a much higher oxygen content than the silver surface exposed to IL 18/36. Both surfaces contain a low sulphur content. The data shows that the surface exposed to MoDTC contains a higher amount of oxidation product upon the surface than the surface exposed to the ionic liquid. Accordingly, the ionic liquid corrodes the surface less than the MoDTC.

Noble metals have been found to be corroded more highly by MoDTC than by ionic liquids of the present disclosure such as IL 18/36.

Example 7

Thermal studies were conducted according to ASTM E1877-00 upon MoDTC, IL 18/36, and both additives mixed with engine oil and various lubricant oils (Lubricant Oil 3, Lubricant Oil 4+ & Base Oil).

Figure 23:
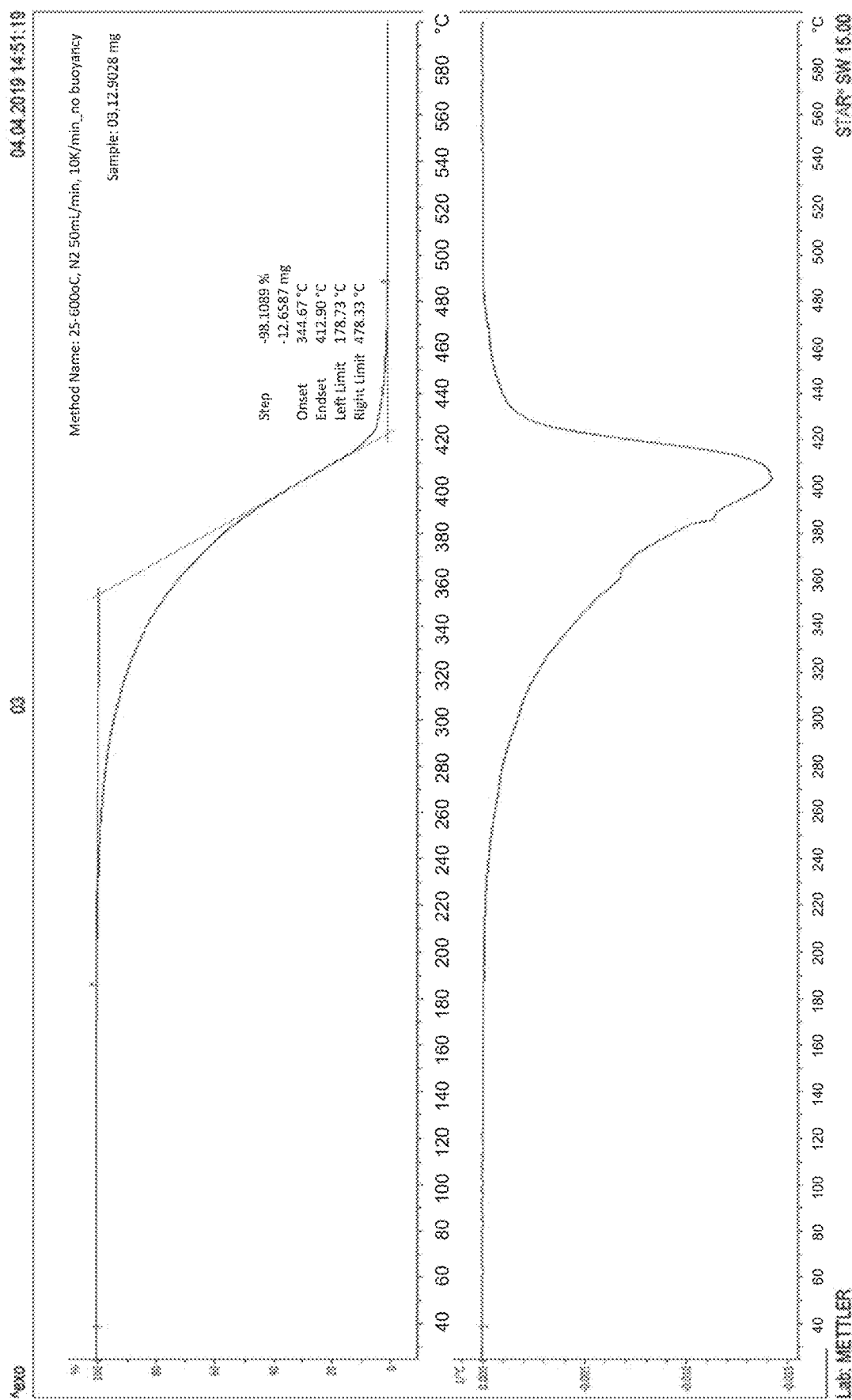
FIG. 23 depicts a thermal gravimetric analysis of test Lubricant Oil 3.

FIG. 23 depicts a thermal gravimetric analysis of test Lubricant Oil 3.

Figure 24:
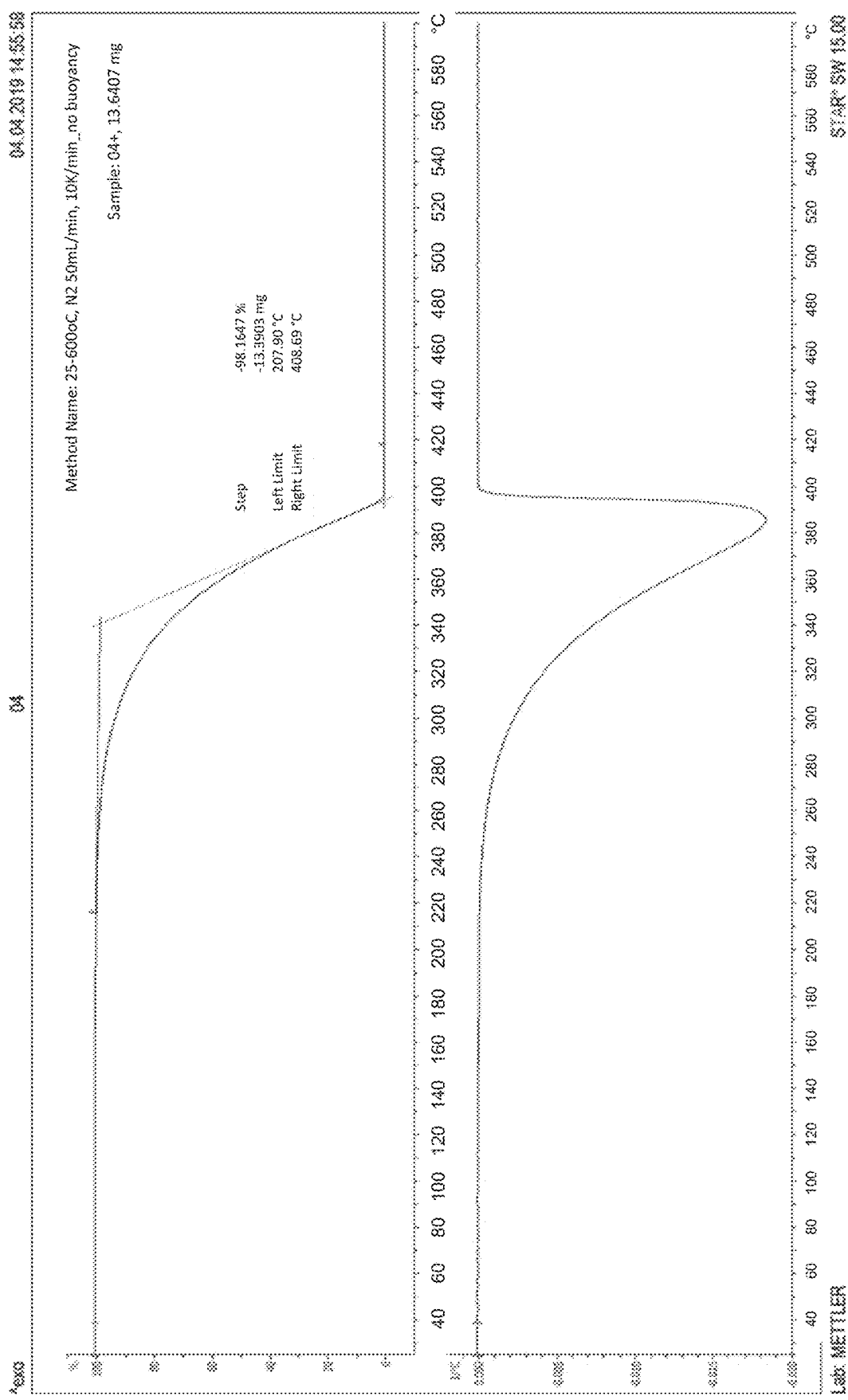
FIG. 24 depicts a thermal gravimetric analysis of test Lubricant Oil 4+

FIG. 24 depicts a thermal gravimetric analysis of test Lubricant Oil 4+

Figure 25:
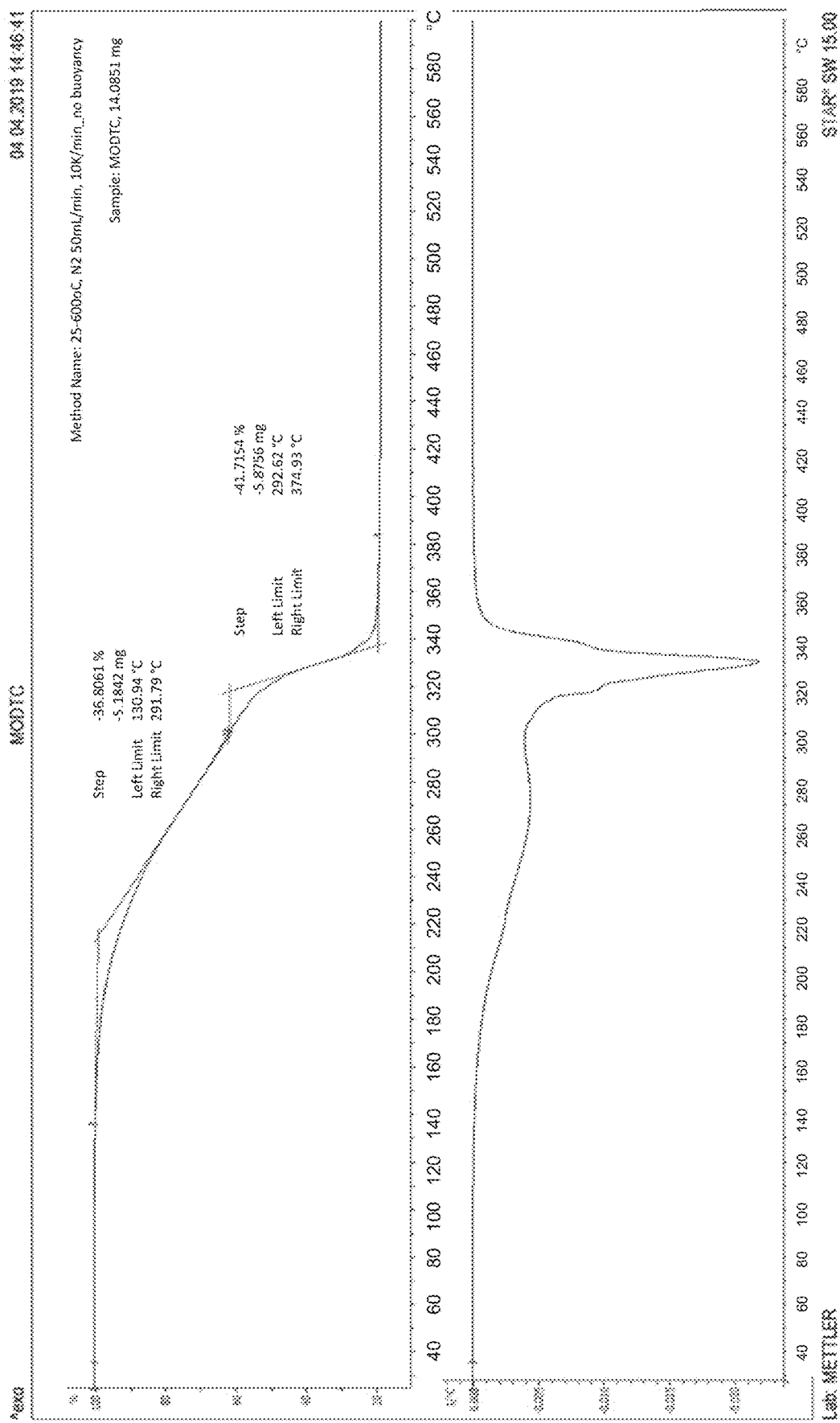
FIG. 25 depicts a thermal gravimetric analysis of MoDTC only.

FIG. 25 depicts a thermal gravimetric analysis of MoDTC only.

Figure 26:
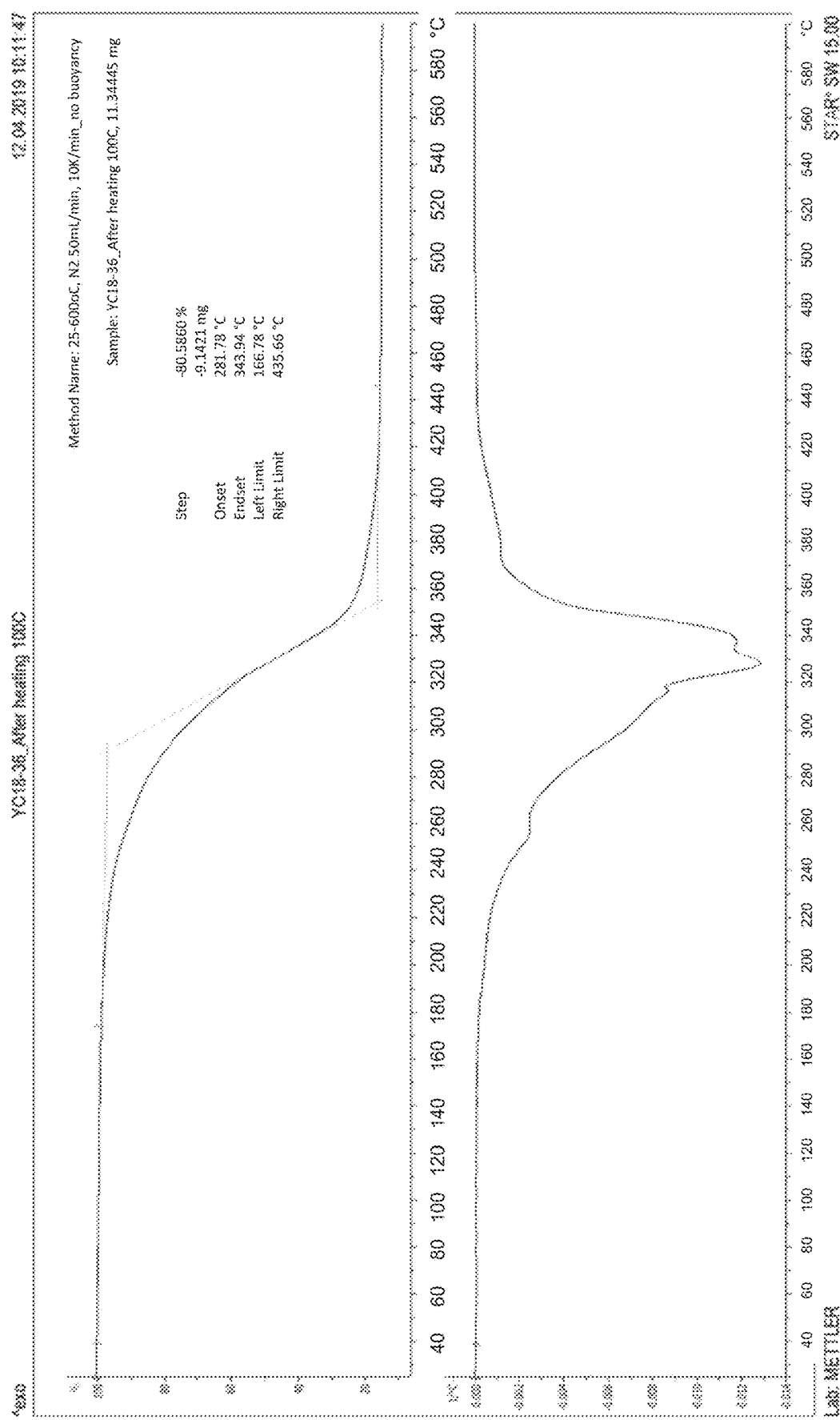
FIG. 26 depicts a thermal gravimetric analysis of the ionic liquid IL 18/36 only.

FIG. 26 depicts a thermal gravimetric analysis of the ionic liquid IL 18/36 only.

Figure 27:
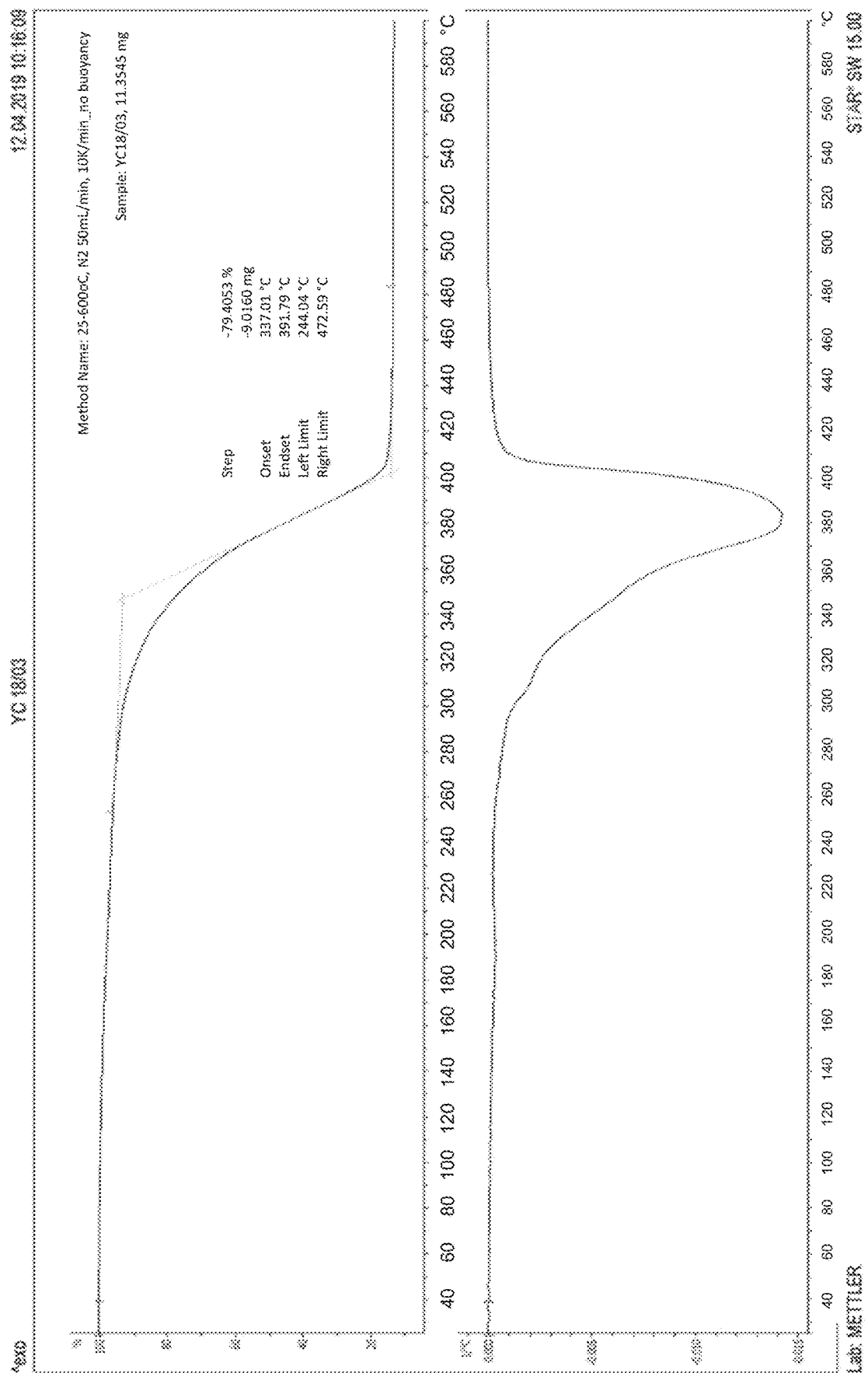
FIG. 27 depicts a thermal gravimetric analysis of the ionic liquid IL 18/03 only.

FIG. 27 depicts a thermal gravimetric analysis of the ionic liquid IL 18/03 only.

Figure 28:
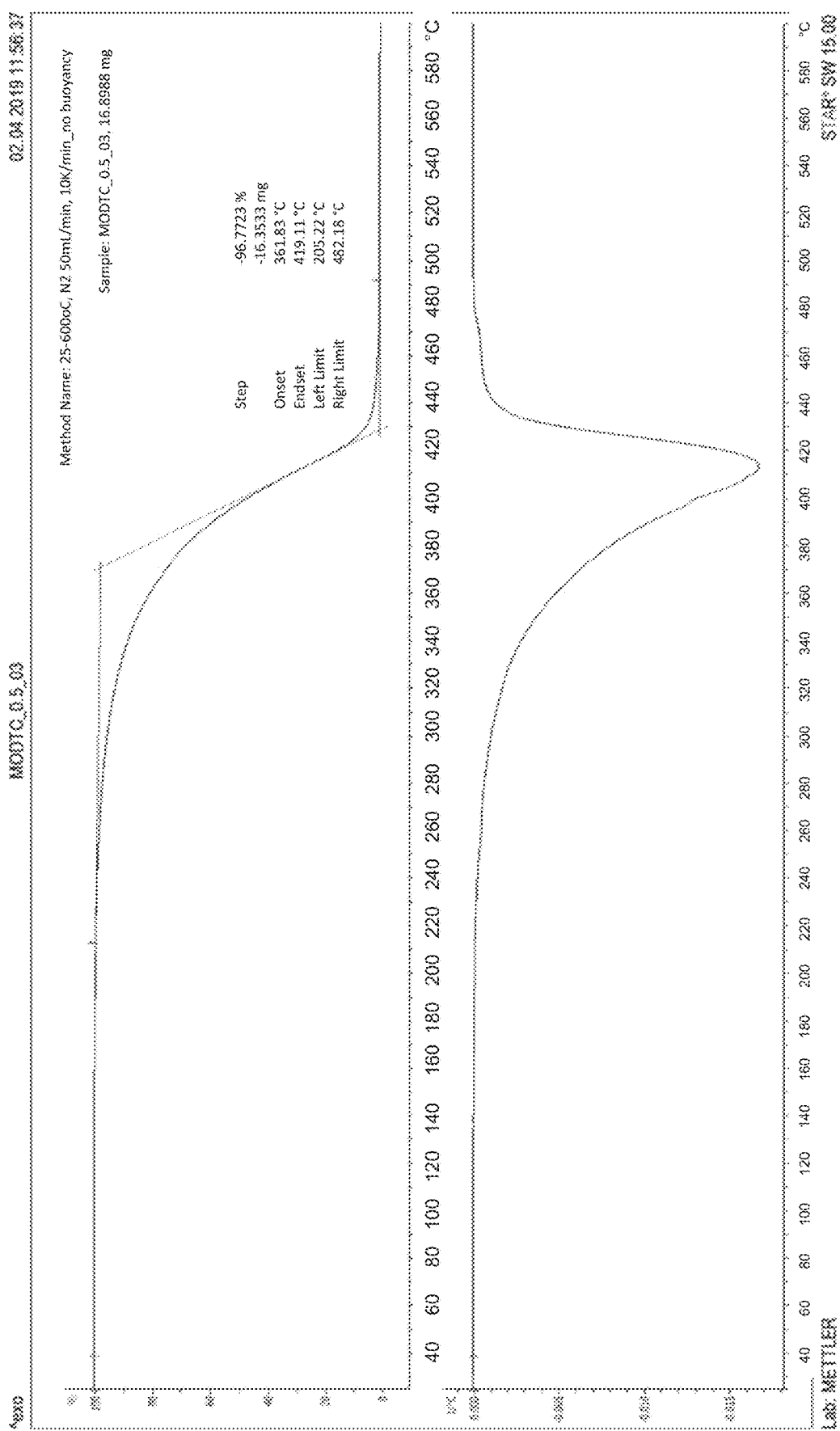
FIG. 28 depicts a thermal gravimetric analysis of test Lubricant Oil 3 with 0.5 wt % MoDTC.

FIG. 28 depicts a thermal gravimetric analysis of test Lubricant Oil 3 with 0.5 wt % MoDTC.

Figure 29:
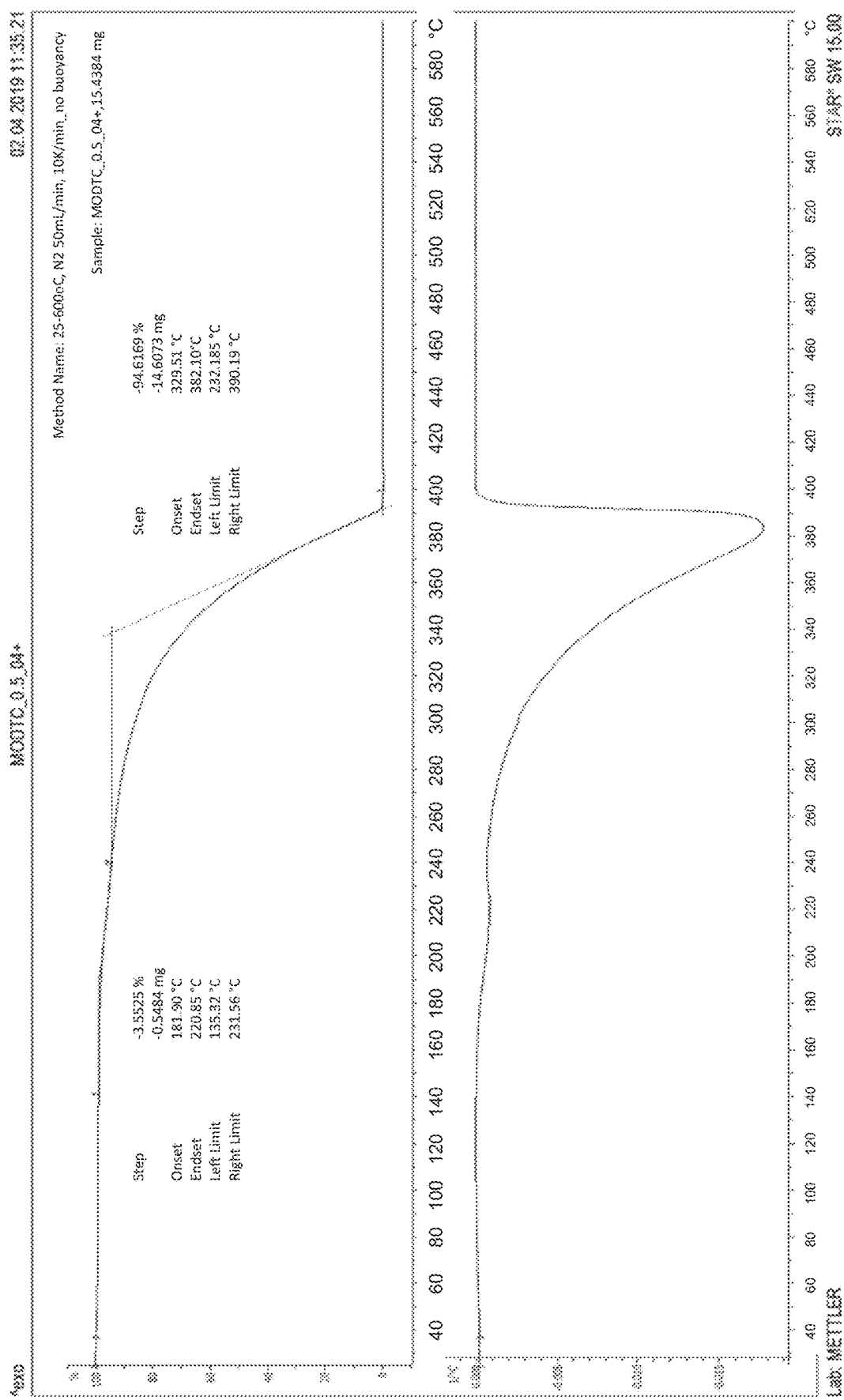
FIG. 29 depicts a thermal gravimetric analysis of test Lubricant Oil 4+ with 0.5 wt % MoDTC.

FIG. 29 depicts a thermal gravimetric analysis of test Lubricant Oil 4+ with 0.5 wt % MoDTC.

Figure 30:
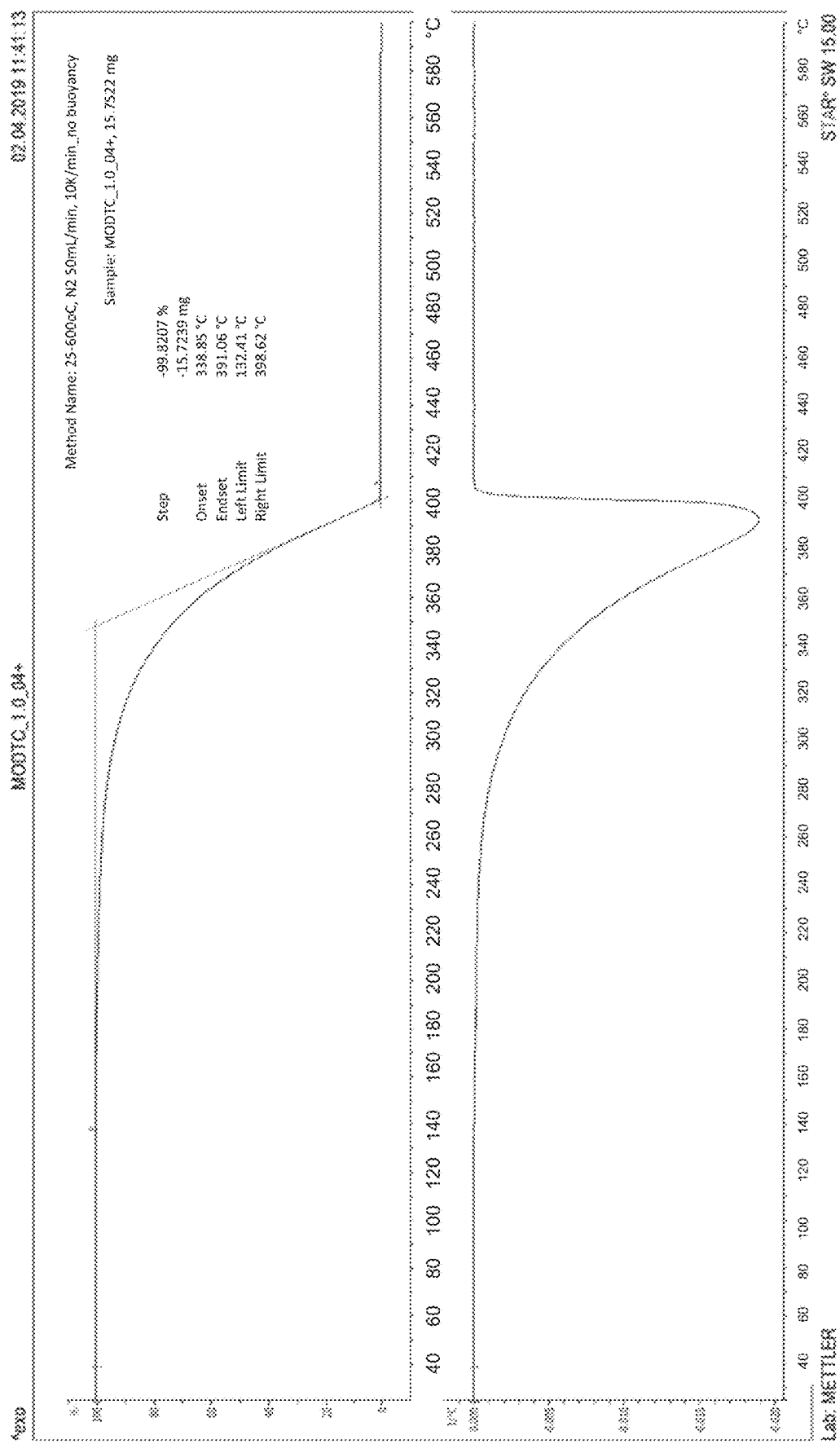
FIG. 30 depicts a thermal gravimetric analysis of test Lubricant Oil 4+ with 1 wt % MoDTC.

FIG. 30 depicts a thermal gravimetric analysis of test Lubricant Oil 4+ with 1 wt % MoDTC.

Figure 31:
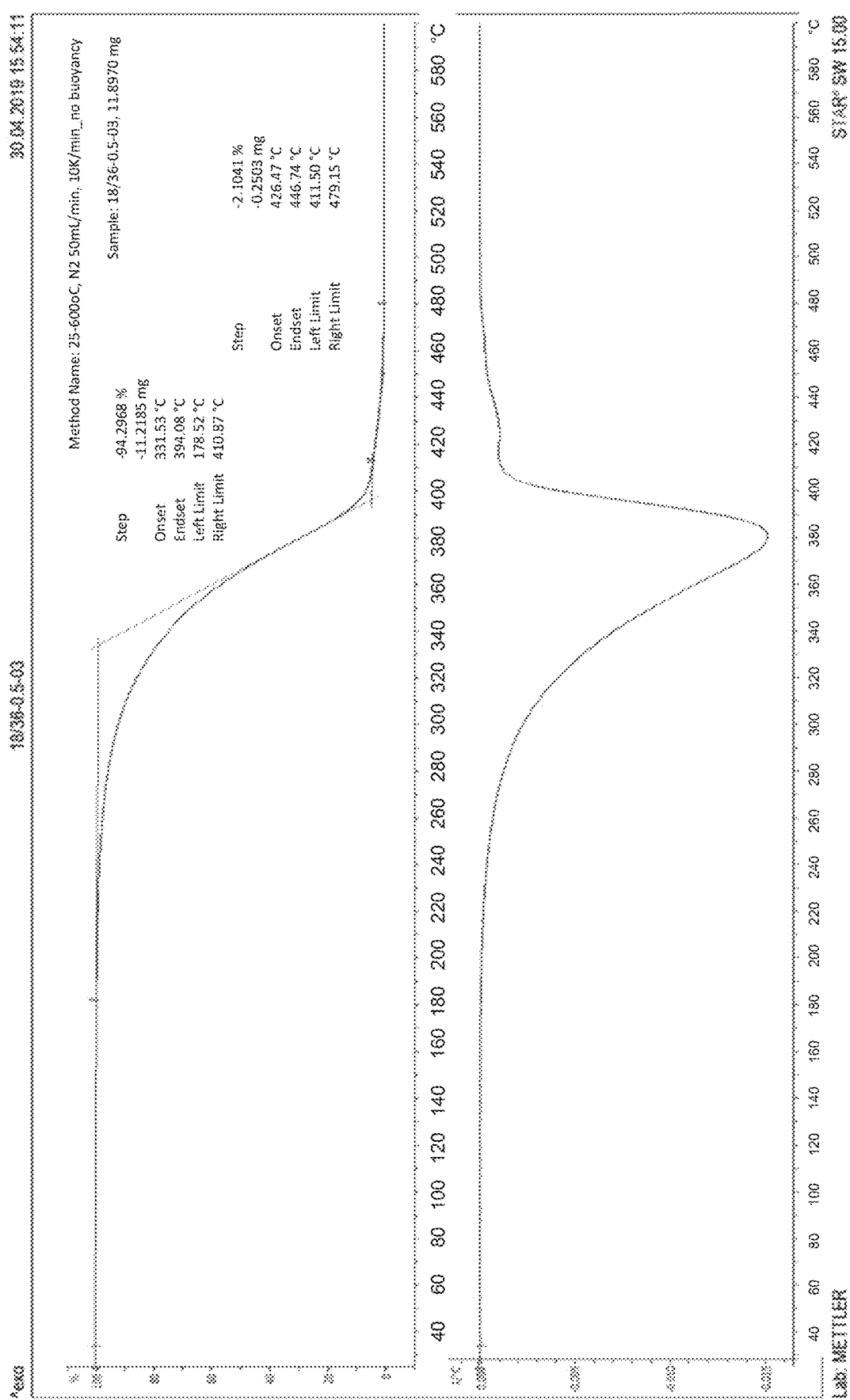
FIG. 31 depicts a thermal gravimetric analysis of test Lubricant Oil 3 with 0.5 wt % of the ionic liquid IL 18/36.

FIG. 31 depicts a thermal gravimetric analysis of test Lubricant Oil 3 with 0.5 wt % of the ionic liquid IL 18/36.

Figure 32:
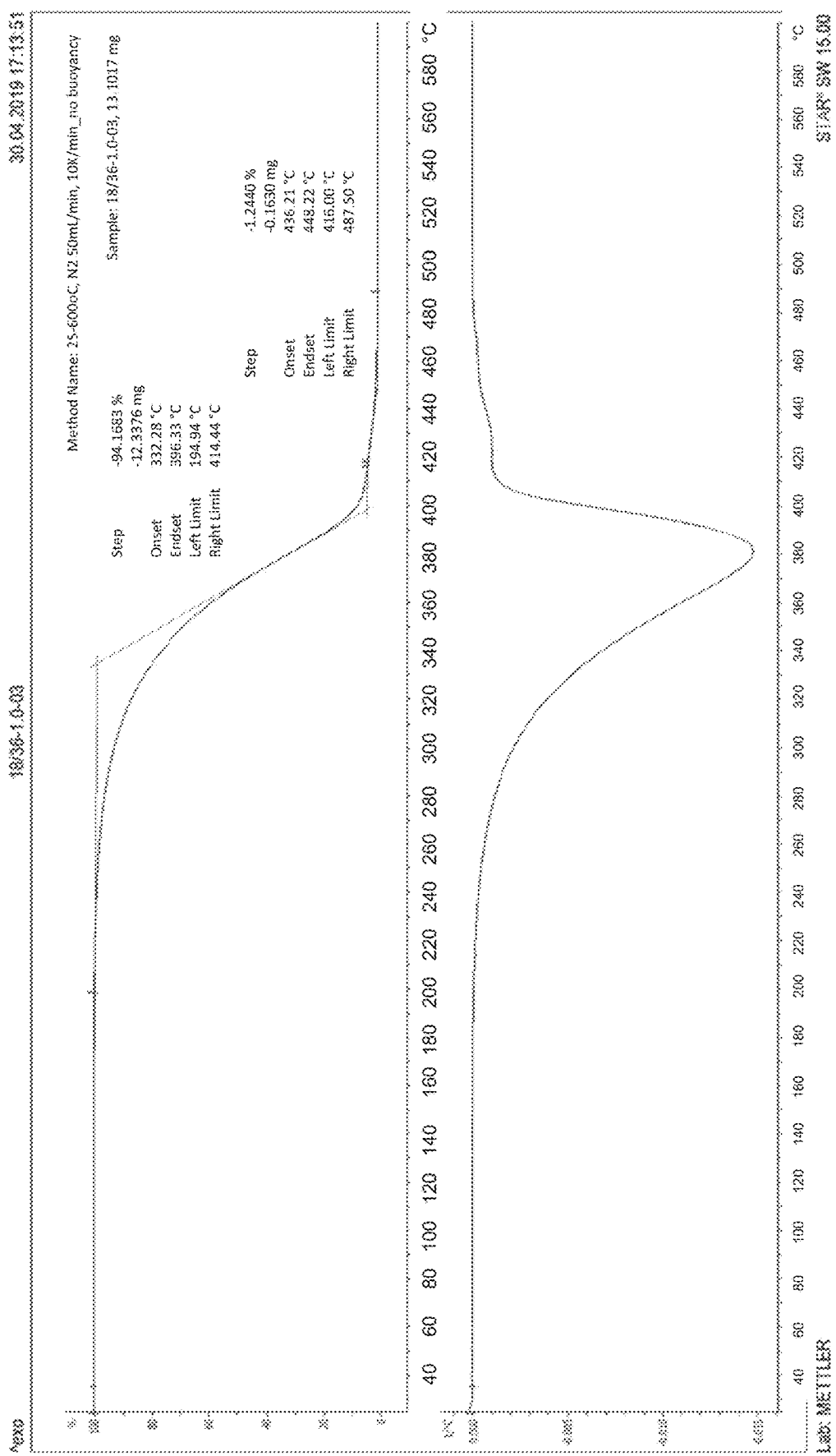
FIG. 32 depicts a thermal gravimetric analysis of test Lubricant Oil 3 with 1 wt % of the ionic liquid IL 18/36.

FIG. 32 depicts a thermal gravimetric analysis of test Lubricant Oil 3 with 1 wt % of the ionic liquid IL 18/36.

Figure 33:
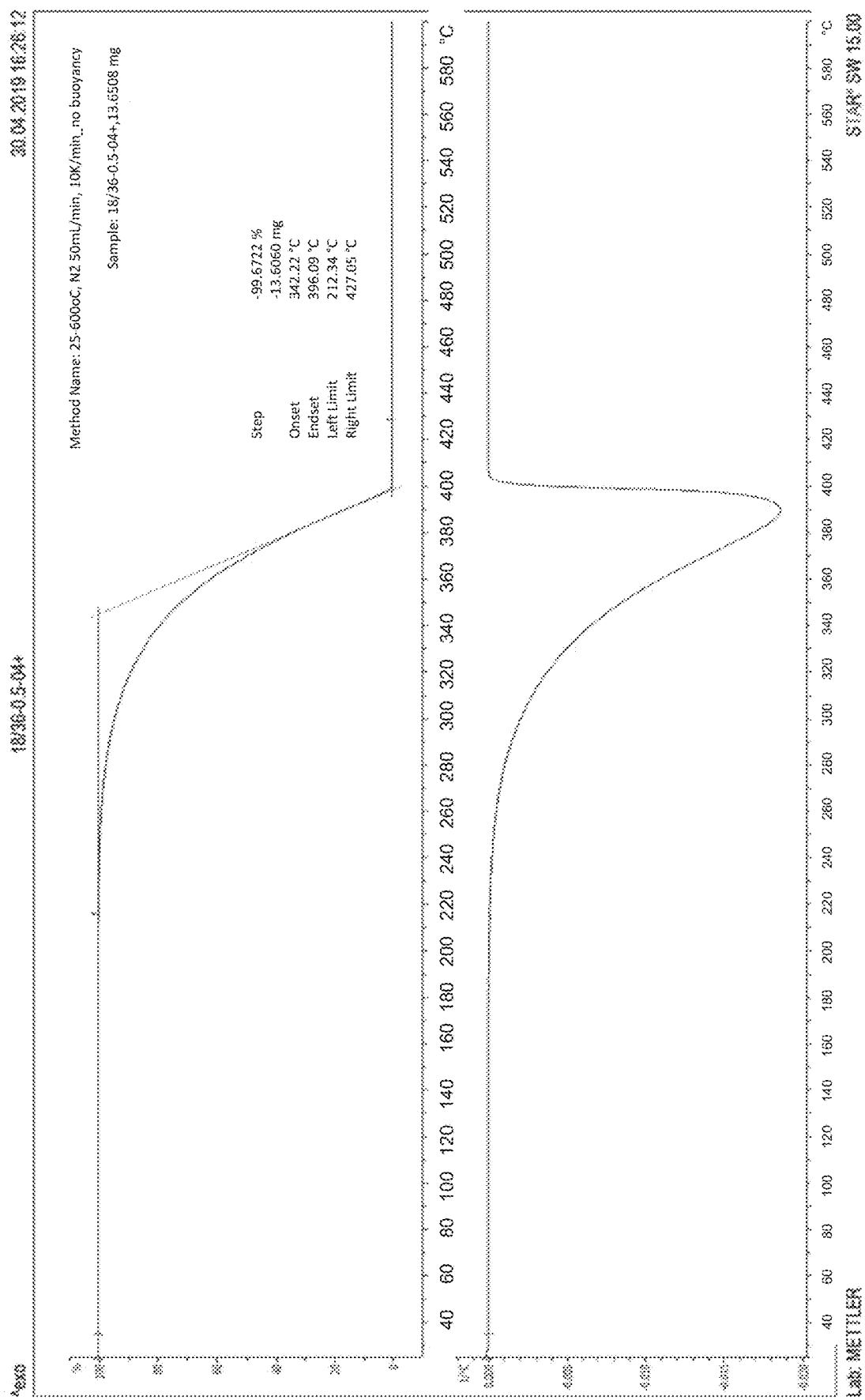
FIG. 33 depicts a thermal gravimetric analysis of test Lubricant Oil 4+ with 0.5 wt % of the ionic liquid IL 18/36.

FIG. 33 depicts a thermal gravimetric analysis of test Lubricant Oil 4+ with 0.5 wt % of the ionic liquid IL 18/36.

Figure 34:
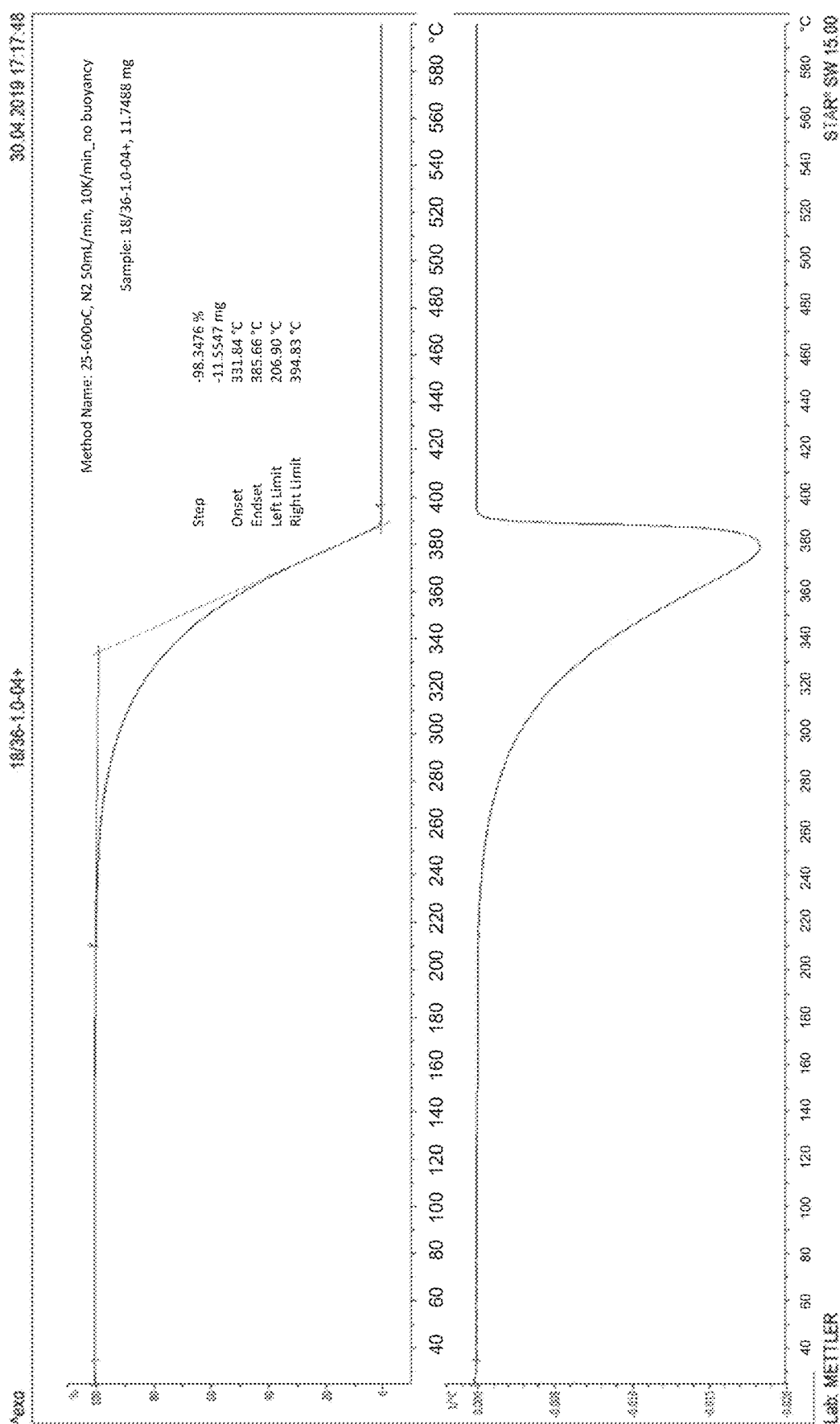
FIG. 34 depicts a thermal gravimetric analysis of test Lubricant Oil 4+ with 1 wt % of the ionic liquid IL 18/36.

FIG. 34 depicts a thermal gravimetric analysis of test Lubricant Oil 4+ with 1 wt % of the ionic liquid IL 18/36.

The thermal studies indicate that newly developed ionic liquids I: 18/36 and IL 18/03 have superior thermal stability as a neat compound when compared to neat MoDTC. This can be seen by comparing FIGS. 25, 26 and 27 where the ionic liquids absorb less energy at lower temperatures than MoDTC indicating that MoDTC degrades at lower temperatures.

When mixed with oils as a lubricant additive, it can be seen that the mixture of oil and additives are similarly thermal stable for both MoDTC and the ionic liquids. This data indicates that ionic liquids of the present disclosure could be used in oils as additives instead of MoDTC, without compromising the thermal stability of the oil.

The invention claimed is:

1. A lubricating oil composition comprising one or more base oils and one or more ionic liquids, wherein the one or more ionic liquids comprise one or more cations and one or more Group 6 metal mononuclear metallate anions, wherein the one or more Group 6 metal mononuclear metallate anions comprise at least one metal sulphur bond.

2. A lubricating oil composition according to claim 1, wherein the one or more Group 6 metal mononuclear metallate anions comprise molybdenum.

3. A lubricating oil composition according to claim 1 or claim 2, wherein the one or more Group 6 metal mononuclear metallate anions have a charge of −2.

4. A lubricating oil composition according to any one of claim 1, wherein the central metal atom of the one or more Group 6 metal mononuclear metallate anions is ligated to four atoms.

5. A lubricating oil composition according to claim 1, wherein the one or more Group 6 metal mononuclear metallate anions comprises one or more of the following ligands coordinated to the central metal atom of the anion: $BH_3$, $BF_3$, $BCl_3$, $BR_3$, $AlMe_3$, $SiF_4$, H, $CR_3$, —CR=$CR_2$, alkynyl, —COR, —$C_6H_5$, $\eta$-$CH_2CH$=$CH_2$, $\eta$-$C_5H_5$, $CF_3$, $C_6F_5$, $CH_2CMe_3$, $NR_2$, OR, —OOR, F, $SiR_3$, —$PR_2$, SR, Cl, $GeR_3$, $AsR_2$, SeR, Br, $SnR_3$, I, CN, SCN, NCS, $N_3$, OCN, NCO, $OSO_2R$, ONO, $ONO_2$, $OClO_3$, $OSiR_3$, Mn (CO)$_5$, Fe($\eta$-$C_5H_5$)(CO$_2$), Mo($\eta$-$C_5H_5$)(CO)$_3$, Au(PPh$_3$), HgCl, —$SCH_2CH_2S$—, oxalate, o-quinones, —(S)$_2$—, $SO_4$, $CO_3$, —(O)$_2$—, metallacycles —(CH$_2$)$_n$—, where n=2, 3 or 4, =$CR_2$, =NR, =O, =S, =C=$CR_2$, $NH_3$, $NR_3$, $OH_2$, $OR_2$, $PR_3$, P(OR)$_3$, $SR_2$, $SeR_2$, $AsR_3$, CO, $H_2C$=$CH_2$, $R_2C$=$CR_2$, RC≡CR, S=$CR_2$, $N_2$, $PF_3$, tetrahydrofuran, $Et_2O$, DMSO, RNC, RCN, pyridine, dimethyl sulfoxide, nitrogen, $\eta$-$C_3H_5$, acetylacetone, dimethylglyoxime, $\eta$-acetato, $\eta$-$O_2CR$, $\eta$-$S_2CNR_2$, $\eta$-$S_2PR_2$, $NH_2CH_2CO_2$—, $BF_4$, $BH_4$, NO, $NR_2$, $\eta$-$C_4H_4$, NR, $\eta$-$C_4H_4$, bipyridyl, o-phenanthroline, ethylenediamine, $RS(CH_2)_2SR$, diphosphines, $N(CH_2COO)_3$, $\eta$-$C_5H_5$, dienyls, 1,5,-diazacyclooctane-N,N'-diacetate, $\eta$-benzene, ($\eta$-arene), $\eta$-$C_7H_8$, RSi(CH$_2$PMe$_2$)$_3$, $\eta$-$C_7H_7$, ethylenediaminetetraacetic acid, $\eta$-$C_5H_4(CH_2)_3NR$, $\eta$-$C_5H_4(CH_2)_3NR$, $\eta$-$C_5H_4(CH_2)_3N$=, P(bipyridyl)$_3$, [FB(ONCHC$_5H_3$)$_3$P], wherein R is hydrocarbyl, alkyl or alkenyl, optionally the one or more Group 6 metal mononuclear metallate anions is of the formula:

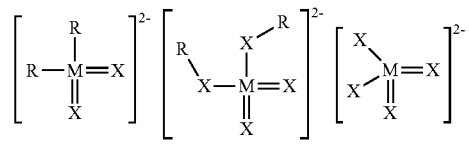

wherein M=Cr, Mo, W or Sg; wherein at least one X=S, wherein the other X are independently selected from O, S, Se or Te, and wherein each R is independently selected from alkyl, alkenyl, aryl, alkylaryl or arylalkyl moieties, such as $C_1$ to $C_{10}$ alkyl, $C_1$ to $C_{10}$ alkenyl, $C_1$ to $C_{10}$ aryl, $C_1$ to $C_{10}$ alkylaryl, or $C_1$ to $C_{10}$ arylalkyl moieties, wherein said alkyl, alkenyl, aryl, alkylaryl or arylalkyl moieties are optionally substituted by one to three groups selected from: $C_1$ to $C_4$ alkoxy, $C_2$ to $C_8$ alkoxyalkoxy, $C_3$ to $C_6$ cycloalkyl, —OH, —$NH_2$, —SH, —$CO_2$($C_1$ to $C_6$)alkyl, and —OC(O)($C_1$ to $C_6$)alkyl.

6. A lubricating oil composition according to claim 5, wherein M=Mo, and wherein M32 Mo, and wherein the other X are independently selected from 0 or S, optinally wherein the one or more ionic liquids have the formula:

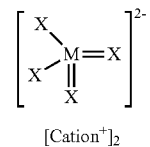

wherein M=Mo; and wherein each X=S.

7. A lubricating oil composition according to claim 1, wherein the one or more cations comprise one or more cations selected from a quaternary ammonium cation, a quaternary phosphonium cation, a quaternary sulphonium cation, or any combination thereof, optionally wherein the one or more cations comprise one or more cations selected from the following structures:

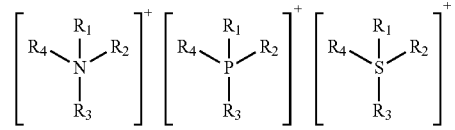

wherein $R_1$, $R_2$, $R_3$ and $R_4$ are independently selected from $C_1$ to $C_{30}$ straight chain or branched alkyl and alkenyl groups; $C_3$ to $C_6$ cycloalkyl groups; $C_1$ to $C_{30}$ arylalkyl groups; $C_1$ to $C_{30}$ alkylaryl groups; aryl groups; or any two of $R_1$, $R_2$, $R_3$ and $R_4$ combine to form an alkylene chain —(CH$_2$)$_q$— wherein q is from 3 to 6; wherein any one or more of said straight or branched alkyl and alkenyl groups, cycloalkyl groups, arylalkyl groups, alkylaryl groups; aryl groups or alkylene chains are optionally substituted by one to three groups selected from: $C_1$ to $C_4$ alkoxy, $C_2$ to $C_8$ alkoxyalkoxy, $C_3$ to $C_6$ cycloalkyl, —OH, —NH$_2$, —SH, —CO$_2$($C_1$ to $C_6$)alkyl, and —OC(O)($C_1$ to $C_6$)alkyl.

8. A lubricating oil composition according to claim 7, wherein $R_1$, $R_2$, $R_3$ and $R_4$ are $C_1$ to $C_{30}$ straight chain or branched alkyl and alkenyl groups, preferably $C_1$ to $C_{30}$ straight chain or branched alkyl groups, or
wherein $R_1$, $R_2$, $R_3$ and $R_4$ are $C_4$ to $C_{18}$ straight chain or branched alkyl groups, preferably $C_4$ to $C_{18}$ straight chain alkyl groups, or
wherein $R_1$, $R_2$ and $R_3$ are the same and $R_4$ is different to $R_1$, $R_2$ and $R_3$.

9. A lubricating oil composition according to claim 7, wherein $R_1$, $R_2$ and $R_3$ are $C_4$ to $C_{10}$ straight chain alkyl and wherein $R_4$ is $C_{11}$ to $C_{18}$ straight chain alkyl, optionally wherein $R_1$, $R_2$ $R_3$ are hexyl and wherein $R_4$ is tetradecyl.

10. A lubricating oil composition according to claim 7, wherein the one or more cations comprise a phosphonium cation, optionally
wherein the ionic liquid comprises a compound of the following formula

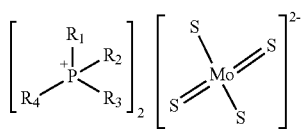

wherein $R_1$, $R_2$ and $R_3$ are hexyl and wherein $R_4$ is tetradecyl.

11. A lubricating oil composition according to claim 1, wherein the one or more cations comprise a substituted quaternary imidazolium cation comprising at least one ester group, or one or more cations selected from the following structures:

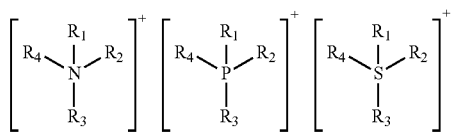

wherein at least one of $R_1$, $R_2$, $R_3$ and $R_4$ have the formula —$R_5$O(C=O)$R_6$ or —$R_5$(C=O)—O—$R_6$, wherein $R_5$ is a $C_1$ to $C_{10}$ straight chain or branched alkyl or alkenyl group, or a $C_3$ to $C_6$ cycloalkyl or cycloalkenyl group; and $R_6$ is a $C_1$ to $C_{30}$ straight chain or branched alkyl or alkenyl group; a $C_3$ to $C_6$ cycloalkyl group; a $C_1$ to $C_{30}$ arylalkyl group; a $C_1$ to $C_{30}$ alkylaryl group; an aryl group; or any two respective $R_6$ groups combine to form an alkylene chain —(CH$_2$)$_q$— wherein q is from 3 to 6; wherein $R_5$ and/or $R_6$ are optionally substituted by one to three groups selected from: $C_1$ to $C_4$ alkoxy, $C_2$ to $C_8$ alkoxyalkoxy, $C_3$ to $C_6$ cycloalkyl, —OH, —NH$_2$, —SH, —CO$_2$($C_1$ to $C_6$)alkyl, and —OC(O)($C_1$ to $C_6$)alkyl;
and wherein the other of $R_1$, $R_2$, $R_3$ and $R_4$ that are not as defined above are independently selected from $C_1$ to $C_{30}$ straight chain or branched alkyl and alkenyl groups such as $C_1$ to $C_{10}$ alkyl or alkenyl groups; $C_3$ to $C_6$ cycloalkyl groups; $C_1$ to $C_{30}$ arylalkyl groups; aryl groups; or any two of $R_1$, $R_2$, $R_3$ and $R_4$ combine to form an alkylene chain —(CH$_2$)$_q$— wherein q is from 3 to 6; wherein any one or more of said straight or branched chain alkyl and alkenyl groups, cycloalkyl groups, arylalkyl groups, alkylaryl groups; aryl groups or alkylene chains is optionally substituted by one to three groups selected from: $C_1$ to $C_4$ alkoxy, $C_2$ to $C_8$ alkoxyalkoxy, $C_3$ to $C_6$ cycloalkyl, —OH, —NH$_2$, —SH, —CO$_2$($C_1$ to $C_6$)alkyl, and —OC(O)($C_1$ to $C_6$)alkyl.

12. A lubricating oil composition according to claim 1, wherein the one or more cations comprise a substituted quaternary imidazolium cation comprising at least one amide group, or one or more cations selected from the following structures:

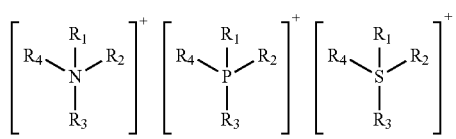

wherein at least one of $R_1$, $R_2$, $R_3$ and $R_4$ have the formula —$R_5$—N($R_7$)—(C=O)$R_6$ or —$R_5$(C=O)—N($R_7$)—$R_6$, wherein $R_5$ and $R_6$ are as defined in claim 11, and wherein $R_7$ is selected from H; a $C_1$ to $C_{30}$ straight chain or branched alkyl or alkenyl group; a $C_3$ to $C_6$ cycloalkyl group; a $C_1$ to $C_{30}$ arylalkyl group; a $C_1$ to $C_{30}$ alkylaryl group; an aryl group; or any two respective $R_6$ groups combine to form an alkylene chain —(CH$_2$)$_q$— wherein q is from 3 to 6; wherein $R_5$ and/or $R_6$ are optionally substituted by one to three groups selected from: $C_1$ to $C_4$ alkoxy, $C_2$ to $C_8$ alkoxyalkoxy, $C_3$ to $C_6$ cycloalkyl, —OH, —NH$_2$, —SH, —CO$_2$($C_1$ to $C_6$)alkyl, and —OC(O)($C_1$ to $C_6$)alkyl;
and wherein the other of $R_1$, $R_2$, $R_3$ and $R_4$ that are not as defined above are independently selected from $C_1$ to $C_{30}$ straight chain or branched alkyl and alkenyl groups such as $C_1$ to $C_{10}$ alkyl or alkenyl groups; $C_3$ to $C_6$ cycloalkyl groups; $C_1$ to $C_{30}$ arylalkyl groups; $C_1$ to $C_{30}$ alkylaryl groups; aryl groups; or any two of $R_1$, $R_2$, $R_3$ and $R_4$ combine to form an alkylene chain —(CH$_2$)$_q$— wherein q is from 3 to 6; wherein any one or more of said straight or branched chain alkyl and alkenyl groups, cycloalkyl groups, arylalkyl groups, alkylaryl groups; aryl groups or alkylene chains is optionally substituted by one to three groups selected from: $C_1$ to $C_4$ alkoxy, $C_2$ to $C_8$ alkoxyalkoxy, $C_3$ to $C_6$ cycloalkyl, —OH, —NH$_2$, —SH, —CO$_2$($C_1$ to $C_6$)alkyl, and —OC(O)($C_1$ to $C_6$)alkyl.

13. A lubricating oil composition according to claim 12, wherein three of $R_1$ $R_2$, $R_3$ and $R_4$ have the formula —$R_5$O(C=O)$R_6$; —$R_5$(C=O)—O—$R_6$; —$R_5$—N($R_7$)—(C=O)$R_6$; or —$R_5$(C=O)—N($R_7$)—$R_6$; wherein $R_5$, $R_6$ and $R_7$ are as defined above, optionally wherein three of $R_1$ $R_2$, $R_3$ and $R_4$ have the formula —$R_5$O(C=O)$R_6$.

14. A lubricating oil composition according to claim 11, wherein the cation comprises a quaternary ammonium cation.
wherein the cation comprises a quaternary ammonium cation; $R_1$ $R_2$, and $R_3$ have the formula —$R_5$O(C=O)$R_6$ wherein $R_5$ is $C_2H_4$; and wherein $R_4$ is $C_1$ to $C_5$ alkyl, preferably methyl.

15. A lubricating oil composition according to claim 1, wherein the ionic liquid is a liquid at a temperature of 50° C. and above.

16. A lubricating oil composition according to claim 1, wherein the ionic liquid comprises less than 5 wt % halide.

17. A lubricating oil composition according to claim 1, wherein the ionic liquid is free of halide.

18. A lubricating oil composition according to claim 1, wherein the composition does not comprise a urea thickener or a substituted urea thickener.

19. A lubricating oil composition according to claim 1, wherein the composition comprises the one or more ionic liquids in an amount of from 0.1 wt. % to 5 wt.

20. A lubricating oil composition according to claim 1, wherein the one or more base oils are present in the composition in an amount of from 75% to 99% by weight of the lubricant composition.

21. A lubricating oil composition according to claim 1, wherein the one or more base oils comprise one or more base stocks selected from Group I base stocks, Group II base stocks, Group III base stocks, Group IV base stocks and Group V base stocks.

22. A lubricating oil composition according to claim 1, wherein the one or more base oils comprise one or more synthetic oils selected from polyalpha-olefins, synthetic esters, polyalkylene glycols, phosphate esters, alkylated naphthalenes, silicate esters, ionic fluids, or multiply alkylated cyclopentanes.

23. A lubricating oil composition according to claim 1, further comprising one or more additives optionally selected from one or more pour point additives, anti-foaming additives, viscosity index improvers, antioxidants, detergents, corrosion inhibitors, anti-wear additives, friction modifiers, extreme pressure additives, or any combination thereof.

24. A lubricating oil composition for a spark ignition engine or a compression ignition engine, the lubricating oil composition:
  one or more base oils and one or more ionic liquids, wherein the one or more ionic liquids comprises one or more cations selected from a quaternary phosphonium cation, a quaternary sulphonium cation, a quaternary ammonium cation comprising at least one amide group, a quaternary ammonium cation comprising at least one ester group, a substituted quaternary imidazolium cation comprising at least one ester group, a substituted quaternary imidazolium cation comprising at least one amide group, azaannulenium, azathiazolium, benzimidazolium, benzofuranium, benzothiophenium, benzotriazolium, borolium, cinnolinium, diazabicyclodecenium, diazabicyclononenium, 1,4diazabicyclo[2.2.2]octanium, diazabicyclo-undecenium, dibenzofuranium, dibenzothiophenium, dithiazolium, dithiazolium, furanium, guanidinium, imidazolium, indazolium, indolinium, indolium, morpholinium, oxaborolium, oxaphospholium, oxazinium, oxazolium, iso-oxazolium, oxazolinium, pentazolium oxothiazolium, phospholium, phosphonium, phthalazinium, piperazinium, piperidinium, pyranium, pyrazinium, pyrazolium, pyridazinium, pyridinium, pyrimidinium, pyrrolidinium, pyrrolium, quinazolinium, quinolinium, iso-quinolinium, quinoxalinium, quinuclidinium, selenazolium, sulfonium, tetrazolium, thiadiazolium, iso-thiadiazolium, thiazinium, thiazolium, iso-thiazolium, thiophenium, thiuronium, triazadecenium, triazinium, triazolium, iso-triazolium, and uranium, or a combination thereof; and one or more Group 6 metal mononuclear metallate anions, wherein the one or more Group 6 metal mononuclear metallate anions comprise at least one metal sulphur bond.

* * * * *